US008041031B2

(12) United States Patent
Gligoroski et al.

(10) Patent No.: US 8,041,031 B2
(45) Date of Patent: Oct. 18, 2011

(54) CRYPTOGRAPHIC PRIMITIVES, ERROR CODING, AND PSEUDO-RANDOM NUMBER IMPROVEMENT METHODS USING QUASIGROUPS

(75) Inventors: Danilo Gligoroski, Skopie (MK); Smile Markovski, Skopie (MK); Ljupco Kocarev, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 1030 days.

(21) Appl. No.: 11/665,085

(22) PCT Filed: Oct. 13, 2005

(86) PCT No.: PCT/US2005/038245
§ 371 (c)(1),
(2), (4) Date: Oct. 4, 2007

(87) PCT Pub. No.: WO2006/045114
PCT Pub. Date: Apr. 27, 2006

(65) Prior Publication Data
US 2009/0041236 A1 Feb. 12, 2009

Related U.S. Application Data

(60) Provisional application No. 60/618,173, filed on Oct. 13, 2004.

(51) Int. Cl.
*H04L 9/18* (2006.01)
(52) U.S. Cl. ............... 380/28; 380/37; 380/42
(58) Field of Classification Search ............ 380/28, 380/37, 42
See application file for complete search history.

(56) References Cited

U.S. PATENT DOCUMENTS

| 5,892,829 | A | 4/1999 | Aiello et al. | |
| 7,280,663 | B1* | 10/2007 | Golomb et al. | 380/277 |
| 2002/0154769 | A1 | 10/2002 | Petersen et al. | |
| 2003/0051026 | A1 | 3/2003 | Carter et al. | |
| 2003/0191950 | A1* | 10/2003 | Patel et al. | 713/189 |
| 2004/0086117 | A1 | 5/2004 | Petersen et al. | |

OTHER PUBLICATIONS

C. Koscielny. Quasigroups for Cryptographic Applications. Int. J. Appl. Math. Comput. Sci., 2002, vol. 12, No. 4, 559-569. http://matwbn.icm.edu.pl/ksiazki/amc/amc12/amc12411.pdf.*
Gligoroski et al. "The Stream Cipher Edon80." 2008. New Stream Cipher Designs, LNCS 4986. pp. 152-169. Springer-Verlag Berlin Heidelberg 2008.*
V. Dimitrova and J. Markovski, On Quasigroup Psuedo Random Sequence Generators, Institute of Informatics, Faculty of Natural Sciences and Mathematics, Ss Cyril and Methodius University, Skopje, Macedonia, Proc. Of the 1$^{st}$ Balkan Conference in Informatics, Y. Manolopoulos and P. Spirakis eds., Nov. 21-23, 2004, Thessaloniki, Greece, pp. 393-401.

(Continued)

*Primary Examiner* — Eleni A Shiferaw
*Assistant Examiner* — Tamara Teslovich
(74) *Attorney, Agent, or Firm* — Greer, Burns & Crain Ltd.

(57) ABSTRACT

Stream ciphers, including synchronous stream ciphers, self-synchronizing stream ciphers, and totally asynchronous stream ciphers, employ a working key and a quasigroup transformation, where the quasigroup used is based on an initial secret key. Error-correction and pseudo-random number generation improver methods also employ quasigroup transformations.

22 Claims, 1 Drawing Sheet

OTHER PUBLICATIONS

A. Juels, M. Jakobsson, E. Shriver and B. K. Hillyer, How to Turn Loaded Dice into Fair Coins, RSA Laboratories, RSA Data Security and Information Sciences Research Ctr., Bell Labs., Jul. 1998, Abstract and pp. 1-21.

S. Markovski, D. Gligoroski and J. Markovski, Classification of Quasigroups by Random Walk on Torus, University Ss Cyril and Methodius, Skopje, Macedonia, pp. 1-18.

D. Gligoroski, Stream Cipher Based on Quasigroup String Transformations in $ZZ_p$, Institute of Informatics, University St. Cyril and Methodius, Faculty of Natural Sciences, Institute of Informatics, Skopje, Republic of Macedonia, Dec. 2003, pp. 1-14.

D. Gligoroski, S. Markovski and V. Bakeva, On Infinite Class of Strongly Collision Resistant Hash Functions "EDON-F" with Variable Length of Output, Ss Cyril and Methodius University, Faculty of Sciences and Mathematics, Institute of Informatics, Skopje, Republic of Macedonia, Proc. $1^{st}$ International Conference on Mathematics and Informatics for Industry, Thessaloniki, Greece, Apr. 2003, pp. 5.

S. Markovski, D. Gligoroski and S. Andova, Using Quasigroups for One-One Secure Encoding, University St. Cyril and Methodius, Faculty of Natural Sciences, Institute of Informatics, Skopje, Republic of Macedonia Proc. VIII Conf. Logic and Computer Science "LIRA '97", Novi Sad, 1997, pp. 157-162, 6 pp.

S. Markovski, D. Gligoroski and V. Bakeva, Quasigroup String Processing: Part 1, University St. Cyril and Methodius, Faculty of Natural Sciences and Mathematics, Institute of Informatics, Skopje, Macedonia, Part 1, Proc. of Maced. Acad. of Sci. and Arts, Sc. Math. Tech. Scien. XX 1-2, 1999, 16 pp.

S. Markovski and V. Kusakatov, Quasigroup String Processing: Part 2, St. Cyril and Methodius University, Faculty of Sciences, Institute of Informatics, Skopje, Republic of Macedonia, MANU, XXI, 1-2, 2000, pp. 15-32, pp. 1-17 pp.

S. Markovski, D. Gligoroski and B. Stojčevska, Secure Two-Way On-Line Communication by Using Quasigroup Enciphering with Almost Public Key, St. Cyril and Methodius University, Faculty of Sciences, Institute of Informatics, Skopje, Republic of Macedonia, Novi Sad Journal of Mathematics, 30, 2000, 8 pp.

S. Markovski, D. Gligoroski and V. Bakeva, Quasigroups and Hash Functions, Sixth International conference on Discrete Mathematics and Applications, Bansko, Bulgaria, Aug.-Sep. 2001, pp. 1-8.

B. D. McKay, A. Meynert and W. Myrvold, Small Latin Squares, Quasigroups and Loops, Department of Computer Science, Australian National University, Canberra, Australia, and Victoria, B.C., Canada, 28 pp.

A. Menezes, P. van Oorschot and S. Vanstone, Pseudorandom Bits and Sequences, Handbook of Applied Cryptography, Chapter 5, CRC Press, 1996, preamble and pp. 169-190.

C. E. Shannon, A Mathematical Theory of Communication, The Bell System Technical Journal, vol. 27, Jul.-Oct. 1948, pp. 379-423 and 623-656.

* cited by examiner

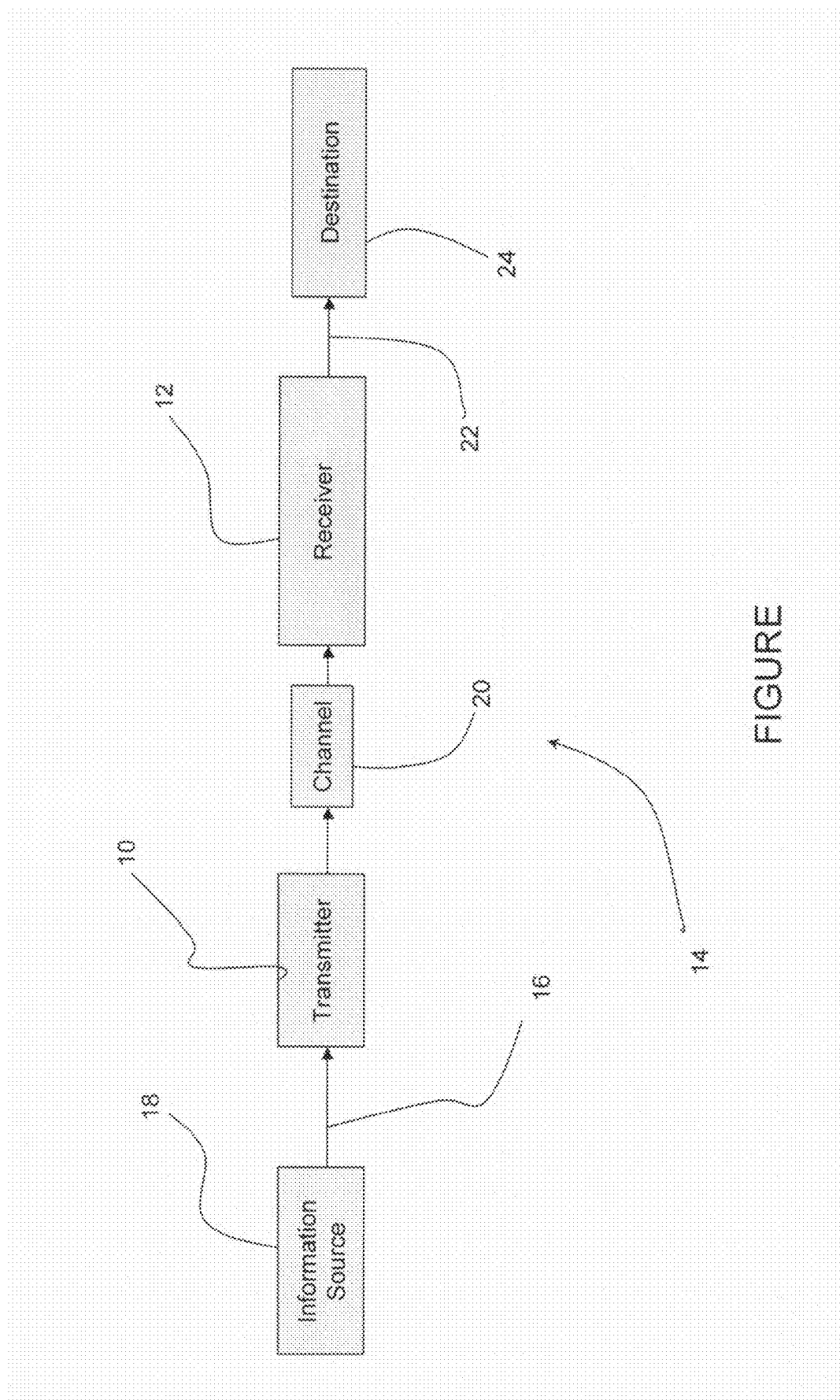

CRYPTOGRAPHIC PRIMITIVES, ERROR CODING, AND PSEUDO-RANDOM NUMBER IMPROVEMENT METHODS USING QUASIGROUPS

PRIORITY CLAIM

The present application claims the benefit of U.S. Provisional Application Ser. No. 60/618,173, filed Oct. 13, 2004, under 35 U.S.C. §119.

TECHNICAL FIELD

A general field of the invention is transmission of information. A more particular field of the invention is data encryption/decryption. Another more particular field of the invention is error coding. Yet another more particular field of the invention is pseudo-random numbers.

BACKGROUND ART

Cryptography may be used to provide data integrity and/or data security for data communication. The latter can be important to protect the data communicated over a channel, including wired and wireless channels. One type of encryption makes use of a stream cipher. As opposed to block ciphers, which are characterized by production of a same block output in response to a same block input, stream ciphers can give different outputs at different times in response to an identical input. A stream cipher converts an input string (such as a message) into an encrypted output string (such as a ciphertext) using an input called a seed or key, with the goal that parties lacking the key will view the encrypted string as a random sequence. The level of encryption and, to some extent, the resources devoted to encryption determine the level of security (or randomness) to other parties.

Stream ciphers provide improved security over block ciphers, due to the lack of a fixed output response to a particular input. There exist in the art self-synchronizing (sometimes called asynchronous) and synchronous ciphers. In a synchronous stream cipher, later outputs from a decrypted stream do not suffer from an error that occurred during the transmission (excepting an error on the actual erroneous bit or group (block) of bits). When an error affects the decrypted stream, a self-synchronizing stream cipher is being employed. Self-synchronizing cipher stream methods permit the correct decryption of the stream after an error results in a number of blocks being decoded or transmitted erroneously.

Block and stream ciphers, and cryptography or transmission methods in general, make use of some important support methods. As an example, (pseudo-) random number generation is used in ciphers. Pseudo-random numbers are generated, for example, to provide seed or basis numbers for ciphering and deciphering methods. As another example, error correcting codes, which may be used to improve communication generally, particularly over noisy channels, may also provide benefit in cipher methods.

DISCLOSURE OF THE INVENTION

According to preferred embodiments of the present invention, a number of stream ciphers, including synchronous stream ciphers, self-synchronizing stream ciphers, and totally asynchronous stream ciphers, are provided that employ a working key and a quasigroup transformation, where the quasigroup used is based on an initial secret key. Error-correction and pseudo-random number generation improver methods are provided as well, both of which also employ quasigroup transformations.

BRIEF DESCRIPTION OF THE DRAWING

The FIGURE is a block diagram of a basic communication system, including a transmitter and receiver according to embodiments of the present invention.

BEST MODE OF CARRYING OUT THE INVENTION

Generally, in certain embodiments of the invention, a synchronous stream cipher with selectable key length is provided. In an exemplary embodiment, steps are provided for generating a uniformly distributed keystream that is additively combined with a stream of plaintext data to generate an encrypted output stream. The keystream generation steps include determining a working quasigroup transformation based on a secret initial key, and using the working quasigroup to generate the keystream. The preferred synchronous stream cipher also provides a computationally infeasible barrier to attack. The key length may be varied to improve security of the cipher without re-designing algorithms for encrypting and decrypting as the key size increases. For sufficiently small key sizes, operations can be pipelined in hardware or firmware implementations.

In other embodiments of the present invention, a self-synchronizing stream cipher with variable key length is provided, again without the need to re-design algorithms for encrypting and decrypting as the key size increases. In particular embodiments of the self-synchronizing stream cipher, encryption and decryption are performed by determining a working quasigroup based on a secret initial key, and encrypting or decrypting a message as a function of a working key, the working quasigroup, and a fixed number of letters of the message to be encrypted or decrypted. As with the preferred synchronous stream cipher, the preferred self-synchronizing stream cipher is computationally infeasible to attack, and with a sufficiently small input key can be pipelined in hardware or firmware implementations.

In still other embodiments of the invention, a new type of cipher, a totally asynchronous stream cipher is provided wherein an output stream is generated as a function of a working key, a working quasigroup determined based on an initial key, and a fixed number of previous letters of an input stream. This type of cipher has been shown to be secure against various attacks by adversaries. The synchronous cipher, self-synchronizing cipher, and asynchronous cipher are examples of cryptographic primitives that may be implemented according to embodiments of the present invention using quasigroups. As used herein, the term "quasigroup" refers to quasigroups or any algebraic object equivalent thereof.

Other embodiments of the invention provide a method for correcting errors in binary symmetric channels, by mapping blocks of a message to a codeword, wherein the mapping is iterative and, for an arbitrary codeword, the distribution of substrings of C of length r is uniform. This mapping, according to preferred embodiments, is performed using a quasigroup transformation. Preferred embodiments provide low bit error rates, e.g., in the range of $10^{-5}$ with blocks of a few hundred bits, comparing favorable to Turbo Coding and LDPC that accomplish such bit error rates with blocks of several thousand bits.

Yet other embodiments of the invention provide an improver to improve the output of a pseudo-random number generator. Output weaknesses in the generator are addressed by the improver. Improver embodiments can enlarge the period of a pseudo-random string to any desired length. Pseudo-random strings may be made uniform in the sense that the distributions of letters, pairs of letters, triples, and generally k-tuples may be made uniform. The preferred improver does not relay the properties of a generator, and can function even when a generator produces a trivial output (consisting, for example, of only letter string). Preferred improvers take into account properties that have been recognized in quasigroup string transformations. Complexity is linear (O(n)) where n is the length of the input pseudo-random string) and hence the improver is very fast. It is flexible and can work over alphabets of n-bits letter for every n>1. Embodiments of the improver may be implemented in a memory space less than 1 Kb, for example. An improver of preferred embodiments accepts a pseudo-random string of low quality. The string is transformed using a quasigroup of a selectable order, and the number of transformations may be selectable as well. A high-quality pseudo-random string is output by the improver.

Referring to the FIGURE, methods of the present invention may be implemented in a transmitter 10 and/or receiver 12 used in a communication system 14. The transmitter 10 receives a message 16 from an information source 18, and may encrypt the message (or improve the message, if error coding or pseudo-random number improvement is used) for transmission of a signal via a channel 20. As will be appreciated in the art, the channel 20 may be noisy. The receiver 12 receives the signal (encrypted message, message containing errors, pseudo-random number, etc.), and may decrypt the signal message and/or correct errors in the signal to produce the decrypted or corrected message 22, which is sent to a destination 24.

It is contemplated that the transmitter 10 and/or receiver 12 may be configured to implement one or more methods of the present invention. It is further contemplated that a computer-readable medium, a chip, a propagated signal, a computer, etc. may be used to implement, or cause to be implemented, one or more of the methods of the present invention. Various methods according to aspects of the present invention will now be discussed.

In a first type of embodiment of the present invention, a flexible additive stream cipher, referred to herein as EdonX, is provided with provable security that transforms input stream of tuples of bits, preferably nibbles (i.e. 4-tuples of bits). The length of the key of EdonX is variable and can be any string of n nibbles. EdonX is defined by using quasigroup string transformations and its security is based on the mathematical properties of quasigroups and quasigroup string transformations. EdonX uses, in a preferred embodiment, a quasigroup of order 16 that can be stored in 128 bytes and, together with the internal memory and the executable code, it can be implemented in less than 1 Kb. Consequently, in a preferred embodiment, EdonX is suitable for hardware implementation in embedded systems.

Generally, stream ciphers encrypt individual characters (usually binary digits) of a plaintext message one at a time, using an encryption transformation which varies with time, while block ciphers simultaneously encrypt groups of characters of a plaintext message using a fixed encryption transformation. To address the problem of designing a cryptographically strong and highly qualitative stream cipher, a flexible additive stream cipher is disclosed, EdonX, with provable security that transforms input stream of nibbles (i.e. 4-tuples of bits). The length of the key of EdonX is variable and can be any string of n nibbles, but we suggest $n \geq 32$ for security reasons. EdonX is defined by using quasigroup string transformations and its security is based on the mathematical properties of quasigroups and quasigroup string transformations. The design of EdonX uses a quasigroup of order 16 that can be stored in 128 bytes and, together with the internal memory and the executable code, it can be implemented in less than 1 Kb. Consequently, EdonX is suitable for hardware implementation in embedded systems.

We will briefly mention the definition of the synchronous stream ciphers as it is defined in A. Menezes, P. van Oorschot, and S. Vanstone. Handbook of Applied Cryptography, CRC Press, Inc., 1997.

Definition 1 A synchronous stream cipher is one in which the keystream is generated independently of the plaintext message and of the ciphertext.

The encryption process of a synchronous stream cipher can be described by the equations $$\sigma_{i+1} = f(\sigma_i, k), z_i = g(\sigma_i, k), c_i = h(z_i, m_i)$$

where $\sigma_0$ is the initial state and may be determined from the key k, f is the next-state function, g is the function which produces the keystream $z_i$ and h is the output function which combines the keystream and plaintext $m_i$ to produce ciphertext $c_i$.

Definition 2 A binary additive stream cipher is a synchronous stream cipher in which the keystream, the plaintext and the ciphertext digits are binary digits, and the output function h is the XOR function $\oplus$.

EdonX stream cipher according to preferred embodiments is a binary additive stream cipher. EdonX is defined by using quasigroup operations and quasigroup string transformations. Here we give a brief overview, noting that the term "quasigroups" as used herein may also refer to an algebraic object equivalent of a quasigroup.

Definition 3 A quasigroup (Q,*) is a groupoid satisfying the law $$(\forall u, v \in Q)(\exists! x, y \in Q) u*x = v \& y*u = v.$$

Here we will use only finite quasigroups, i.e., Q is a finite set. Closely related combinatorial structures to finite quasigroups are the so called Latin squares:

Definition 4 A Latin square L on a finite set Q of cardinality $|Q|=n$ is an n×n-matrix with elements from Q such that each row and each column of the matrix is a permutation of Q.

To any finite quasigroup (Q, *) given by its multiplication table it is associated a Latin square L, consisting of the matrix formed by the main body of the table, and each Latin square L on a set Q define a quasigroup (Q, *).

A relation of isotopism and autotopism between two quasigroups are defined as follows.

Definition 5 A quasigroup (K,*) is said to be isotopic to a quasigroup (Q,•) iff there are bijections $\alpha, \beta, \gamma$ from K onto Q such that $\gamma(x*y) = \alpha(x) \cdot \beta(y)$ for each x,y∈K. Then the triple $(\alpha, \beta, \gamma)$ is called an isotopism from (K,*) to (Q,•).

An autotopism of (K,*) is an isotopism of (K,*) into itself We denote by Autotope (K,*) a quasigroup obtained from (K,*) by some autotopism. Note that there are no more than $|K|^3$ quasigroups autotopic to (K,*). If $\alpha = 1$ and $\beta = 1$ are identity permutations and $\gamma$ is a transposition, then we denote by $\gamma(K,*)$ the quasigroup autotopic to (K,*) under the autotopism $(1,1,\gamma)$.

The multiplication of two autotopisms $(\alpha, \beta, \gamma)$ and $(\alpha', \beta', \gamma')$ is defined componentwise, i.e.

$$(\alpha, \beta, \gamma)(\alpha', \beta', \gamma') = (\alpha\alpha', \beta\beta', \gamma\gamma')$$

The following property will be used in proving the security of EdonX:

Proposition 1 The set Γ of all autotpisms of a quasigroup (Q,*) is a group under the operation of multiplication of autotopisms.

This property is further explained in Denes, J., Keedwell, A. D.: Latin Squares and their Applications, English Univer. Press Ltd., 1974. Given a quasigroup (Q, *) five new operations, so called parastrophes or adjoint operations, can be derived from the operation *. We will need only the following two, denoted by \ and / (referred to as left and right parastrophes), and defined by:

$$x*y=z \Leftrightarrow y=x\backslash z \Leftrightarrow x=z/y.$$

Then the algebra (Q, *, \, /) satisfies the identities $$x\backslash(x*y)=y, x*(x\backslash y)=y, (x*y)/y=x, (x/y)*y=x$$

and (Q, \), (Q,/) are quasigroups too.

Next, we define the method of quasigroup string transformations. Consider an alphabet (i.e. a finite set) Q, and denote by Q+ the set of all nonempty words (i.e. finite strings) formed by the elements of Q. The elements of Q+ will be rather denoted by $a_1 a_2 \ldots a_n$ than $(a_1, a_2, \ldots, a_n)$, where $a_i \in Q$. Let * be a quasigroup operation on the set Q, i.e. consider a quasigroup (Q, *). For each $a \in Q$ we define two functions $e_{a,*}, d_{a,*}: Q+ \to Q+$ as follows.

Let $a_i \in Q, \alpha = a_1 a_2 \ldots a_n$. Then $$e_{a,*}(\alpha)=b_1 b_2 \ldots b_n \Leftrightarrow b_1 = a*a_1, b_2 = b_1*a_2, \ldots, b_n = b_{n-1}*a_n,$$

as shown in this table:

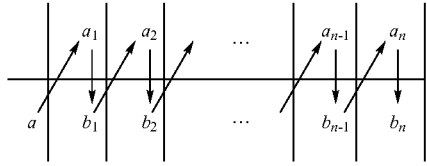

i.e. $b_{i+1} = b_i * a_{i+1}$ for each i+0, 1, ..., n−1 where $b_0 = a$, and $$d_{a,*}(\alpha)=c_1 c_2 \ldots c_n \Leftrightarrow c_1 = a*a_1, c_2 = a_1*a_2, \ldots, c_n = a_{n-1}*a_n$$

as shown in this table:

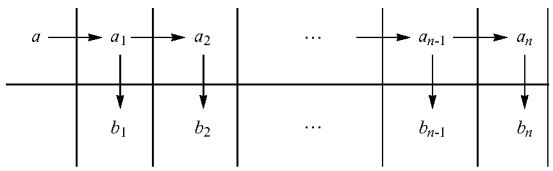

i.e. $c_{i+1} a_i * a_{i+1}$ for each i=0, 1 ..., n−1, where $a_0 = a$.

The functions $e_{a,*}, d_{a,*}$ are called e- and d-transformation of Q+ based on the operation * with leader a.

For example, take Q={0, 1, 2, 3} and let the quasigroup (Q,*) and its parastrophe (Q, \) be given by the multiplication scheme in the following table:

| * | 0 | 1 | 2 | 3 | \ | 0 | 1 | 2 | 3 |
|---|---|---|---|---|---|---|---|---|---|
| 0 | 2 | 1 | 0 | 3 | 0 | 2 | 1 | 0 | 3 |
| 1 | 3 | 0 | 1 | 2 | 1 | 1 | 2 | 3 | 0 |
| 2 | 1 | 2 | 3 | 0 | 2 | 3 | 0 | 1 | 2 |
| 3 | 0 | 3 | 2 | 1 | 3 | 0 | 3 | 2 | 1 |

Consider the string M=0 0 1 0 2 3 0 0 1 2 0 0 1 0 0 2 0 0 0 3 and choose the leader 0. Then by the transformation $e_{0,*}$ we will obtain the transformed string $C=e_{0,*}(M)=2$ 1 0 2 3 1 3 0 1 1 3 0 1 3 0 0 2 1 3 1 and by the transformation $d_{0,\backslash}$ we will obtain the string $D=d_{0,\backslash}(M)=2$ 2 1 1 0 2 0 2 1 3 3 2 1 1 2 0 3 2 2 3.

If we apply the transformation $d_{0,\backslash}$ on the string C or the transformation $e_{0,*}$ on the string D we will obtain the original string M. In fact, the following property is true, as discussed in Markovski, S., Gligoroski, D., Bakeva, V.: Quasigroup String Processing: Part 1, Maced. Acad. of Sci. and Arts, Sc. Math. Tech. Scien. XX 1-2, (1999) 13 28:

Proposition 2 For each string $M \in Q^+$ and for each leader $l \in Q$ it holds that $d_{l,\backslash}(e_{l,*}(M))=M=e_{l,*}(d_{l,\backslash}(M))$, i.e. $e_{l,*}$ and $d_{l,\backslash}$ are mutually inverse permutations of Q+.

Preferably, EdonX operates on nibles, i.e. on 4-bit variables, and consequently it uses a quasigroup (Q, *) of order 16 for doing quasigroup string transformations on the streams of data. So, the values of the corresponding Latin square are represented by 4 bits. The same holds for the values of the working key K, which is stored in n internal variables $K_i$ i.e. $K=K_0 K_1 \ldots K_{n-1}$ and the variables K have values in the range {0, 1, ..., 15}. The i-th value of K will be also denoted by $K[i](=K_i)$.

EdonX uses an initial secret value $K_{in}=K_{in}[0]K_{in}[1] \ldots K_{in}[n-1]$ of the working key K in the initialization phase. The initial quasigroup (Q,•) of order 16 can be secret or public. By the secret information stored in $K_{in}$, EdonX makes transformations on the initial quasigroup (Q,•) and on the values of too. EdonX uses also two temporal 4-bit variables T and X, and one additional integer variable Counter, in a preferred embodiment. The decryption function of EdonX is the same as the encryption function.

The EdonX encryption (and decryption) function is defined by the procedure that follows. The operation * is the quasigroup operation obtained by an autotopism from the operation • of the given initial quasigroup. The operation ⊕ is the bitwise XOR operation on nibles (i.e. 4-bit letters). The number m=maxn, 64 represents the length of the working key and it depends of the length n of the initial key, but for security reasons we take m≧64. The initialization phase is described later on by a separate procedure.

| EdonX encryption and decryption |
|---|
| Phase 1. Initialization |
| From the secret initial key $K_{in}$ of length n obtain the new working key K of length n and new quasigroup (Q,*) ← Autotope(Q,•). |
| Phase 2. En(De)cryption |
| 1. Counter ← 0; $p = \left\lfloor \frac{m}{2} \right\rfloor$; |
| 2. X ← K[Counter mod n]; |
| 3. T ← K[Counter + p mod n]; |
| 4. For i = 0 to m − 1 do begin |

-continued

| EdonX encryption and decryption |
|---|
| $\quad\quad X \leftarrow K_i * X;$ |
| $\quad\quad T \leftarrow T \bullet X;$ |
| $\quad\quad K_i \leftarrow X;$ |
| $\quad\quad$ end; |
| $\quad\quad K_{m-1} \leftarrow T;$ |
| 5. Output: $X \oplus$ InputNible; |
| 6. Counter $\leftarrow$ Counter + 1; |
| 7. Go to 2; |

A very important phase of the algorithm is the Initialization phase. It incorporates already known techniques in cryptographic algorithms such as padding, expanding and transforming the secretly shared initial key $K_{in}$. The information from expanded and transformed key $K_{in}$ is then used to transform the initially given quasigroup as well as to set the initial values of m nibles of the working key K. The length n of the initial key (in nibles) can be any positive integer, larger n for higher security (and as it is always the case, the price for the security is the speed of the system); we propose $32 \leq n \leq 255$. This flexibility of the choice of the key is a significant feature of EdonX.

The initialization phase is described by the following algorithm:

| Initialization of EdonX |
|---|
| Phase 1. Input of initial key |
| $\quad$ 1. Input: n - the initial length of the secret key (an integer) and |
| $\quad\quad K_{in} = K_0 \| K_1 \| \ldots \| K_{n-1}$ ($K_i$ are nibles) |
| Phase 2. Padding the key |
| $\quad$ 2. Set $K_{in} = K_{in} \| n_1 \| n_2$ |
| $\quad\quad$ where $n_1$ is the most significant and |
| $\quad\quad n_2$ is the least significant nible of n. |
| Phase 3. Expanding the key to 512 nibles |
| $\quad$ 3. Set $K_{ex} = K_{in} \| K_{in} \| \ldots \| K_{in} \| K'$ |
| $\quad\quad$ where K' consists of the first l nibles of $K_{in}$ |
| $\quad\quad$ such that the total length of $K_{ex}$ is 512 nibles. |
| Phase 4. Transformation of $K_{ex}$ with the given |
| $\quad\quad$ quasigroup (Q,•) of order 16 |
| $\quad$ 4. For i = 0 to 511 do |
| $\quad\quad$ begin |
| $\quad\quad\quad$ Set leader = $K_{in}$[i mod (n + 2)]; |
| $\quad\quad\quad K_{ex} \leftarrow e_{leader,\bullet}(K_{ex});$ |
| $\quad\quad\quad K_{ex} \leftarrow$ RotateLeft($K_{ex}$); |
| $\quad\quad$ end; |
| Phase 5. Transformation (Q,*) $\leftarrow$ Autotope(Q,•) |
| $\quad$ 5. (Q,*) $\leftarrow$ (Q,•); |
| $\quad\quad$ For i = 0 to 511 step 8 do |
| $\quad\quad$ begin |
| $\quad\quad\quad$ Set $row_1 = K_{ex}[i];$ Set $row_2 = K_{ex}[i + 1];$ |
| $\quad\quad\quad$ (Q,*) $\leftarrow$ SwapRows(Q,$row_1$,$row_2$); |
| $\quad\quad\quad$ Set $column_1 = K_{ex}[i + 2];$ Set $column_2 = K_{ex}[i + 3];$ |
| $\quad\quad\quad$ (Q,*) $\leftarrow$ SwapColumns(Q,$column_1$,$column_2$); |
| $\quad\quad\quad$ Set $\gamma = (K_{ex}[i + 4], K_{ex}[i + 6]);$ |
| $\quad\quad\quad$ (Q,*) $\leftarrow \gamma$(Q,*); |
| $\quad\quad$ end; |
| Phase 6. Setting the working key K (the last m nibles of $K_{ex}$) |
| $\quad$ 6. Set K = $K_0 \| K_1 \| \ldots \| K_{m-1} = K_{ex}[512 - m] \| \ldots \| K_{ex}[511]$ |

We should clarify several operations and symbols that are used in the initialization phase. First, $K_{in}$ means the initial key, $K_{ex}$ means expanded key and the symbol ∥ means concatenation of 4-bit letters. Then the notification $K_{in}$[j] means the j-th nible of the $K_{in}$. The function RotateLeft ($K_{ex}$) cyclically rotates the values of the $K_{ex}$ such that $K_{ex}[i] \leftarrow K_{ex}[i+1]$, i=0, 1, 2, ..., 510 and $K_{ex}[511] \leftarrow K_{ex}[0]$. The name of the functions SwapRows and Swap Columns speaks for themselves—they are functions by which the rows or columns of a quasigroup are swapped.

At the end of the initialization phase, we obtain two working structures that are not known to the adversary. Namely, the first unknown structure is the working quasigroup (Q,*) that is an autotope of the original quasigroup Q(•) and it is one of about $16!)^3 \approx 2^{132}$ autotopes, and the second unknown structure is the working key K of length 4m bits (m nibles) that replaces original initial secret key $K_{in}$. (However, the exact number of the autotopism classes of quasigroups of order 16 is not known; the best known publicly available result is for quasigroups of order 11.)

An example will now be presented of an initialization, encryption and decryption operation with simplified (2-bit) EdonX. This example works on the principles of EdonX but, for the simplicity of the explanation, instead of using quasigroup of order 16, we use quasigroup of order 4. Accordingly, instead of nibles, we work with 2-bit letters (i.e. 0, 1, 2 and 3). Moreover, instead of using expanded key of the length 512, we shorten it to the length of 16, and we also take m=n. In fact, we change the Phase 5 of the Initialization Phase of EdonX to the following simple form:

| Phase 5 (example). Transformation (Q,*) $\leftarrow$ Autotope(Q,•) |
|---|
| $\quad$ 5. (Q,*) $\leftarrow$ (Q,•); |
| $\quad\quad$ For i = 0 to 511 step 8 do |
| $\quad\quad$ begin |
| $\quad\quad\quad$ Set $row_1 = K_{ex}[i];$ Set $row_2 = K_{ex}[i + 1];$ |
| $\quad\quad\quad$ (Q,*) $\leftarrow$ SwapRows(Q,$row_1$,$row_2$); |
| $\quad\quad\quad$ Set $column_1 = K_{ex}[i + 2];$ Set $column_2 = K_{ex}[i + 3];$ |
| $\quad\quad\quad$ (Q,*) $\leftarrow$ SwapColumns(Q,$column_1$,$column_2$); |
| $\quad\quad\quad$ Set $\gamma = (K_{ex}[i + 4], K_{ex}[i + 6]);$ |
| $\quad\quad\quad$ (Q,*) $\leftarrow \gamma$(Q,*); |
| $\quad\quad$ end; |

Let the initial quasigroup (Q,•) be the same as in the previous example:

| • | 0 | 1 | 2 | 3 |
|---|---|---|---|---|
| 0 | 2 | 1 | 0 | 3 |
| 1 | 3 | 0 | 1 | 2 |
| 2 | 1 | 2 | 3 | 0 |
| 3 | 0 | 3 | 2 | 1 |

Set the initial value to be $K_{in}$=1 3 1 in nibles. Since the length of $K_{in}$ is 3, and since representation of the number 3 with two 2-bit letters is 0011=00∥11), we pad $K_{in}$ and obtain $K_{in}$=1 3 1 0 3. Then by concatenating $K_{in}$ several times we obtain $K_{ex}$ of length 16, i.e. $K_{ex}$=1 3 1 0 3 1 3 1 0 3 1 3 1 0 3 1. Then transforming the expanded key by $e_{l,*}$-transformations where the leaders l are cyclicly taken to be the values of the padded $K_{in}$ obtain the final value of $K_{ex}$. In the following table we summarize those transformations.

| Leader | $K_{ex}$ | | | | | | | | | | | | | | | |
|---|---|---|---|---|---|---|---|---|---|---|---|---|---|---|---|---|
|  | 1 | 3 | 1 | 0 | 3 | 1 | 3 | 1 | 0 | 3 | 1 | 3 | 1 | 0 | 3 | 1 |
| 1 | 0 | 3 | 3 | 0 | 3 | 3 | 1 | 0 | 2 | 0 | 1 | 2 | 2 | 1 | 2 | 2 |
| RotateLeft | 3 | 3 | 0 | 3 | 3 | 1 | 0 | 2 | 0 | 1 | 2 | 2 | 1 | 2 | 2 | 0 |
| 3 | 1 | 2 | 1 | 2 | 0 | 1 | 3 | 2 | 1 | 0 | 0 | 0 | 1 | 1 | 1 | 3 |

-continued

| Leader | $K_{ex}$ | | | | | | | | | | | | | | | |
|---|---|---|---|---|---|---|---|---|---|---|---|---|---|---|---|---|
| RotateLeft | 2 | 1 | 2 | 0 | 1 | 3 | 2 | 1 | 0 | 0 | 0 | 1 | 1 | 1 | 3 | 1 |
| 1 | 1 | 0 | 0 | 2 | 2 | 0 | 0 | 1 | 3 | 0 | 2 | 2 | 2 | 2 | 0 | 1 |
| RotateLeft | 0 | 0 | 2 | 2 | 0 | 0 | 1 | 3 | 0 | 2 | 2 | 2 | 2 | 0 | 1 | 1 |
| 0 | 2 | 1 | 1 | 1 | 3 | 0 | 1 | 2 | 1 | 1 | 1 | 1 | 1 | 3 | 3 | 3 |
| RotateLeft | 1 | 1 | 1 | 3 | 0 | 1 | 2 | 1 | 1 | 1 | 1 | 1 | 3 | 3 | 3 | 2 |
| 3 | 3 | 3 | 3 | 1 | 3 | 3 | 2 | 2 | 2 | 2 | 2 | 2 | 0 | 3 | 1 | 1 |
| RotateLeft | 3 | 3 | 1 | 3 | 3 | 2 | 2 | 2 | 2 | 2 | 2 | 0 | 3 | 1 | 1 | 3 |
| 1 | 2 | 0 | 1 | 2 | 0 | 0 | 0 | 0 | 0 | 0 | 2 | 0 | 1 | 0 | 3 | |
| RotateLeft | 0 | 1 | 2 | 0 | 0 | 0 | 0 | 0 | 0 | 2 | 0 | 1 | 0 | 3 | 2 | |
| 3 | 0 | 1 | 1 | 3 | 0 | 2 | 1 | 3 | 0 | 2 | 3 | 0 | 1 | 3 | 1 | 1 |
| RotateLeft | 1 | 1 | 3 | 0 | 2 | 1 | 3 | 0 | 2 | 3 | 0 | 1 | 3 | 1 | 1 | 0 |
| 1 | 0 | 1 | 2 | 1 | 1 | 0 | 3 | 0 | 0 | 3 | 0 | 1 | 2 | 2 | 2 | 1 |
| RotateLeft | 1 | 2 | 1 | 1 | 0 | 3 | 0 | 0 | 3 | 0 | 1 | 2 | 2 | 2 | 1 | 0 |
| 0 | 1 | 1 | 0 | 1 | 3 | 1 | 3 | 0 | 3 | 0 | 1 | 1 | 1 | 1 | 0 | 2 |
| RotateLeft | 1 | 0 | 1 | 3 | 1 | 3 | 0 | 3 | 0 | 1 | 1 | 1 | 1 | 0 | 2 | 1 |
| 3 | 3 | 0 | 1 | 2 | 2 | 0 | 2 | 0 | 2 | 2 | 2 | 2 | 2 | 1 | 1 | 0 |
| RotateLeft | 0 | 1 | 2 | 2 | 0 | 2 | 0 | 2 | 2 | 2 | 2 | 2 | 1 | 1 | 0 | 3 |
| 1 | 3 | 3 | 2 | 3 | 0 | 0 | 2 | 3 | 2 | 3 | 2 | 3 | 3 | 3 | 0 | 3 |
| RotateLeft | 3 | 2 | 3 | 0 | 0 | 2 | 3 | 2 | 3 | 3 | 3 | 3 | 3 | 0 | 3 | 3 |
| 3 | 1 | 1 | 2 | 1 | 3 | 2 | 0 | 0 | 3 | 2 | 0 | 3 | 1 | 3 | 1 | 2 |
| RotateLeft | 1 | 2 | 1 | 3 | 2 | 0 | 0 | 3 | 2 | 0 | 3 | 1 | 3 | 1 | 2 | 1 |
| 1 | 0 | 0 | 1 | 2 | 3 | 0 | 2 | 0 | 0 | 2 | 0 | 1 | 2 | 2 | 3 | 3 |
| RotateLeft | 0 | 1 | 2 | 3 | 0 | 2 | 0 | 0 | 2 | 0 | 1 | 2 | 2 | 3 | 3 | 0 |
| 0 | 2 | 2 | 3 | 1 | 3 | 2 | 1 | 3 | 2 | 1 | 0 | 0 | 0 | 3 | 1 | 3 |
| RotateLeft | 2 | 3 | 1 | 3 | 2 | 1 | 3 | 2 | 1 | 0 | 0 | 0 | 3 | 1 | 3 | 2 |
| 3 | 2 | 0 | 1 | 2 | 3 | 3 | 1 | 1 | 0 | 2 | 1 | 3 | 1 | 0 | 3 | 2 |
| RotateLeft | 0 | 1 | 2 | 3 | 3 | 1 | 1 | 0 | 2 | 1 | 3 | 1 | 0 | 3 | 2 | 2 |
| 1 | 3 | 3 | 2 | 0 | 3 | 3 | 3 | 0 | 0 | 1 | 2 | 2 | 1 | 2 | 3 | 2 |
| RotateLeft | 3 | 2 | 0 | 3 | 3 | 3 | 0 | 0 | 1 | 2 | 2 | 1 | 2 | 3 | 2 | 3 |

With the last values $K_{ex}$=3203330012212323 we start interatively to swap the rows, to swap the columns and to transpose the elements of the initial quasigroup $(Q, \cdot)$ in order for its autotope to be obtained. So, first we swap the rows 3 and 2, then the columns 0 and 3, then we transpose the elements 2 and 3, and so on, as it is shown in the tables below.

| · | 0 | 1 | 2 | 3 |
|---|---|---|---|---|
| 0 | 2 | 1 | 0 | 3 |
| 1 | 3 | 0 | 1 | 2 |
| 2 | 1 | 2 | 3 | 0 |
| 3 | 0 | 3 | 2 | 1 | swap row 3,2 →

| * | 0 | 1 | 2 | 3 |
|---|---|---|---|---|
| 0 | 2 | 1 | 0 | 3 |
| 1 | 3 | 0 | 1 | 2 |
| 2 | 0 | 3 | 2 | 1 |
| 3 | 1 | 2 | 3 | 0 | swap col 0,3 →

| * | 0 | 1 | 2 | 3 |
|---|---|---|---|---|
| 0 | 3 | 1 | 0 | 2 |
| 1 | 2 | 0 | 1 | 3 |
| 2 | 1 | 3 | 2 | 0 |
| 3 | 0 | 2 | 3 | 1 | trans (2,3) →

| * | 0 | 1 | 2 | 3 |
|---|---|---|---|---|
| 0 | 2 | 1 | 0 | 3 |
| 1 | 3 | 0 | 1 | 2 |
| 2 | 1 | 2 | 3 | 0 |
| 3 | 0 | 3 | 2 | 1 | swap row 3,3 →

| * | 0 | 1 | 2 | 3 |
|---|---|---|---|---|
| 0 | 2 | 1 | 0 | 3 |
| 1 | 3 | 0 | 1 | 2 |
| 2 | 1 | 2 | 3 | 0 |
| 3 | 0 | 3 | 2 | 1 | swap col 0,0 →

| * | 0 | 1 | 2 | 3 |
|---|---|---|---|---|
| 0 | 2 | 1 | 0 | 3 |
| 1 | 3 | 0 | 1 | 2 |
| 2 | 1 | 2 | 3 | 0 |
| 3 | 0 | 3 | 2 | 1 | trans col (3,0) →

| * | 0 | 1 | 2 | 3 |
|---|---|---|---|---|
| 0 | 2 | 1 | 3 | 0 |
| 1 | 0 | 3 | 1 | 2 |
| 2 | 1 | 2 | 0 | 3 |
| 3 | 3 | 0 | 2 | 1 | swap row 1,2 →

| * | 0 | 1 | 2 | 3 |
|---|---|---|---|---|
| 0 | 2 | 1 | 3 | 0 |
| 1 | 1 | 2 | 0 | 3 |
| 2 | 0 | 3 | 1 | 2 |
| 3 | 3 | 0 | 2 | 1 | swap col 2,1 →

| * | 0 | 1 | 2 | 3 |
|---|---|---|---|---|
| 0 | 2 | 3 | 1 | 0 |
| 1 | 1 | 0 | 2 | 3 |
| 2 | 0 | 1 | 3 | 2 |
| 3 | 3 | 2 | 0 | 1 | trans (2,1) →

| * | 0 | 1 | 2 | 3 |
|---|---|---|---|---|
| 0 | 1 | 3 | 2 | 0 |
| 1 | 2 | 0 | 1 | 3 |
| 2 | 0 | 2 | 3 | 1 |
| 3 | 3 | 1 | 0 | 2 | swap row 2,3 →

| * | 0 | 1 | 2 | 3 |
|---|---|---|---|---|
| 0 | 1 | 3 | 2 | 0 |
| 1 | 2 | 0 | 1 | 3 |
| 2 | 3 | 1 | 0 | 2 |
| 3 | 0 | 2 | 3 | 1 | swap col 2,3 →

| * | 0 | 1 | 2 | 3 |
|---|---|---|---|---|
| 0 | 1 | 3 | 0 | 2 |
| 1 | 2 | 0 | 3 | 1 |
| 2 | 3 | 1 | 2 | 0 |
| 3 | 0 | 2 | 1 | 3 | trans (3,3) →

| * | 0 | 1 | 2 | 3 |
|---|---|---|---|---|
| 0 | 1 | 3 | 0 | 2 |
| 1 | 2 | 0 | 3 | 1 |
| 2 | 3 | 1 | 2 | 0 |
| 3 | 0 | 2 | 1 | 3 |

The last obtained quasigroup is the working quasigroup (Q,*) that will be used for encryption and decryption:

| * | 0 | 1 | 2 | 3 |
|---|---|---|---|---|
| 0 | 1 | 3 | 0 | 2 |
| 1 | 2 | 0 | 3 | 1 |
| 2 | 3 | 1 | 2 | 0 |
| 3 | 0 | 2 | 1 | 3 |

The working key K takes the last n=3 letters of K becomes K=323.

Now, let us encode a plaintext message M=30102300. The calculations performed with a preferred embodiment of EdonX are shown in the following table.

| | Counter = 0 | | | Counter = 1 | | | Counter = 2 | | | Counter = 3 | | |
|---|---|---|---|---|---|---|---|---|---|---|---|---|
| | K | X | T | K | X | T | K | X | T | K | X | T |
| i | | 3 | 2 | | 0 | 1 | | 0 | 0 | | 1 | 0 |
| 0 | 3 | 3 | 0 | 3 | 0 | 3 | 0 | 1 | 1 | 1 | 0 | 2 |
| 1 | 2 | 0 | 2 | 0 | 1 | 3 | 1 | 0 | 3 | 0 | 1 | 2 |
| 2 | 3 | 0 | 1 | 1 | 0 | 0 | 0 | 1 | 3 | 3 | 2 | 3 |
| Input M | | 3 | | | 0 | | | 1 | | | 0 | |
| Output C = X ⊕ M | | 3 | | | 0 | | | 0 | | | 2 | |

| | Counter = 4 | | | Counter = 5 | | | Counter = 6 | | | Counter = 7 | | |
|---|---|---|---|---|---|---|---|---|---|---|---|---|
| | K | X | T | K | X | T | K | X | T | K | X | T |
| i | | 1 | 3 | | 0 | 3 | | 0 | 2 | | 1 | 2 |
| 0 | 0 | 3 | 1 | 3 | 0 | 0 | 0 | 1 | 2 | 1 | 0 | 1 |
| 1 | 1 | 1 | 0 | 1 | 2 | 0 | 2 | 1 | 2 | 1 | 2 | 1 |
| 2 | 3 | 2 | 0 | 0 | 0 | 2 | 2 | 1 | 2 | 2 | 2 | 1 |
| Input M | | 2 | | | 3 | | | 0 | | | 0 | |
| Output C = X ⊕ M | | 0 | | | 3 | | | 1 | | | 2 | |

Since EdonX is a binary additive stream cipher, the calculations for the decrypting phase are the same, and the only difference would be in the last two rows (in that case input would be C, and output M=X⊕C).

In the beginning $$\text{Counter} = 0, \; p = \left\lceil \frac{3}{2} \right\rceil = 1$$

and the initial working key K has the value K=323=3||2||3, the value of X is X=K[Counter mod 3]=$K_0$=3 and the value of T is T=K[(Counter+p) mod 3]=$K_1$=2. Then, according to the algorithm, we obtain the intermediate values of X and T and the new values of the key K as follows. For i=0 we have X←$X_0$=$K_0$*X=3*3=3, T←$T_0$=T•X=2•3=1,$K_0$←X=3, for i=1 we have X←$X_1$=$K_1$*X=2*3=0,T←$T_1$=T•X=0•0=2, $K_1$←X=0 and for i=2 we have X←$X_2$=$K_2$*X=3*0=0, T←T•X=1•0=1,$K_2$←X=0. After that we change the value of $K_2$ to $K_2$←T=1. In such a way we obtained that the new working key for Counter=1 is K=$K_0K_1K_2$=$X_0X_1T_2$=301 and we have the output value $C_0$=X⊕$M_0$=0⊕3=3. All of the computations for Counter=0, Counter=1, . . . , Counter=7 are given in the table above. Thus, the input plaintext string M=30102300 was encrypted into the ciphertext string C=30020312.

Next we will discuss and demonstrate security benefits of preferred embodiments of the synchronous stream cipher EdonX. Considering the security we assume that the length n of the initial secret key $K_{in}$ is at least 32. We assume also that the adversary has possibility of chosen plaintext/ciphertext attack, i.e. she/he can choose a plaintext and can obtain the corresponding ciphertext, and that the initial quasigroup (Q,•) and the length n of the initial key are public. Further, we assume that the initial value of the secret key $K_{in}$ as well as the internal states of the cipher: working key K, working quasigroups (Q,*) and the values of X and T are not known to the adversary and that she/he can not access them physically. We consider that the adversary will have broken EdonX if she/he will be able to reconstruct successfully some part of the working key K and of the values of X and T.

We have been able to show that without the knowledge of the initial key $K_{in}$ is no computationally feasible way of knowing the working quasigroup (Q,*) and the starting values of the working key K. We will give proofs that the adversary cannot effectively obtain information of the part of the working key K and of the values of X and T in the subsequent steps. In the analysis that follows, we use the following property of quasigroup strings transformations:

Proposition 3 Let (Q,*) be a quasigroup, α be an arbitrary string of $Q^+$, and $e_{l,*}$ be transformation with leader l. If we apply $e_{l,*}$ on α k times, the obtained string $\beta=(e_{l,*})^k(\alpha)$ has uniform distribution of the letters, pairs of letters, . . . , k-tuple of letters.

To analyze the EdonX initialization phase, the initial value of the key $K_{in}$, by our assumptions, can have a length at least 128 bits. The padding of $K_{in}$, by the information of how long was the initial key is standard procedure in other well known cryptographic primitives such as hash functions. Its role is to eliminate the possibility of obtaining the same result with two different initial keys. For example, if we don't have a padding then the initial keys $$K_{in,1} = \underbrace{0 \ldots 0}_{32} \text{ and } K_{in,2} = \underbrace{0 \ldots 0}_{33}$$

would produce the same working key K. On the other hand, the padding ensures us that the starting expanded keys $K_{ex}$ will be different for different initial keys $K_{in}$. The expanded key $K_{ex}$ has length of 512 nibles. It is transformed 512 times by the publicly known quasigroup (Q,•) of order 16. By Proposition 3 we have the following corollary:

Corollary 1 The distributions of letters, pairs of letters, triples of letters, . . . in the key $K_{ex}$ are uniform.

The uniformity of the distribution of the keys $K_{ex}$ imply the uniformity of distributions of the working keys K. Since the length of K is at least 64 nibles, i.e. 256 bits, the adversary can guess the working key with probability not larger than $2^{-256}$.

As a consequence of Corollary 1 we have the following property too:

Theorem 1 The working quasigroup (Q,*) is randomly obtained autotope of the initial quasigroup (Q,•)

Proof: In Phase 5 of the Initialization of EdonX during the process of iterations we swap the rows ($row_1 row_2$) and the columns ($column_1 column_2$) and we apply the transpositions γ. This means that in each iteration step we apply the autotopism (α,β,γ), where α=$row_1 row_2$, β=($column_1 column_2$) are permutations, i.e. transpositions, over the iterated quasigroup. So, after each iterative step in Phase 5 we obtain a quasigroup that is an autotope of the input one. By Proposition 1, the working quasigroup (i.e. the final output of Phase 5) is a quasigroup that is an autotope of the initial quasigroup under an autotopism (α',β',γ',). The permutations α',β',γ' are in fact the products of all 64 transpositions $\alpha=(\text{row}_1 \text{row}_2)$ $\beta=(\text{column}_1 \text{column}_2)$ and $\gamma$ respectively obtained during the Phase 5. Since each permutation on a 16-element set can be presented as a product of no more than 15 trans-positions, and the transpositions $\alpha,\beta,\gamma$ are obtained from the random key $K_{ex}$, we have that $\alpha',\beta'$ and $\gamma'$ are any of the possible 16! permutations. As a consequence we have that the working quasigroup can be any autotope of the initial public quasigroup.

Since there are about $16!^3 \approx 2^{132}$ autotopisms on a quasigroup of order 16, we found that the working quasigroup can only be guessed with probability of about $2^{-132}$.

To analyze the EdonX encryption/decryption phase, from the previous section we have that the working quasigroup $(Q, *)$ and the starting working key $K=K_0 K_1 \ldots K_{n-1}=K_{-1,0} K_{-1,1} \ldots K_{-1,n-1}$ are not known to the adversary. Why we denote $K_j$ by $K_{-1,j}$ will be clear by the following.

Let the adversary choose one pair $(M, C)=((M_0 M_1 \ldots),(C_0 C_1 \ldots))$ of plaintext/ciphertext string. Further we use the following notation: In the situation Counter=i instead of notation $K_j(j=0, 1, \ldots, n-1)$ we will use the notation $K_{i,j}$. The same notation will be used for the variables X and T, i.e. the notation $X_{i,j}(T_{i,j})$ means the variable X (T) when Counter=i in its j-th iteration.

So, by the encryption/decryption algorithm of EdonX for Counter=i($i \in \{0, 1, 2, \ldots \}$) the adversary can obtain the following system of equations (note that $$p = \left[\frac{m}{2}\right]$$

is a constant):

$$X_{i,0}=K_{i-1,0}*K_{i-1,i \bmod m}$$

$$T_{i,0}=K_{i-1,i+p \bmod m} \bullet X_{i,0}$$

$$X_{i,1}=K_{i-1,1}*X_{i,0}$$

$$T_{i,1}=T_{i,0} \bullet X_{i,1}$$

$$\ldots$$

$$X_{i,64}=K_{i-1,64}*X_{i,63}$$

$$T_{i,64}=T_{i,63} \bullet X_{i,64}$$

$$\ldots$$

$$X_{i,m-1}=K_{i-1,m-1}*K_{i,m-2}$$

$$T_{i,m-1}=T_{i,m-2} \bullet X_{i,m-1}$$

$$X_{i,m-1} \oplus M_0 = C_0 \quad (4)$$

From the last equation above the adversary can get the value of $X_{i,n-1}=C_0 \oplus M_0$, since $M_0$, $C_0$ are known. The rest of the above set is equivalent to the following system of m+1, $m \geq 64$, quasigroup equations with 2m unknown variables $K_{i-1,0}, \ldots, K_{i-1,m-1}, \ldots X_{i,0}, \ldots, X_{i,m-2}, X_{i,m-1}$:

$$X_{i,0}=K_{i-1,0}*K_{i-1,i} \bmod m$$

$$X_{i,1}=K_{i-1,1}*K_{i,0}$$

$$\ldots$$

$$X_{i,m-2}=K_{i-1,m-2}*X_{i,m-3}$$

$$M_0 \oplus C_0 = K_{i-1,m-1}*X_{i,m-2}$$

$$T_{i,m-1}=((\ldots(K_{i-1,i+p \bmod m} \bullet X_{i,0}) \bullet \ldots) \bullet X_{i,m-2}) \bullet (M_0 \oplus C_0) \quad (5)$$

(Namely, $$T_{i,1}=T_{i,0} \bullet X_{i,1}=(K_{i-1,i+p \bmod m} \bullet X_{i,0}) \bullet X_{i,1} T_{i,2}=T_{i,1} \bullet X_{i,2}=((K_{i-1,i+p \bmod m} \bullet X_{i,0}) \bullet X_{i,1}) \bullet X_{i,2}, \ldots)$$

Furthermore, the adversary does not know the working quasigroup $(Q, *)$, hence she/he should define a quasigroup operation $*$ on the set $\{0, 1, 2, \ldots, 15\}$ and then to solve the system. In fact the immediately preceding system is a system of functional equations with one unknown quasigroup operation $*$ consisting of m+1 equations with 2m unknowns. We have the following theorem and we use the identities above in its proof.

Theorem 2 Any quasigroup $(Q, *)$ of order 16, where $Q=\{0, 1, 2, \ldots, 15\}$, is a solution of the system of functional equations $$\chi_0 = y_0 * y_{i \bmod m}$$

$$\chi_1 = y_1 * \chi_0$$

$$\chi_2 = y_2 * \chi_1$$

$$\ldots$$

$$\chi_{m-2} = y_{m-2} * \chi_{m-3}$$

$$a = y_{m-1} * \chi_{m-2}$$

$$z = ((\ldots (y_{i+p \bmod m} \bullet \chi_0) \bullet \chi_1) \bullet \ldots) \bullet \chi_{m-2}) \bullet a$$

with one unknown quasigroup operation $*$ and unknown variables $x_0, x_1, \ldots, x_{m-2}, y_0, y_1, \ldots y_{m-1}$, over Q, where $\bullet$ is given quasigroup operation on Q and $i(0 \leq i \leq m-1)$, $$p = \left[\frac{m}{2}\right]$$

$a \in Q$ are given.

Proof: Let $*$ be any quasigroup operation on Q. We consider two cases.

Case 1: $0 \leq i \leq m-2$ (i.e. $0 \leq i \bmod m \leq m-2$)

Choose arbitrary values for the unknowns $y_0, y_i \in Q$. Then we have the unique value of $x_0 \in Q$ such that $x_0 = y_0 * y_i$. Choose arbitrary value for the unknown $y_1 \in Q$, and then we have the unique value of $x_1 \in Q$ such that $x_1 = y_1 * x_0$. Continuing that way, choose arbitrary value for the unknown $y_{i-1} \in Q$ and then we have the unique value of $x_{i-1} \in Q$ such that $x_{i-1} = y_{i-1} * x_{i-2}$. Next, we compute the value of $x_i = y_i * x_{i-1} \in Q$ and after that we choose arbitrary value for the unknown $y_{i+1} \in Q$ and compute the value of $x_{i+1} = y_{i+1} * x_i \in Q$, and so on. In such a way we can choose arbitrary values for the unknowns $y_0, y_1, \ldots y_{m-2}$ and from them we compute the (unique) values of the unknowns $x_0, x_1, \ldots, x_{m-2}$. Finally, from the equations $a = y_{m-1} * x_{m-2}$ we have $y_{m-1} = a/x_{m-2} \in Q$ and then we can compute $z = (y_{i+p \bmod m} \bullet x_0) \bullet x_1) \bullet \ldots) \bullet x_{m-2}) \bullet a \in Q$.

Case 2: $i = m-1$ (i.e. $i \bmod m = m-1$)

In this case we will repeat the procedure from Case 1 in opposite order. We choose arbitrary value $y_{m-1} \in Q$ and then from the equation $a = y_{m-1} * x_{m-2}$ we compute the value $x_{m-2} = y_{m-1} \backslash a \in Q$. After that we choose arbitrary values for $y_{m-2}, y_{m-3}, \ldots, y_2, y_1 \in Q$ and after each choice we compute the values $x_j = y_{j+1} \backslash x_{j+1} \in Q, j = m-3, m-2, \ldots, 0$. Finally, from the equation $x_0 = y_0 * y_{m-1}$ we compute the value $y_0 = x_0 / y_{m-1}$ and then we can compute $z = (y_{i+p \bmod m} \bullet x_0) \bullet x_1) \bullet \ldots) \bullet x_{m-2}) \bullet a \in Q$.

As a consequence of Theorem 2 we have that, for finding suitable values of the variables $K_{i-1,j}, X_{i,j}$ in (5), the adversary will have to choose one of $16^n \geqq 2^{128}$ possible initial keys and one of $16^{m-2}$ or $(16^{m-1}) \geqq 16^{62} = 2^{248}$ possible solutions $y_j$ of the system of functional equations shown above. All together there are at least $2^{376}$ possible choices.

Next, we will show that an adversary cannot break the system in feasible time if she/he uses the information from several consecutive nibles of plaintext/ciphertext strings. Namely, we will prove the following theorem:

Theorem 3 For breaking the system EdonX with probability greater than 0.5 an attacker should make at least $2^{190}$ trials.

Without loss of generality, the idea of the proof of Theorem 3 can be seen from the case Counter=0 & Counter=1 & Counter=2, i.e. when it is known the plaintext/ciphertext stream $M_0 M_1 M_2 / C_0 C_1 C_2$ of length 3. In this case the following equations can be obtained according to the encryption/decryption algorithm of EdonX (where simplifications as in (5) are made too):

$$X_{0,0} = K_{-1,0} * K_{-1,0}$$

$$K_{0,0} = X_{0,0}$$

$$X_{0,1} = K_{-1,1} * K_{0,0}$$

$$K_{0,1} = X_{0,1}$$

$$\ldots$$

$$X_{0,m-2} = K_{-1,m-2} * X_{0,m-3}$$

$$K_{0,m-2} = X_{0,m-2}$$

$$M_0 \oplus C_0 = K_{-1,m-1} * X_{0,m-2}$$

$$T_{0,m-1} = ((\ldots (K_{-1,p \bmod m} \cdot X_{0,0}) \cdot \ldots) \cdot X_{0,m-2}) \cdot (M_0 \oplus C_0)$$

$$K_{0,m-1} = T_{0,m-1} \qquad (7)$$

$$X_{1,0} = K_{-0,0} * K_{-0,0}$$

$$K_{1,0} = X_{1,0}$$

$$X_{1,1} = K_{-0,1} * K_{1,0}$$

$$K_{1,1} = X_{1,1}$$

$$\ldots$$

$$X_{1,m-2} = K_{-0,m-2} * X_{1,m-3}$$

$$K_{1,m-2} = X_{1,m-2}$$

$$M_1 \oplus C_1 = K_{0,m-1} * X_{1,m-2}$$

$$T_{1,m-1} = ((\ldots (K_{0,1+p \bmod m} \cdot X_{1,0}) \cdot \ldots) \cdot X_{1,m-2}) \cdot (M_1 \oplus C_1)$$

$$K_{1,m-1} = T_{1,m-1}$$

$$X_{2,0} = K_{1,0} * K_{1,2}$$

$$K_{2,0} = X_{2,0}$$

$$X_{2,1} = K_{1,1} * K_{2,0}$$

$$K_{2,1} = X_{2,1}$$

$$X_{2,m-2} = K_{1,m-2} * X_{2,m-3}$$

$$K_{2,m-2} = X_{1,m-2}$$

$$M_2 \oplus C_2 = K_{1,m-1} * X_{2,m-2}$$

$$T_{2,m-1} = ((\ldots (K_{1,2-p \bmod m} \cdot X_{2,0}) \cdot \ldots) \cdot X_{2,m-2}) \cdot (M_2 \oplus C_2)$$

$$K_{2,m-1} = T_{2,m-1} \qquad (9)$$

Note that (7) corresponds to Counter=0, (8) corresponds to Counter=1 and (9) corresponds to Counter=2. Also, we have that $x_{0,m-1} = M_0 C_0, X_{1,m-1} = M_1 \oplus C_1, X_{2,m-1} = M_2 \oplus C_2$. For sake of clearness we will use the following replacement of the unknowns in (7), (8) and (9): $K_{-1,i} = y_i, K_{0,i} = z_i, K_{1,i} = u_i, K_{2,i} = v_i$, $X_{0,i} = \chi_i, X_{1,i} = \chi'_i, X_{2,i} = \chi''_i, T_{0,i} = t_i, T_{1,i} = t'_i, T_{2,i} = t''_i$. Then the system of equations consisting of (7), (8) and (9) can be rewritten as $$\chi_0 = y_0 * y_0$$

$$z_0 = \chi_0$$

$$\chi_1 = y_1 * \chi_0$$

$$z_1 = \chi_1$$

$$\ldots$$

$$\chi_{m-2} = y_{m-2} * \chi_{m-3}$$

$$z_{m-2} = \chi_{m-2}$$

$$M_0 \oplus C_0 = y_{m-1} * \chi_{m-2}$$

$$t_{m-1} = ((\ldots (y_p \cdot \chi_0) \cdot \ldots) \cdot \chi_{m-2}) \cdot (M_0 \oplus C_0)$$

$$z_{m-1} = t_{m-1}$$

$$\chi_0' = z_0 * z_1$$

$$u_0 = \chi_0'$$

$$\chi_1' = z_1 * \chi_0'$$

$$u_1 = \chi_1'$$

$$\ldots$$

$$\chi_{m-2}' = z_{m-2} * \chi_{m-3}'$$

$$u_{m-2} = \chi_{m-2}'$$

$$M_1 \oplus C_1 = z_{m-1} * \chi_{m-2}'$$

$$t_{m-1}' = ((\ldots (y_{1+p} \cdot \chi_0') \cdot \ldots) \cdot \chi_{m-2}') \cdot (M_1 \oplus C_1)$$

$$u_{m-1} = t_{m-1}'$$

$$\chi_0'' = u_0 * u_2$$

$$v_0 = \chi_0''$$

$$\chi_1'' = u_1 * \chi_0''$$

$$v_1 = \chi_1''$$

$$\ldots$$

$$\chi_{m-2}'' = u_{m-2} * \chi_{m-3}''$$

$$v_{m-2} = \chi_{m-2}''$$

$$M_2 \oplus C_2 = u_{m-1} * \chi_{m-2}''$$

$t_{m-1}''=((\ldots(y_P*\chi_0'')*\ldots)*\chi_{m-2}'')\bullet(M_2 \oplus C_0)$ $v_{m-1}=t_{m-1}''$ (10)

After replacement of the unknowns $x_0, \ldots, x_{m-2}, x_0', \ldots x_{m-2}', x_0'', \ldots x_{m-2}'', t_{m-1}, t_{m-1}', t_{m-1}''$ by $z_0, \ldots, z_{m-2}, u_0, \ldots u_{m-2}, v_0, \ldots, v_{m-2}, z_{m-1}, u_{m-1}, v_{m-1}$ respectively, we obtain a new system of equations as it is given on the left-hand side of the following table, that is equivalent to the above system (10).

| Equations | Solutions | |
|---|---|---|
| (equivalent system to (10)) | Choose | Compute |
| $z_0 = y_0 * y_0$ | $y_0$ | $z_0$ |
| $z_1 = y_1 * z_0$ | $y_1$ | $z_1$ |
| $z_2 = y_2 * z_1$ | $y_2$ | $z_2$ |
| ... | ... | ... |
| $z_{m-2} = y_{m-2} * z_{m-3}$ | $y_{m-2}$ | $z_{m-2}$ |
| $M_0 \oplus C_0 = y_{m-1} * z_{m-2}$ | | $y_{m-1}$ |
| $z_{m-1} = ((\ldots(y_p \bullet z_0) \bullet z_1) \bullet \ldots \ldots) \bullet z_{m-2}) \bullet (M_0 \oplus C_0)$ | | $z_{m-1}$ |
| $u_0 = z_0 * z_1$ | | $u_0$ |
| $u_1 = z_1 * u_0$ | | $u_1$ |
| $u_2 = z_2 * u_1$ | | $u_2$ |
| ... | | ... |
| $u_{m-2} = z_{m-2} * u_{m-3}$ | | $u_{m-2}$ |
| $M_1 \oplus C_1 = z_{m-1} * u_{m-2}$ | | Check Point |
| $u_{m-1} = ((\ldots(z_{1+p} \bullet u_0) \bullet u_1) \bullet \ldots \ldots) \bullet u_{m-2}) \bullet (M_1 \oplus C_1)$ | | $u_{m-1}$ |
| $v_0 = u_0 * u_1$ | | $v_0$ |
| $v_1 = u_1 * v_0$ | | $v_1$ |
| $v_2 = u_2 * v_1$ | | $v_2$ |
| ... | | ... |
| $v_{m-2} = u_{m-2} * v_{m-3}$ | | $v_{m-2}$ |
| $M_2 \oplus C_2 = u_{m-1} * v_{m-2}$ | | Check Point |
| $v_{m-1} = ((\ldots(u_{2+p} \bullet v_0) \bullet v_1) \bullet \ldots \ldots) \oplus v_{n-2}) \bullet (M_2 \oplus C_2)$ | | $v_{m-1}$ |

Proof of Theorem 3 During the proof we will use the above table. In the system of equations (10) there are an unknown quasigroup operation *, 4m unknown variables and 3m equations. So, an adversary would have to assign arbitrary values to some of the unknown variables and then to try to solve the system. Previously, she/he would have to choose some quasigroup operation * on the set $Q=\{0, 1, \ldots, 15\}$. Let the adversary assign values to the unknowns $Y_0, Y_1, \ldots, Y_{m-2}$ (and that is noted in the column 'Choose'). Using the given values for the variables $Y_0, Y_1, Y_{m-2}$, she/he is able to compute the values for all other variables of (10). On the column 'Compute' it is presented the order of computing of the values of the variables $Z_0, \ldots, z_{m-2}, y_{m-1}, u_0, \ldots$ (presented top-down). Thus, she/he first computes $Z_0=Y_0*Y_0$ (Yo has assigned value), then $z_1=y_1*z_0$ ($y_1$ has assigned value and $z_0$ is computed), and so on until the value of $u_{m-2}$ is computed. Now, since $z_{m-1}$ and $u_{m-2}$ have already assigned values, she/he have to check if the equation $M_1 \oplus C_1 = z_m-1*u_{m-2}$ is satisfied, the situation denoted by Check Point in the above table. The check points make easier the attacks on the system in the following way. The adversary chooses a quasigroup and assigns values for $y_o, \ldots, y_{m-2}$. Then she/he at each check point checks if they are well chosen. When the answer is NO, she/he will choose new data for attack (new quasi group operation * and/or new values for Yo, . . . ,Ym-2). The answer YES does not mean that the data are well chosen, since it can happen accidentally. The adversary should gather several consecutive answers YES to be sure that the system is broken.

An adversary may choose another strategy, i.e. instead of assigning the values to the variables Yo, . . . ,Ym-2 she/he can assign values to some other variables. Nevertheless, she/he will have to assign values to m-1 variables and will obtain the same number of check points (one less than the number of counters).

The number of all possible trials that can be produced is the product of the number of possible quasigroup operations (about $2^{132}$) and the number of assignments of values for Yo, . . . Ym-2, and it is $16^{m-2} \geq 16^{62} = 2^{248}$. So, for breaking the system EdonX with probability greater than 0.5 an attacker should make at least $0.5 \cdot 2380 = 2190$ trials.

As described above, EdonX is an additive synchronous stream cipher characterized by its flexibility and mathematical provability of many of its components. We will now point out the consequences of these facts.

As to the flexibility of EdonX, we mentioned that the length n of the initial secret key of EdonX can be any positive integer and we suggested $32 \geq n \geq 256$; in fact, we presented our algorithms under these restrictions. A closer look on our algorithms will show that the above restrictions are superficies and instead of using 512 nibles we could design the algorithms in the same manner by using 1024, 2048, 128 or any other number of nibles. The importance of this fact is that EdonX can satisfy different security criteria, from an average one to extreme one; thus, a very suspicious user can use a secret key of 1K (or 1M) of nibles, i.e. 4K (or 4M) of bits. For higher security, a longer initial secret key should be chosen, but the number of computations depends linearly on the length of the key. So, by predicting the possible attackers and their computational power, one can design software and/or hardware of EdonX in such a way according to the needed security to be obtained.

The flexibility of the length of the secret key allows EdonX to be used in designing threshold security. Let's consider a trivial example when the key is shared between 3 persons A, B and C, a person alone does not have the complete key, and only any two of them have the complete key. Then we take a 192 nibles secret initial key $K=K_0 \| \ldots \| k_{191}$ and we distribute in this way: Person A obtains the part $K=K_0\| \ldots \| k_{127}$, person B the part $K=K_{64}\| \ldots \| k_{191}$ and the person C the part $K=K_0\| \ldots \| k_{63}, K=K_{127}\| \ldots \| k_{191}$. Each person does not know 64 nibles of the secret key and there are $16^{64}=2^{256}$ possible variation for completion of the secret key. Suitable secure designs for s out of p threshold system can be defined as well.

In our analysis of the security of EdonX we supposed the worst possible case for security, and that is when only the initial key is secret and the adversary can realize chosen plaintext/ciphertext attack. The security of the system becomes much stronger if we suppose that the initial quasigroup and the length of the initial key are secret too. Thus, if the initial quasigroup is secret, instead of about $(16!)^3 \approx 2^{132}$ autotopisms, the adversary has to consider all quasigroup operations of order 16, and the number of these is not known, but is larger than $10^{120} \sim 2^{400}$.

We can take that the length n of the initial key is secret too. In that case the attacker has to check several lengths n=k, n=k+1, n=k+2, . . . where k is not large (we can choose for example k=5 and suitable security can be obtained in some applications as well). If the attacker has the hardware or software implementation of EdonX and hence a possibility to compute the length n, we could add empty cycles during the computation of EdonX. The price for this additional security has to be paid by the time spent for the empty computations.

The specialty of the design of EdonX in a preferred embodiment is that it operates on 4-bit registers and uses two fixed lookup table that are quasigroups of order 16 that can be stored in only 256 bytes. Together with the internal memory and the execution code of the algorithms, EdonX can be implemented in less then 1 Kb. Thus, EdonX is suitable for hardware implementation as embedded system in chip cards with extremely small amount of memory, i.e. less then 1 KB memory.

One of the main divisions in the nature of the ciphers is the division of steam ciphers and block ciphers. Block ciphers always give the same clock ciphertext for the same input block of plaintext, since they use a fixed set of transformations. On the other hand, the stream ciphers give different outputs for the same sequences of plaintext because they use transformations that vary by every iteration.

In another aspect of the present invention, EdonY is a self synchronized stream cipher based on the properties of quasigroup string transformations, and that is how many of its performances are mathematically provable. EdonY, in preferred embodiments, provides a cryptographically strong and highly qualitative stream cipher. An important advantage of EdonY is the flexibility of its design, since it can work on any n-bits letter alphabet, for n=2, 3, 4, . . . . Its versions for 5 bits letters alphabet are suitable to be used for embedded systems, since they can be implemented in less than 2 Kb memory space.

EdonY is a flexible self-synchronized stream cipher with provable security that transforms an input stream of r-tuples of bits for each $r \geq 5$. The length of the key of EdonY is variable and can be any string of n r-tuples and we propose $n \geq 32$ for security reasons. EdonY is defined by using quasigroup string transformations and its security is based on the mathematical properties of quasigroups and quasigroup string transformations. The design of EdonY uses a quasigroup of order $2^r$ and for r=5 EdonY is suitable for hardware implementation in embedded systems.

EdonY is defined by using quasigroup operations and quasigroup string transformations, as defined above. Equivalent to the quasigroup definition is the conjunction of the cancellation law and the existence of solutions x, y of the equations $a*x=b$, $y*a=b$ for each $a,b \in Q$.

As with EdonX, Proposition 1, above will be used in proving the security of EdonY.

As an example, take Q={0, 1, 2, 3} and let the quasigroup (Q, *) and its parastrophe (Q, \) be given by the multiplication scheme in the table below.

| * | 0 | 1 | 2 | 3 | \ | 0 | 1 | 2 | 3 |
|---|---|---|---|---|---|---|---|---|---|
| 0 | 2 | 1 | 0 | 3 | 0 | 2 | 1 | 0 | 3 |
| 1 | 3 | 0 | 1 | 2 | 1 | 1 | 2 | 3 | 0 |
| 2 | 1 | 2 | 3 | 0 | 2 | 3 | 0 | 1 | 2 |
| 3 | 0 | 3 | 2 | 1 | 3 | 0 | 3 | 2 | 1 |

Consider the string $\alpha$=1 0 2 1 0 0 0 0 0 0 0 0 1 1 2 1 0 2 2 0 1 0 1 0 3 0 0 and choose the leader 0. Then by the transformations $e_{0,*}$ and $d_{0,*}$ we will obtain the following transformed strings $e_{0,*}(\alpha)$ and $d_{0,*}(\alpha)$:

$e_{0,*}(\alpha)$=13221302130210112111330131 30
$d_{0,*}(\alpha)$=13023222222221012303113133 02.

We present four consecutive applications of the e-transformation in the following table.

| leader | 1 0 2 1 0 0 0 0 0 0 0 0 1 1 2 1 0 2 2 0 1 0 1 0 3 0 0 = $\alpha$ |
|---|---|
| 0 | 1 3 2 2 1 3 0 2 1 3 0 2 1 0 1 1 2 1 1 1 3 3 0 1 3 1 3 0 = $e_{0,*}(\alpha)$ |
| 0 | 1 2 3 2 2 0 2 3 3 1 3 2 2 1 0 1 1 2 2 2 0 3 0 1 2 2 0 2 = $e_{0,*}^2(\alpha)$ |

-continued

| leader | 1 0 2 1 0 0 0 0 0 0 0 0 1 1 2 1 0 2 2 0 1 0 1 0 3 0 0 = $\alpha$ |
|---|---|
| 0 | 1 1 2 3 2 1 1 2 0 1 2 3 2 2 1 0 1 1 1 1 3 1 3 3 2 3 0 0 = $e_{0,*}^3(\alpha)$ |
| 0 | 1 0 0 3 2 2 2 3 0 1 1 2 3 2 2 1 0 1 0 1 2 2 0 3 2 0 2 1 = $e_{0,*}^4(\alpha)$ |

Now we apply four times the transformation $d_{0,\backslash}$ on the last obtained string $\beta=e_{0,*}^4(\alpha)$, as shown in the following table.

| leader 0 | 1 0 0 3 2 2 2 3 0 1 1 2 3 2 2 1 0 1 0 1 2 2 0 3 2 0 2 1 = $\beta$ |
|---|---|
| 0 | 1 1 2 3 2 1 1 2 0 1 2 3 2 2 1 0 1 1 1 1 3 1 3 3 2 3 0 0 = $d_{0,\backslash}(\beta)$ |
| 0 | 1 2 3 2 2 0 2 3 3 1 3 2 2 1 0 1 1 1 2 2 2 0 3 0 1 2 2 0 2 = $d_{0,\backslash}^2(\beta)$ |
| 0 | 1 3 2 2 1 3 0 2 1 3 0 2 1 0 1 1 2 1 1 1 1 3 3 0 1 3 1 3 0 = $d_{0,\backslash}^3(\beta)$ |
| 0 | 1 0 2 1 0 0 0 0 0 0 0 0 1 1 2 1 0 2 2 0 1 0 1 0 3 0 0 = $d_{0,\backslash}^4(\beta)$ |

One can notice that the starting distribution of 0, 1, 2 and 3 in $\alpha$: 16/28, 7/28, 4/28, 1/28 is changed to 7/28, 7/28, 10/28, 4/28 in $e_{0,*}^4(\alpha)$, hence the distribution became more uniform. Also, we have $\alpha = d_{0,\backslash}^4(\beta) = d_{0,\backslash}^4(e_{0,*}^4(\alpha))$ Proposition 2, above, still applies.

Several quasigroup operations can be defined on the set Q and let $*_1, *_2, \ldots, *_k$ be a sequence of (not necessarily distinct) such operations. We choose also leaders $l_1, l_2, \ldots, l_k \in Q$ (not necessarily distinct either), and then the compositions of mappings $$E = E_{l_1 \ldots l_k, *_1 \ldots *_k} = e_{l_1, *_1} \bigcirc e_{l_2, *_2} \bigcirc \ldots \bigcirc e_{l_k, *_k},$$

$$D = D_{l_1 \ldots l_k, *_1 \ldots *_k} = e_{l_1, *_1} \bigcirc e_{l_2, *_2} \bigcirc \ldots \bigcirc e_{l_k, *_k},$$

are said to be E- and D-transformations of Q+ respectively. By Proposition 2 E and D are permutations and the inverse of $E = E_{l_1 \ldots l_k, *_1 \ldots *_k} = e_{l_1, *_1} \bigcirc e_{l_2, *_2} \bigcirc \ldots \bigcirc e_{l_k, *_k}$ is the transformation $(E_k)^{-1} = D_{l_k \ldots l_1, *_k \ldots *_1} = d_{l_k, *_k} \bigcirc \ldots \bigcirc d_{l_2, *_2} \bigcirc d_{l_1, *_1}$, where $\backslash_i$ are the corresponding parastrophes of the operations $*_i$.

Since $D \bigcirc E = 1$ is the identity function, E can be used as an encryption function and D as an decryption function, and we will use just these functions in a preferred design of EdonY.

The proof that EdonY is self-synchronized will be a direct consequence of the following theorem.

Theorem 4 Let $E = E_{l_1 \ldots l_n, *_1 \ldots *_n}$ and $D = D_{l_n \ldots l_1, \backslash_n \ldots \backslash_1}$. Assume that $E(b_1 b_2 \ldots b_k) = c_1 c_2 \ldots c_k$ and $d \neq c_i$ for some fixed i. Then $$D(c_1 \ldots c_{i-1} d c_{i+1} \ldots c_k) = b_1 \ldots b_{i-1} d_1 \ldots d_{n+1} b_{i+n+1} \ldots b_k,$$

for some $d_1, \ldots, d_{n+1} \in A$.

Proof: We will take n=2, i.e. $E = E_{l_1, l_2, *_1, *_2}$ and $D = D_{l_2, l_1, \backslash_2 \backslash_1}$, for the matter of simplicity. The equality $E(b_1 b_2 \ldots b_k) = c_1 c_2 \ldots c_k$ means that for some $x_1, \ldots, x_n \in A$ we have $e_{l_2, *_2}(b_1 b_2 \ldots b_k) = x_1 x_2 \ldots x_k$ and $e_{l_1, *_1}(x_1 x_2 \ldots x_k) = c_1 c_2 \ldots c_k$. Then by the definition of the e-transformation we have $$l_2*_2 b_1 = \chi_1, \chi_1*_2 b_2 = \chi_2, \chi_2*_2 b_3 = \chi_3, \ldots, \chi_{k-1}*_2 b_k = \chi_k, \quad (4)$$

$$l_1*_1 \chi_1 = c_1, c_1*_1 \chi_2 = c_2, c_2*_1 \chi_3 = c_3, \ldots, c_{k-1}*_1 \chi_k = c_k. \quad (5)$$

Let $D(c_1 \ldots c_{i-1} d c_{i+1} \ldots c_k) = z_1 \ldots z_k$ for some $z_j \in A$. Then there are $y_1, \ldots, y_n \in A$ such that $d_{l_1, \backslash_1}(c_1 \ldots c_{i-1} d c_{i+1} \ldots c_k) = y_1 \ldots y_k$ and $d_{l_2, \backslash_2}(y_1 \ldots y_k) = z_1 \ldots z_k$. By the definition of the d-transformation and (5) we have:

$$y_1 = l_1 \backslash_1 c_1 = \chi_1, \ldots,$$

$$y_{i-1} = c_{i-2} \backslash_1 c_{i-1} = \chi_{i-1},$$

$$y_i = c_{i-1} \backslash_1 d,$$

$$y_{i+1} = d \backslash_1 c_{i+1},$$

$$y_{i+2}=c_{i+1}\backslash_1 c_{i+2}=\chi_{i+2}, \ldots,$$

$$y_k=c_{k-1}\backslash_1 c_k=\chi_k. \qquad (6)$$

$$z_1 z_2 \ldots z_k = d_{l_2\backslash_2}(y_1 y_2 \ldots 0_{y_k}) = d_{l_2\backslash_2}(\chi_1 \ldots \chi_{i-1} y_i y_{i+1} \chi_{i+2} \ldots \chi_k). \qquad (4)$$

Now, $z_1 z_2 \ldots z_k = d_{l_2\backslash_2}(y_1 y_2 \ldots 0_{y_k}) = d_{l_2\backslash_2}(\chi_1 \ldots \chi_{i-1} y_i y_{i+1} \chi_{i+2} \ldots \chi_k)$.(4) and (6) imply $$z_1 = l_2\backslash_2 \chi_1 = b_1, \ldots,$$

$$z_{i-1} = \chi_{i-2}\backslash_2 \chi_{i-1} = b_{i-1},$$

$$z_i = \chi_{i-1}\backslash_2 y_i,$$

$$z_{i+1} = d\backslash_1 c_{i+1},$$

$$z_{i+3} = \chi_{i+2}\backslash_2 \chi_{i+3} = b_{i+3}, \ldots,$$

$$z_k = \chi_{k-1}\backslash_2 \chi_k = b_k.$$

So, one error in the string $E(b_1 b_2 \ldots b_k)$ propagates to $n+1=2+1=3$ errors in the string $D(E(b_1 b_2 \ldots b_k))$. The following property of the function E will be used when we will discuss the security of EdonY.

Proposition 3 Let $(Q, *)$ be a quasigroup, a be an arbitrary string of Q+, and $E=E_{l_1 \ldots l_k, *_1 \ldots *_k}$. Then the string $\beta=E(\alpha)$ has uniform distribution of the letters, pairs of letters, ..., k-tuple of letters.

In the exemplary construction of EdonY we use a quasigroup of order 32 (defined on 5-bits letters). However, quasigroups of order 64, 128, ... can be used as well, where only slight modification of the con-struction should be made. In fact, any quasigroup of suitable large order can be used, and the security depends proportionally on the order of the quasigroup. Further on we take $Q=\{0, 1, 2, \ldots, 31\}$ and the construction will be made using a quasigroup operation • on Q. We take that $(Q,•)$ is a public quasigroup. The secret key K of EdonY is stored in n internal variables $K_i$, i.e. $K=K_0 K_1 \ldots K_{n-1}$ and the variables $K_i$ have values in the range $\{0, 1, \ldots, 31\}$. The i-th value of K will be also denoted by K[i] ($=K_i$). We take that the length of the key K is n≧32, i.e. the key has at least 160 bits. As it is always the case, larger key-length means higher security, the price being paid by slower performances of the system; the same is true for the order of the quasigroup. We emphasize that this flexibility of the design is one of the best characteristics of EdonY.

The principal steps of the EdonY algorithm are the following. By using the quasigroup $(Q,•)$ and the initial secret values of the key K we produce an unknown autotope $(Q,*)$ of $(Q,•)$. We encrypt the input message, i.e. the plaintext $M=M_0 M_1 M_2 \ldots$, where $M_i$ are 5-bits letters, letter by letter as follows. First we multiply M by the values of K and we obtain an auxiliary plaintext $B=B_0 B_1 B_2 \ldots$, where $$B_i = M_i * K_{i+[\frac{n}{2}] \bmod n}, i = 0, 1, 2, \ldots$$

Then we apply on B the E-transformation $E+E_{K_0 K_1 \ldots K_n}, ** \ldots * = e_{K_0,*} \bigcirc \ldots \bigcirc e_{K_{n-1},*}$ and the obtained string $C=E(B)=C_0 C_1 C_2 \ldots$ is the ciphertext of M. Having a ciphertext C, the auxiliary plaintext B is recovered by applying the D-transformations $D=D_{K_{n-1} \ldots K_0 \backslash \ldots \backslash} = d_{K_{n-1}, \backslash} \bigcirc \ldots \bigcirc d_{K_0, \backslash}$, on C, i.e. B D(C). Finally, the original plaintext message $M=M_0 M_1 M_2 \ldots$ is obtained from the auxiliary plaintext $B=B_0 B_1 B_2 \ldots$ letter by letter as $$M_i = B_i / K_{i+[\frac{n}{2}] \bmod n}, i = 0, 1, 2, \ldots$$

The EdonY encryption algorithm and decryption algorithm, as shown in the following tables, are precisely defined by the following procedures, where $M=M_0 M_1 M_2 M_3$ ($C=C_0 C_1 C_2 C_3 \ldots$) is the input (output) string of the encryption algorithm and $C=C_0 C_1 C_2 C_3 \ldots$ ($M=M_0 M_1 M_2 M_3 \ldots$) is the input (output) string of the decryption algorithm. The variables X and Y in the decryption algorithm are auxiliary 5-bits variables.

---

EdonY encryption algorithm

Phase 1. Initialization

From the secret initial key K of length n
obtain the new working key and the new quasigroup
$(Q,*) \leftarrow \text{Autotope}(Q,•)$.

Phase 2. Encryption

1. Counter ← 0; $p = \lfloor \frac{n}{2} \rfloor$;
2. $K_0 \leftarrow K_0 * (M_{Counter} * K_{Counter+p \bmod n})$
3. For i = 1 to n − 1 do
    begin
        $K_i \leftarrow K_i * K_{i-1}$;
    end;
4. Output: $C_{Counter} = K_{n-1}$;
5. Counter ← Counter + 1;
6. Go to 2;

---

EdonY encryption algorithm

Phase 1. Initialization

From the secret initial key K of length n
obtain the new working key and the new quasigroup
$(Q,*) \leftarrow \text{Autotope}(Q,•)$.

Phase 2. Decryption

1. Counter ← 0; $p = \lfloor \frac{n}{2} \rfloor$;
2. $X \leftarrow K_{n-1}$
   $K_{n-1} \leftarrow C_{Counter}$;
3. for i = n − 2 down to 0 do
    begin
        $Y \leftarrow K_i$
        $K_i \leftarrow X \backslash K_{i+1}$;
        $X \leftarrow Y$
    end;
4. Output: $M_{Counter} = (X \backslash K_0)/K_{Counter+p \bmod n}$;
5. Counter ← Counter + 1;
6. Go to 2;

---

As with EdonX, the Initialization phase uses a secret working quasigroup $(Q, *)$ to be produced from the secret initial key and the public quasigroup $(Q,•)$ as well as working key K. Now we suppose that the length n of the key (in 5-bit letters) is bounded by 32≦n≦510, since we want to represent the number n as a two 5-bit letter string $b_9 b_8 b_7 b_6 b_5 \| b_4 b_3 b_2 b_1 b_0 = n_1 \| n_2$, where $b_9 b_8 b_7 b_6 b_5 b_4 b_3 b_2 b_1 b_0$ is the binary representation of n. Here $\|$ denotes concatenation of strings. (Of course, the algorithm can be redesigned for any length n in a straightforward way.)

The initialization phase, similar to that used for EdonX, is described by the following algorithm:

Initialization of EdonY

Phase 1. Input of initial key
    1. Input: n - the initial length of the secret key ($32 \leq n \leq 510$)
       and the initial secret value of the key
       $K = K_0 || K_1 || \ldots || K_{n-1}$    ($K_i$ are 5-bits letters)
Phase 2. Padding the key
    2. Set $K \leftarrow K_{in} || n_1 || n_2$
       where $n_1$ are the most significant and
       $n_2$ are the least significant 5-bits letter of n.
Phase 3. Expanding the key to 512 5-bits letters
    3. Set $K_{ex} = K || K || \ldots || K || K'$
       where K' consists of the first l 5-bits letters of $K_{in}$
       such that the total length of $K_{ex}$ is 512 5-bits letters.
Phase 4. Transformation of $K_{ex}$ with the given
                 quasigroup (Q, •) of order 32
    4. For i = 0 to 511 do
       begin
          Set leader = K[i mod (n + 2)];
          $K_{ex} \leftarrow E_{leader \ldots leader, \bullet \ldots \bullet}(K_{ex})$;
          $K_{ex} \leftarrow \text{RotateLeft}(K_{ex})$;
       end;
Phase 5. Transformation (Q, *) ← Autotope(Q, •)
    5. (Q, *) ← (Q, •);
       For i = 0 to 511 step 8 do
       begin
          Set $row_1 = K_{ex}[i]$; Set $row_2 = K_{ex}[i + 1]$;
          (Q, *) ← SwapRows(Q,$row_1$,$row_2$);
          Set $column_1 = K_{ex}[i + 2]$; Set $column_2 = K_{ex}[i + 3]$;
          (Q, *) ← SwapColumns(Q,$column_1$,$column_2$);
          Set $\gamma = (K_{ex}[i + 4], K_{ex}[i + 6])$;
          (Q,*) ← $\gamma$(Q,*);
       end;
Phase 6. Setting the working key K (the last n 5-bits letters of $K_{ex}$)
    6. Set $K = K_0 || K_1 || \ldots || K_{n-1} = K_{ex}[512 - n] || \ldots || K_{ex}[511]$ The functions RotateLeft($K_{ex}$), SwapRows, and Swapcolumns operate as described above regarding EdonX.

At the end of the initialization phase, we obtain two working structures that are not known to the adversary. Namely, a first unknown structure is the working quasigroup (Q,*) that is an autotope of the original quasigroup Q(•) and it is one of about $(32!)^3 \approx 2^{352}$ autotopes, and a second unknown structure is the working key K of length 5n bits that replaces the original initial secret key K. (We emphasize that the exact number of the autotopism classes of quasigroups of order 32 is not known.)

It follows from Theorem 4 that EdonY is self synchronized, since one error in the cipher-text C will propagate n+1 errors in the recovered plaintext M' i.e. the original message M and M' will differ in n+1 consecutive letters. If there will be a string of errors in C of length r then the recovered plaintext will have r+n errors. One can see from Example 1 in which way the processes of EdonY encryption and decryption work.

Security of preferred embodiments of EdonY will now be discussed. We assume that the adversary is capable to execute chosen plaintext/ciphertext attack, i.e. she/he can choose a plaintext and can obtain the corresponding ciphertext. We assume further that the initial value of the secret key K as well as the internal states of the cipher: working key K, working quasigroups (Q,*) and the values of X and Y are not known to the adversary and that she/he can not access them physically. We consider that the adversary will have broken Edon Y if she/he will be able to reconstruct in a feasible time the working key K and the working quasigroup (Q,*).

We will now show that without the knowledge of the initial key $K_{in}$ there is no computationally feasible way of knowing the working quasigroup (Q,*) and the starting values of the working key K In the following, we give proofs that the adversary cannot effectively obtain information of the part of the working key K and quasigroup (Q,*).

Regarding the initialization phase, the initial value of the secret key, by our assumptions, can have a length at least 32 5-bits letters, hence 160 bits. The padding of the initial key by the information of its length, as stated above, is to eliminate the possibility of obtaining the same result with two different initial keys. The exemplary expanded key $K_{ex}$ has length of 512 5-bits letters. It is transformed 512 times by the publicly known quasigroup (Q,•) of order 32.

As with EdonX, it can be shown that the distributions of letters, pairs of letters, triples of letters, . . . in the key $K_{ex}$ in Edon Y are uniform. The uniformity of the distribution of the keys $K_{ex}$ imply the uniformity of distributions of the working keys K. Since the length of K is at least 32 5-bits letters, the adversary can guess the working key with probability not larger than $2^{-160}$.

Further, as with EdonX, it can be shown that the working quasigroup (Q,*) is a randomly obtained autotope of the initial quasigroup (Q,•). Since there are about $32!^3 \approx 2^{352}$ autotopisms on a quasigroup of order 32, we found that the working quasigroup can only be guessed with a probability of about $2^{-352}$.

As to the encryption/decryption phase, we have determined that the working quasigroup (Q,*) and the starting working key $K = K_0 K_1 \ldots K_{n-1}$ are not known to the adversary, i.e. it is computationally infeasible to be recovered. The statistical kinds of attacks by using the distributions of s-tuples of letters are also computationally infeasible by Proposition 3. The next theorem implies that by known ciphertext attack it is computationally infeasible for the key and the quasigroup to be recovered, hence they can only be guessed with probability less than $2^{-1000}$ (the number of quasigroups of order 32 is not known, but it is much larger than $2^{1000}$).

Theorem 5 Given a ciphertext C, for each quasigroup operation * on $Q=\{0, 1, \ldots, 31\}$ and each key $K = K_0 K_1 \ldots K_{n-1}$ there is a plaintext M such that C is its ciphertext.

Proof: Let $C = C_0 C_1 C_2 \ldots, C_i \in Q$ be given and let us choose an arbitrary quasigroup operation * on Q and arbitrary key $K = K_0 K_1 \ldots K_{n-1}$. The encryption process of EdonY can be represented by the next table (note that $$p = \left\lfloor \frac{n}{2} \right\rfloor$$

is a constant).

|           | $M_0$       | $M_1$         | $M_2$         |     |
|           | $M_0/K_p$   | $M_1/K_{1+p}$ | $M_2/K_{2+p}$ |     |
|-----------|-------------|---------------|---------------|-----|
| $K_0$     | $T_0$       | $S_0$         | $R_0$         | ... |
| $K_1$     | $T_1$       | $S_1$         | $R_1$         | ... |
| .         | .           | .             | .             |     |
| .         | .           | .             | .             |     |
| .         | .           | .             | .             |     |
| $K_{n-3}$ | $T_{n-3}$   | $S_{n-3}$     | $R_{n-3}$     | ... |
| $K_{n-2}$ | $T_{n-2}$   | $S_{n-2}$     | $R_{n-2}$     | ... |
| $K_{n-1}$ | $C_0$       | $C_1$         | $C_2$         | ... |

Since $C_i, K_j$ are given, we can compute the other variables of the table step by step as follows:

$$K_{n-1} * T_{n-2} = C_0 \Longrightarrow T_{n-2} = K_{n-1} \backslash C_0$$

$$K_{n-2} * T_{n-3} = T_{n-2} \Longrightarrow T_{n-3} = K_{n-2} \backslash T_{n-2}$$

. . .

$$K_1 * T_0 = T_1 \Longrightarrow T_0 = K_1 \backslash T_1$$

$$K_0 * (M_0/K_p) = T_0 \Longrightarrow M_0/K_p = K_0 \backslash T_0$$

Now we have $M_0 = (M_0/K_p) * K_p$ i.e. we found the first letter of the message M whose encryption is $C_0$. Using the known values of $T_i$ we can repeat the preceding computations for getting the values for the variables $S_{n-2} = C_0 \backslash C_1, S_{n-3} = T_{n-2} \backslash S_{n-2}, \ldots$, resulting with a value for M, that is encrypted by $C_1$. The same way we can find the values for $M_2, M_3, \ldots$ Another possible statistical kind of attack that can be realized on Edon Y under known ciphertext is by producing a dictionary of n+1-tuples of ciphertext, where n is the length of the key. We will use the next table to explain how that kind of attack can be realized, and we take n=3 for matter of simplicity. We suppose that the adversary has a ciphertext $C_0$ $C_1$ ... $C_i$ $C_{i+1}$ ...

| ... | ... | ... | $y_1 \backslash y_2 = z_1$ | $y_2 \backslash y_3 = z_2$ |
|---|---|---|---|---|
| ... | ... | $x_1 \backslash x_2 = y_1$ | $x_2 \backslash x_3 = y_2$ | $x_3 \backslash x_4 = y_3$ |
| ... | $C_i \backslash C_{i+1} = x_1$ | $C_{i+1} \backslash C_{i+2} = x_2$ | $C_{i+2} \backslash C_{i+3} = x_3$ | $c_{i+3} \backslash c_{i+4} = x_4$ |
| $C_i$ | $C_{i+1}$ | $C_{i+2}$ | $C_{i+3}$ | $C_{i+4}$ |

Then at first $x_1, x_2, \ldots$ after that $y_1, y_2, \ldots$ and finally $z_1, z_2, \ldots$ can be computed. Hence the values $z_1, z_2, z_3, \ldots$ are uniquely determined by the substrings of the ciphertext $c_i c_{i+1} c_{i+2} c_{i+3}, c_{i+1} c_{i+2} c_{i+3} c_{i+4}, c_{i+2} c_{i+3} c_{i+4} c_{i+5}, \ldots$. This implies that the distribution of the substrings of length n+1=330 1=4 in C is equal to the distribution of letters in the string $B = B_0 B_1 B_2, \ldots$ where $$B_i = M_i / K_{i+[\frac{n}{2}] \bmod n},$$

and from that some knowledge of the distribution of the plaintext M can be distilled. So, the adversary has to produce a dictionary of n+1-tuples of the ciphertext letters. The dictionary in case n=3 will consist of $32^4 = 2^{20}$ words and can be put in memory. Since we took $n \geq 32$, the dictionary for EdonY will need at least $32^{33} = 2^{165}$ words and it cannot be realized by the law of physics. Thus we proved the following theorem.

Theorem 6 The dictionary kind of statistical attack on EdonY is computationally infeasible.

Next we will prove that chosen plaintext/ciphertext attack on EdonY is computationally infeasible as well. Let assume that the adversary can produce an arbitrary pair (M,C)= $((M_0 M_1 \ldots), (C_0 C_1 \ldots))$ of plaintext/ciphertext strings. Then she/he can extract information from the following table, where we took n=4 for reason of simplicity.

|  | $M_0$ | $M_1$ | $M_2$ | $M_3$ | $M_4$ | $M_5$ | ... |
|---|---|---|---|---|---|---|---|
|  | $M_0/K_2$ | $M_1/K_3$ | $M_2/K_0$ | $M_3/K_1$ | $M_4/K_2$ | $M_5/K_3$ | ... |
| $K_0$ | $z_0$ | $z_1$ | $z_2$ | $z_3$ | $z_4$ | $z_5$ | ... |
| $K_1$ | $y_0$ | $y_1$ | $y_2$ | $y_3$ | $y_4$ | $y_5$ | ... |
| $K_2$ | $x_0$ | $x_1$ | $x_2$ | $x_3$ | $x_4$ | $x_5$ | ... |
| $K_3$ | $C_0$ | $C_1$ | $C_2$ | $C_3$ | $C_4$ | $C_5$ | ... |

The variables $K_i, x_i, y_i, z_i$ are unknown and we can infer the following system of quasigroup equations, where the operation "·" on $Q = \{0, 1, 2, \ldots, 31\}$ is unknown:

$$K_0 \cdot (M_0/K_2) = z_0, \quad z_0 \cdot (M_1/K_3) = z_1, \quad z_1 \cdot (M_2/K_0) = z_2, \ldots$$
$$K_1 \cdot z_0 = y_0, \quad y_0 \cdot z_1 = y_1, \quad y_1 \cdot z_2 = y_2, \ldots$$
$$K_2 \cdot y_0 = x_0, \quad x_0 \cdot y_1 = x_1, \quad x_1 \cdot y_2 = x_2, \ldots$$
$$K_3 \cdot x_0 = C_0, \quad C_0 \cdot x_1 = C_1, \quad C_1 \cdot x_2 = C_2, \ldots$$

The information that can be inferred from the equations $$C_0 \cdot x_1 = C_1, C_1 \cdot x_2 = C_2, C_2 \cdot x_3 = C_3, C_3 \cdot x_4 = C_4, \ldots$$

of the above system is the following. Since the plaintext M can be chosen arbitrary, the ciphertext C will contain as substrings all possible $32^2$ pairs ab, where $(a,b) \in Q^2$. From the equation $C_i \cdot x_{i+1} = C_{i+1}$ we know that the element $C_{i+1}$ is positioned in the multiplication table of the quasigroup $(Q, \bullet)$ in the $C_i$-th row and the $x_{i+1}$-th column. In other words, if the multiplication in $(Q, \bullet)$ is denoted by $i \cdot j = q_{i,j}$, then $q c_{i, x_{x+1}} = C_{i+1}$. It follows that we have complete information for the columns of the multiplication table of $(Q, \bullet)$. For example, we do not know the value of $x_1$, but we know the values of. $q_{0, x_1} = 0 \cdot x_1$, $q_{1, x_1} = 1 \cdot x_1, q_{2, x_1} = 2 \cdot x_1, \ldots q_{31, x_1} = 31 \cdot x_1$ In such a way, we can extract 32 different variables with completed columns in the multiplication table of $(Q, \bullet)$. Let us take for simplicity $i_j = j$, and we have the following multiplication table of $(Q, \bullet)$:

| · | $x_0$ | $x_1$ | $x_2$ | ... | $x_{31}$ |
|---|---|---|---|---|---|
| 0 | $q_{0,x_0}$ | $q_{0,x_1}$ | $q_{0,x_2}$ | ... | $q_{0,x_{31}}$ |
| 1 | $q_{1,x_0}$ | $q_{1,x_1}$ | $q_{1,x_2}$ | ... | $q_{1,x_{31}}$ |
| 2 | $q_{2,x_0}$ | $q_{2,x_1}$ | $q_{2,x_2}$ | ... | $q_{2,x_{31}}$ |
| . | . | . | . | ... | . |
| . | . | . | . | ... | . |
| . | . | . | . | ... | . |
| 31 | $q_{31,x_0}$ | $q_{31,x_1}$ | $q_{31,x_2}$ | ... | $q_{31,x_{31}}$ |

Since $x_i$ are unknown, the original multiplication table of $(Q,*)$ is a permutation of the columns of the multiplication table of $(Q, \bullet)$ Let us assign values of the unknowns $x_0, x_1, \ldots, x_{31}$. Then, from the equations system above we can compute step by step the uniquely determined values of the unknowns $K_3 = c_0/x_0, y_1 = x_0 \backslash x_1, y_2 = x_1 \backslash x_2, y_3 = x_2 \backslash x_3, \ldots, z_2 = y_1 \backslash y_2, z_3 = y_2 \backslash y_3, z_4 = y_3 \backslash y_4, \ldots$ Now the values of the key can be computed by $K_1 = M_3/(z_2 \backslash z_3), K_2 = M_4 (z_3 \backslash z_4), K_3 = M_5/(z_4 \backslash z_5)$, $K_0 = M_6/(z_5 \backslash z_6), K_1 = M_7/(z_6 \backslash z_7)$ Since there are finitely many variables $K_i$ (in this simplified version we have only 4, but in a preferred application of EdonY there are n 32), the adversary has an opportunity to check if the assigned values of $x_0, x_1, \ldots, x_{31}$ are correct. Namely, if they are correct, then the equalities $M_3/(z_2 \backslash z_3) = M_7/(z_6 \backslash z_7)(=K_1), M_4/(z_3 \backslash z_4) = M_8/(z_7 \backslash z_8)(=K_2), \ldots$ should be satisfied. If they are not satisfied, the adversary should give another assignment to the unknowns $x_0, x_1, \ldots, x_{31}$ and to check again if they are correct, and so on. Since there are $32! \approx 2^{117}$ different possible assign-ments, we have the following theorem:

Theorem 7 Under chosen plaintext/ciphertext attach it is computationally infeasible for the quasigroup operation * or the key of Edon Y to be recovered.

As shown above, EdonY is a self synchronized stream cipher characterized by its flexibility and mathematical provability of many of its component. The self synchronization of EdonY is a consequence of Theorem 4. By this theorem, if we have a key length n than an error in the ciphertext will produce n+1 consecutive errors of the plaintext during the decryption process. The encryption and the decryption algorithms of EdonY are quite simple and of linear complexity, hence EdonY can be used for secure online communication (and it can be parallelized in an obvious way for obtaining faster communication if needed.)

An exemplary construction of EdonY uses a 5-bits letters alphabet, but it should be apparent how the encryption and decryption algorithms can be redesigned for m-bits letters alphabet. The flexibility of the design and the possibilities of choice of the wanted length of the key are very important properties of EdonY. Thus, EdonY can be used in designing threshold security as well. Let's consider a trivial example when the key is shared between 3 persons A, B and C, a person alone does not have the complete key, and only any two of them have the complete key. Then we take a secret initial key $K=K_0\|\ldots\|K_{191}$ of length 192 and we distribute it in this way: Person A obtains the part $K=K_0\|\ldots\|K_{127}$, person B the part $K=K_{64}\|\ldots vk_{191}$ and the person C the part $K=K_0\|\ldots\|k_{63}\|K_{127}\|\ldots\|K_{191}$. Each person does not know 64 5-bits letters $K_i$ of the secret key and there are $32^{64}=2^{320}$ possible variation for completion of the secret key. Suitable secure designs for s out of p threshold system can be defined as well.

The preferred design of EdonY allows its hardware implementation in embedded system with small amount of memory, i.e. less then 2 Kb memory, since quasigroup of order 32 can be stored in 1 Kb.

We note that additional security of EdonY can be obtained if the initial quasigroup of order 32 is secret too, since the number of such quasigroups is much larger than $2^{1000}$.

In another aspect of the present invention we introduce a notion of a new type of stream cipher: Totaly Asynchroonous Stream Cypher (TASC), and demonstrate several benefits for these ciphers. As described above, stream ciphers are divided by their way of acting upon a received error in communication between two parties that use that stream cipher. If the decrypted stream doesn't suffer from an error occurred during the transmission (except the error on the actual erroneous byte or block of bytes) then we speak about synchronous stream cipher. On the other hand, if the error affects the decrypted stream we speak about asynchronous stream cipher. However, all asyn-chronous ciphers defined in the literature have the property that they are self-synchronous. Namely, after several transmitted blocks that will be decrypted erroneously, the correct decryption of the stream is established again. From the point of view of ensuring the correct stream of data to start to flow again, self-synchronization is a very useful property. However, both synchronous and self-synchronizing stream ciphers suffer from possible attacks of altering the data by the adversary which monitors the line of communication (suffers by so-called dynamic attacks). Thus, additional mechanisms for ensuring the data integrity may need to be used, when using cryptographic primitives such as stream cipher (synchronous or self-synchronizing).

General properties of the synchronous cipher EdonX can be used to provide a cipher that cannot recover from an error introduced in the process of communication, but still having the important properties that its secure provability is guaranteed by the same mathematical theorems applied for the synchronous version. Although the property of being totally asynchronous stream cipher can be seen as a disadvantageous one, there are in fact several useful applications of such ciphers: provable secure stream cipher that can guarantee data integrity, authentication and error correction.

A Synchronous stream cipher has been defined above as one in which the keystream is generated independently of the plaintext message and of the ciphertext. A self-synchronizing or asynchronous stream cipher, on the other hand, is one in which the keystream is generated as a function of the key and a fixed number of previous ciphertext digits.

The encryption function of a self-synchronizing stream cipher can be described by the equations:

$$\sigma_i=(c_{i-t}, c_{i-t+1},\ldots,c_{i-1}), z_i=g(\sigma_i,k), c_i=h(z_i,m_i)$$

where $\sigma_0=(c_{-t}, c_{-t+1},\ldots,c_{-1})$ is the (non-secret) initial state, k is the key, g is the function which produces the keystream $z_i$, and h is the output function which combines the key stream and plaintext $m_i$ to produce ciphertext $c_i$.

By contrast, a Totally Asynchronous Stream Cipher is defined as one in which the keystream is generated as a function of the intermediate key and a fixed number of previous plaintext digits.

The encryption function of a totally asynchronous stream cipher can be described by the equations:

$$k_{i+1}=f(k_i,m_i), c_i=h(k_i,m_i)$$

where $k_0$ is the initial secret state of the key, f is the key next-state function, and h is the output function which non-linearily combines the key and plaintext $m_i$ to produce ciphertext $c_i$.

The decryption function of a totally asynchronous stream cipher can be described by the equations:

$$k_{i+1}=f^{-1}(k_i,c_i), m_i=h^{-1}(k_i,c_i)$$

So, from the definition it is clear that self-synchronizing and totally asynchronous stream cipher differ in a way how the keystream is generated. While for self-synchronizing stream ciphers keystream depends on a fixed number of previous ciphertext digits, the totally asynchronous stream cipher depends on a fixed number of previous plaintext digits. Here, a crucial question can be posed: what if the source of plaintext is with poor characteristics from randomness point of view? What if the stream of plaintext has very low entropy (in extreme situation the entropy to be 0). If the definition of totally asynchronous stream cipher is applied to the classical well-known stream ciphers using shift register techniques, and S-boxes, the result of such a totally asynchronous stream cipher would be a totally poor stream cypher that generates a keystream with short and predictable period. Thus, the main problem for designing a high qualitative totally asynchronous stream cipher is to design the stream cipher which keystream depends from a fixed number of previous plaintext digits, but still doesn't fall into short periodic circle, and doesn't produce keystream with poor randomness characteristics, even when the source of plaintext digits is with entropy 0. Below we illustrate a Totally Asynchronous Stream Cipher.

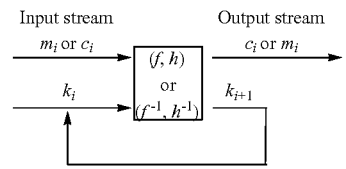

We give an exemplary possible implementation of a Totally Asynchronous Stream Cipher using Quasigroup String Transformations.

Given the definitions of a quasigroup and a Latin square provided above, and given the relation of isotopism and autopism provided above, it can be shown that any permutation on columns and rows of the Latin square L can be summarized in the following Lemma:

Lemma: Any permutation of rows and columns of a Latin square $L_{n\times n}$ which is associated with quasigroup $(Q,*)$, results in new Latin square $L_{n\times n}'$ which associated quasigroup $Q,*'$ is autotopic to the original quasigroup $(Q,*)$.

As a direct consequence of this Lemma we have that for each quasigroup $(Q,*)$ of order n there are up to $(n!)^2-1$ different autotopic quasigroups to $(Q,*)$.

Given a quasigroup $(Q,*)$ five new operations $*^{-1}, {}^{-1}*, {}^{-1}(*^{-1}), ({}^{-1}*)^{-1}, *^*$ on the set Q can be derived by:

$$*^{-1}(x,y)=z \Leftrightarrow x*z=y$$

$$^{-1}*(x,y)=z \Leftrightarrow z*y=x$$

$$^{-1}(*^{-1})(x,y)=z \Leftrightarrow *^{-1}(z,y)=x \Leftrightarrow z*x=y$$

$$(^{-1}*)^{-1}(x,y)=z \Leftrightarrow {}^{-1}*(x,z)=y \Leftrightarrow y*z=x$$

$$*^*(x,y)=z \Leftrightarrow y*x=z$$

The set $\text{Par}(*)=\{*, *^{-1}, {}^{-1}*, {}^{-1}(*^{-1}), ({}^{-1}*)^{-1}, *^*\}$ is said to be the set of parastrophes of *. Then, for each $g \in \text{Par}(*)$, $(Q,g)$ is a quasigroup too and $\text{Par}(*)=\text{Par}(g)$. Usually, for multiplicatively denoted quasigroup $(Q,*)$, instead of $*^{-1}, {}^{-1}*$ one writes \, / respectively, and calls them left and right parastrophes, as described above. Then $$x*y=z \Leftrightarrow y=x\backslash z \Leftrightarrow x=z/y.$$

Then the algebra $(Q,*,\backslash,/)$ satisfies the identities $$x\backslash(x*y)=y, (x*y)/y=x, x*(x\backslash y)=y, (x/y)**y=x$$

The methods of quasigroup string transformations are described above.

As with EdonX, EdonZ preferably operates on nibbles, i.e., on 4-bit variables. That is because it preferably uses a quasigroup $(Q,*)$ of order 16 for doing quasigroup string transformations on the streams of data. So, the values of the corresponding Latin square are represented by 4 bits. The same is for the values of the key K. It is stored in n=64 internal variables $K_i$, i.e. $K = K_0 K_1 \ldots K_{n-1}$ The variables $K_i$ also have values in the range $\{0, 1, \ldots, 15\}$.

EdonZ uses the initial value of the $K_{in}$ for the initialization phase. By the information stored in the $K_{in}$, EdonZ makes transformations on the initial quasigroup $(Q,*)$, and also transforms the values of $K_{in}$. The values of K will change also as processing of the stream will be performed. EdonZ uses also two temporal 4-bit variables T, and X EdonZ differs from synchronous EdonX in the way how the initial value of the variables X and T are set and how the final computation of X is done. However, in the decrypting phase EdonX doesn't use the left parastrophe of the $Q(*)$ since it is binary additive stream cipher, but EdonZ needs $Q\text{par}(*)$. A table illustrating a preferred operation of EdonZ is shown below.

TABLE 1

Totaly Asynchronous Stream Cipher

Phase 1. Initialization
From the initial key $K_{in}$ of length n
obtain the new working key K of
length 64 and new quasigroup
$(Q, *) \leftarrow \text{Autotope}((Q, *))$.

| Encryption. | Decryption. |
|---|---|
| Input: Key $k_0$ of length n and message M. | Input: Key $k_0$ of length n and message C. |
| Output: Message C. | Output: Message M. |
| 1) X ← InputNibble; | 1) X,T ← InputNibble; |
| 2) T ← 0; | 2) temp ← $K_{n-1}$; |
| 3) For i = 0 to n − 1 do | 3) For i = n − 1 downto 0 do |
|     X ← Q[$K_i$, X]; |     X ← Qpar[temp, X]; |
|     T ← T ⊕ X; |     T ← T ⊕ X; |
|     $K_i$ ← X; |     temp ← $K_{i-1}$; |
| 4) $K_{n-1}$ ← T; |     $K_{i-1}$ ← T; |

TABLE 1-continued

Totaly Asynchronous Stream Cipher

| 5) Output X; | 4) $K_{n-1}$ ← T; |
| 6) Go to 1; | 5) Output X; |
|  | 6) Go to 1; |

The operation ⊕ is the operation of exclusive or (XOR) on 4-bit variables.

A very important phase of the EdonZ algorithm is the Initialization phase. It preferably is the same as in EdonX and incorporates already known techniques in cryptographic algorithms such as padding a message, expanding a message and transforming the expanded message. In this situation the message is the secretly shared initial key $K_{in}$. The information from the expanded and transformed key then is used to transform the initially given quasigroup as well as to set the initial values for 64 nibbles (256 bits) of the working key K.

At the end of the initialization phase, we obtain two working structures that are not known to the adversary. Namely, a first unknown structure is the working quasigroup $(Q^*)$ that is an autotope of the original quasigroup $Q(\bullet)$ and it is one of about $(16!)^3 \approx 2^{132}$ autotopes, and a second unknown structure is the working key K of length 4m bits (m nibbles) that replaces original initial secret key $K_{in}$.

Another very significant property of EdonZ as a TASC can be stated with the following theorem:

Theorem 8 Let $M = M_1 M_2 \ldots M_\mu$ be a representation of M into sub-blocks $M_i$ where $M_1 = m_1 \ldots m_{i_1}, M_2 = m_{i_1+1} \ldots m_{i_2}$ and so on and let $(K_i, C_i) = T(K_{i-1}, M_i)$, where $K_0 = k_0$ is the initial key. Then, for any representation of M into sub-blocks, the resulting cipher text $C = c_1 c_2 \ldots c_l = C_1 C_2 \ldots C_\mu$ is the same.

The proof is straightforward by induction on the length of the message M.

The above theorem ensures that even though EdonZ is a stream cipher, we can process the input plaintext in smaller parts (blocks) and whatever representation of M on blocks we choose before encryption, the final cipher text will be the same. So blocks can be of one letter, of 4 letters or even of 100 letters, and the resulting cipher text will be the same.

Next, we will describe an example that will work on the principles of EdonZ, but for the simplicity of the explanation, instead of using preferred 16×16 quasigroups, we will continue to use the quasigroups of order 4. Moreover, instead of using an expanded key of the length 512, we will shorten it to the length of 16. The initial key can have the length from 1 to 15 thus it will be represented by two concatenated 2-bit letters from the range $\{0, 1, 2, 3\}$, and the working key will be of the length 4.

Let us suppose that the initial quasigroup $Q(*)$ is the same as the one given in EdonX Example 1 above, i.e. the quasigroup $Q(*)$ is:

| Q(*) | 0 | 1 | 2 | 3 |
|---|---|---|---|---|
| 0 | 2 | 1 | 0 | 3 |
| 1 | 3 | 0 | 1 | 2 |
| 2 | 1 | 2 | 3 | 0 |
| 3 | 0 | 3 | 2 | 1 |

Further let us set the initial value of the $K_{in} = 1\ 3\ 1$. Since the length of $K_{in}$ is 3, and since representation of the number 3 with two 2-bit letters is 03, we will pad $K_{in}$ and obtain $K_{in} = 1\ 3\ 1\ 0\ 3$. Then by concatenating $K_{in}$ several times we will obtain $K_{ex}$ of length 16 i.e. $K_{ex}$=1 3 1 0 3 1 3 1 0 3 1 3 1 0 3 1. Then by transforming the expanded key with $e_l$, transformations where leaders 1 will be cyclicly taken to be the values of padded $K_{in}$ we will obtain the final value of $K_{ex}$. In the following table we summarize those transformations.

| | | | | | | | | $K_{ex}$ | | | | | | | | |
|---|---|---|---|---|---|---|---|---|---|---|---|---|---|---|---|---|
| Leader | 1 | 3 | 1 | 0 | 3 | 1 | 3 | 1 | 0 | 3 | 1 | 3 | 1 | 0 | 3 | 1 |
| 1 | 0 | 3 | 3 | 0 | 3 | 3 | 1 | 0 | 2 | 0 | 1 | 2 | 2 | 1 | 2 | 2 |
| RotateLeft | 3 | 3 | 0 | 3 | 3 | 1 | 0 | 2 | 0 | 1 | 2 | 2 | 1 | 2 | 2 | 0 |
| 3 | 1 | 2 | 1 | 2 | 0 | 1 | 3 | 2 | 1 | 0 | 0 | 0 | 1 | 1 | 1 | 3 |
| RotateLeft | 2 | 1 | 2 | 0 | 1 | 3 | 2 | 1 | 0 | 0 | 0 | 1 | 1 | 1 | 3 | 1 |
| . | | | | | | | | | | | | | | | | |
| . | | | | | | | | | | | | | | | | |
| . | | | | | | | | | | | | | | | | |
| RotateLeft | 0 | 1 | 2 | 3 | 3 | 1 | 1 | 0 | 2 | 1 | 3 | 1 | 0 | 3 | 2 | 2 |
| 1 | 3 | 3 | 2 | 0 | 3 | 3 | 3 | 0 | 0 | 1 | 2 | 2 | 1 | 2 | 3 | 2 |
| RotateLeft | 3 | 2 | 0 | 3 | 3 | 3 | 0 | 0 | 1 | 3 | 2 | 1 | 2 | 3 | 2 | 3 |

With the last values of $K_{ex}$ we will start iteratively to swap the rows and columns of the initial quasigroup Q(*) to obtain its autotope. So, first we will swap the rows 3 and 2, then the columns 0 and 3, then again rows 3 and 3 (no swapping in this situation), and so on. The final result of all those swappings will give us the quasigroup Q(*) shown below (by which we can compute also its left parastrophe Qpar(*)).

| Q(*) | 0 | 1 | 2 | 3 | Qpar(*) | 0 | 1 | 2 | 3 |
|---|---|---|---|---|---|---|---|---|---|
| 0 | 3 | 0 | 2 | 1 | 0 | 1 | 3 | 2 | 0 |
| 1 | 1 | 2 | 0 | 3 | 1 | 2 | 0 | 1 | 3 |
| 2 | 0 | 3 | 1 | 2 | 2 | 0 | 2 | 3 | 1 |
| 3 | 2 | 1 | 3 | 0 | 3 | 3 | 1 | 0 | 2 |

The working key K will take the last 4 letters of $K_{ex}$ and be K=2 3 2 3. Now, let us encode some plaintext stream. Let the plaintext message be M={0,0,1,0,2,3,0,0, 1,2,0,0, 1,0,0,2,0, 0,0,3}. Steps of EdonZ encryption are shown in the following table.

| | $M_0$ | | | $M_1$ | | | $M_2$ | | | $M_3$ | | | |
|---|---|---|---|---|---|---|---|---|---|---|---|---|---|
| | K | X | T | K | X | T | K | X | T | K | X | T | ... |
| i | | 0 | 0 | | 0 | 0 | | 1 | 0 | | 0 | 0 | ... |
| 0 | 2 | 0 | 0 | 0 | 3 | 3 | 3 | 1 | 1 | 1 | 1 | 1 | 1 |
| 1 | 3 | 3 | 3 | 2 | 3 | 1 | 2 | 3 | 2 | 3 | 1 | 0 | |
| 2 | 2 | 1 | 3 | 1 | 0 | 1 | 0 | 1 | 2 | 1 | 3 | 2 | |
| 3 | 3 | 1 | 0 | 2 | 0 | 1 | 1 | 2 | 1 | 1 | 0 | 2 | |
| Output C = X | | 1 | | | 0 | | | 2 | | | 0 | | |

The initial value of $X=X_0$ is the value of the input stream nibble, and the initial value of T is always 0. The final value of $X=X_3$ is in fact the output nibble. Notice that we have the same situation for processing the new values of the key K. Namely it is always $K=K_0 K_1 K_2 K_3 = X_0 X_1 X_2 T_3$ where $T_3 = X_0 \oplus X_1 \oplus X_2 \oplus X_3$.

Next, the security of EdonZ will be analyzed. We will assume that the adversary will have the knowledge of one or more (plaintext, ciphertext) pairs. Further, we will also assume that the initial value of the key $K_{in}$ as well as the internal states of the cipher: working key K, working quasigroups Q(*) and Qpar(*) and values of X and T are not known to the adversary and that s(he) can not access them physically. We will consider that the adversary have broken EdonX if by knowing only the pairs of (plaintext, ciphertext) s(he) will be in a position to successfully reconstruct some part of the working key K.

In the first part of the analysis we will show that without the knowledge of the initial key $K_{in}$ there is no efficient way of knowing the initial value of the working key K and the working quasigroup Q(*). Then we will further analyze the EdonX in synchronous mode and in totally asynchronous mode.

For the security of initialization phase, since it preferably is the same as in EdonX, we can say that the initialization phase of EdonZ is cryptographically secure. As to the security of EdonZ in totally asynchronous mode, we will assume that the working quasigroup Q(*) is not known to the adversary (unless s(he)) makes an exhaustive search in the whole set of the autotopes of the originally given quasigroup Q(*) and that search is of order $2^{132}$. Also, we will assume that the adversary doesn't know the initial value of the working key K which is of length 64 nibbles i.e. 256 bits.

To prove that EdonZ is secure against chosen plaintext attack, let us assume that the adversary knows one (of many) pair of (plaintext, ciphertext) $(M,C)=((M_0\ M_1\ d\ \ldots\ ), C_0\ C_1\ \ldots\ )$. We will use the same notification as in the case of synchronous stream cipher, for the i-th generation of the nibbles in K and X:$K_{i,j}$ and $X_{i,j}$ respectively.

For the first pair of nibbles $(M_0, C_0)$ the adversary can obtain the following system of quasigroup equations:

$$K_{0,0} = M_0 = X_{0,0}$$

$$K_{0,1} = X_{0,0} = X_{0,1}$$

$$K_{0,2} = X_{0,1} * X_{0,2}$$

$$\ldots$$

$$K_{0,62} * X_{0,61} = X_{0,62}$$

$$K_{0,63} * X_{0,62} = X_{0,63}$$

$$X_{0,63} = C_0 \quad (4)$$

Knowing the value of $C_0 = X_{0,63}$ the adversary can try to solve the equation $K_{0,63} * X_{0,62} = X_{0,63}$. That equation has two unknown variables: $K_{0,63}$ and $X_{0,62}$. Since the quasigroup operation * is also unknown, the adversary can guess any of all 256 possible solutions. Setting those values as a guess, s(he) can continue upwards, seeking to find a solution for $K_{0,62} * X_{0,61} = X_{0,62}$ which can have also any of 256 possible solutions, and so on. Finally the adversary will reach the first equation $K_{0,0} * M_0 = X_{0,0}$ by which s(he) will find the value of $K_{0,0}$.

Here we have again a situation when the adversary has no other mechanism to know if s(he) made a good guess for the values of the key K and the quasigroup operations Q(*) unless s(he) runs through all equations (except the first one) which again gives the total number of guesses to be $2^{252} \times 2^{132} = 2^{384}$.

It is contemplated that a usage for EdonZ would be in implementing security protocols for checking integrity of the received data through a public channel of communication, without using two types of cryptographic algorithms: Stream Cipher and Message Authentication Codes (or Secure Hash Functions). The concept of TASC has the both properties. EdonZ, as a Quasigroup stream cipher along with EdonX and EdonY, also has the following properties:

Flexibility: A closer look on EdonZ initialization phase will show that instead of using maximum 64 nibbles of initial key it is straightforward to enlarge that number to 128, 1024, 2048 or any other number of nibbles. The importance of this fact is that EdonZ can satisfy different security criteria, from an average one to extreme one; thus, a very suspicious user can use a secret key of 1K (or 1M) of nibbles, i.e. 4K (or 4M) of bits without any need for redesigning of the algorithm. For higher security longer initial secret key should be chosen, but the number of computations depends linearly of the length of the key.

Additional security: The security of the system becomes much stronger if we suppose that the initial quasigroup and the length of the initial key are secret too. Thus, if the initial quasigroup is secret, instead of about $(16!)^3 \approx 2^{132}$ autotopisms, the adversary has to consider all quasigroup operations of order 16, and the number of these is not known, but is larger than $10^{120} \approx 2^{400}$.

As with EdonX, the preferred design of EdonZ operates on 4-bit registers and uses two fixed lookup tables that are quasigroups of order 16 that can be stored in only 256 bytes. Together with the internal memory and the execution code of the algorithms, EdonZ can be implemented in less then 1 Kb. Thus, EdonZ is suitable for hardware implementation as embedded system in chip cards with extremely small amount of memory, i.e. less then 1 KB memory.

Another potential usage of EdonZ or similar TASC stream ciphers is in the field of error correction algorithms. An exemplary Error Correction Algorithm, preferably using a TASC such as EdonZ will now be discussed. This method is a core method for generating random codes that can be decoded relatively quickly even if a significant portion of the received data is corrupted by errors. We show that there exists a class of codes, generated by quasigroup string transformations, which are almost random and are efficiently decodable. The initial numerical experiments indicate that these codes may significantly outperform Turbo and LDPC codes. For example, for SNR=0.0 dB, rate 1/2 and block length of only 288 bits, these codes give BER=$1.7 \times 10^{-4}$, and for SNR=$-0.5$ dB, rate 1/4 and block length of only 864 bits produce BER=$4.1 \times 10^{-5}$.

The non-constructive proof of the noisy-channel coding theorem shows that good block codes exist for any noisy channel, and moreover that nearly all block codes are good. However, writing down an explicit and practical encoder and decoder that are as good as proved by Shannon in his seminal work A Mathematical Theory of Communication is still an unsolved problem.

Recently, it has been recognized that two classes of codes, namely turbo codes and low-density parity-check (LDPC) codes, perform at rates extremely close to the Shannon limit. Turbo and LDPC codes are based on a similar philosophy: constrained random code ensembles, described by some fixed parameters plus randomness, decoded using iterative algorithms or message passing decoders.

Additional aspects of the present invention provide a class of error correcting codes with the following two properties: first, for an arbitrary codeword C, the distribution of substrings of C of length r is uniform, and second, the coding is iterative, which means that it is compositions of mappings defined on strings with small lengths. The first property ensures that our codes are almost random. Of course, decoding of random codes is an NP-complete problem. However, the second property ensures that our codes can be efficiently decoded. An instance of such codes implemented with quasigroup string transformations is described in detail. Our preliminary numerical simulations show that proposed codes outperform significantly corresponding turbo and LDPC codes.

To describe the preferred code, consider that a source of information produces a stream of symbols. The stream is partitioned into blocks of length $N_{block}$. Each of the possible $2 \, 2^{N_{block}}$ blocks is mapped to a codeword (i.e., a sequence of bits) of length $N > N_{block}$ the encoder and block by transmitted through the channel. Therefore, an error correcting code is defined as a mapping $T: \{0,1\}^{N_{block}} \to \{0,1\}^N$.

The code T according to embodiments of the present invention is defined as follows. Let M be a block of $N_{block}$ bits. First, we add zero bits and produce a block L of length N. Second, we rewrite L as $L = L_1 L_2 \ldots L_p$, where each $L_i$ is a block of s bits (we assume that $N = sp$). Third, the block L is mapped with a bijection to a block $C = C_1 C_2 \ldots C_p$ in the following way.

Let $k_{1,1}, k_{1,2}, \ldots, k_{1,n}$ be n initial strings each of length s. The block L is mapped to C as $$\begin{aligned}
&\text{For } i = 1, 2, \ldots p \\
&\quad b_{i,0} = L_i \\
&\quad \text{For } j = 1, 2, \ldots n \\
&\quad\quad b_{i,j} = f(k_{i,j}, b_{i,j-1}) \\
&\quad\quad k_{i+1,j} = g(k_{i,j}, b_{i,j-1}) \\
&\quad \text{End } j \\
&\quad C_i = b_{i,n} \\
&\text{End } i
\end{aligned} \quad (1)$$

where f and g are appropriate operations. Note that (1) defines uniquely our code T.

If we write $k^{(i)} = k_{i,1}, k_{i,2} \ldots k_{i,n}, i=1, 2, \ldots p+1$, then equation (1) defines also the following two maps. First, a map $F: A^n \times A^p \to A^n \times A^p$ such that $(k^{(p+1)}, C) = F(k^{(i)}, L)$, where $A = \{0, 1\}^1$ is a set of all strings with length 1. Second, a map $G_1: A^n \times A^1 \to A^n \times A^1$ such that $(k^{(i+1)}, C_i) = G_1(k^{(i)}, L_i)$ for each $i = 1, 2, \ldots, p$. For this reason we say that our code is iterative in two ways: (i) for each $L_i$, f is iterated n times to produce $C_i$; and (ii) $k^{(1)}$ is iterated p times to give $k^{(p+1)}$.

In the following instead of $G_1$ we will work with the map $G_4 \equiv G$. For simplicity only let assume that $p = 4r$. Then equation (1) can be rewritten as $$\left.\begin{array}{ll}\text{For } l = & 1, 2, \ldots r \\ & L^{(l)} = L_{4l-3}L_{4l-2}L_{4l-1}L_{4l} \\ \text{For } i = & 4l-3, 4l-2, 4l-1, 4l \\ & b_{i,0} = L_i \\ \text{For } j = & 1, 2, \ldots n \\ & b_{i,j} = f(k_{i,j}, b_{i,j-1}) \\ & k_{i+1,j} = g(k_{i,j}, b_{i,j-1}) \\ \text{End } j \\ & C_i = b_{i,n} \\ \text{End } i \\ & C(l) = C_{4l-3}C_{4l-2}C_{4l-1}C_{4l} \\ \text{End } l\end{array}\right\} \quad (2)$$

Equation (2) defines a map $G: A^n \times A^4 \to A^n \times A^4$ such that $k^{(4l+1)}, C^{(l)} = G(k^{(4l-3)}, L^{(l)})$, for $l = 1, 2, \ldots, r$.

In addition, our code has the following property: the code is almost random, which means that for every $M \in \{0,1\}^{N_{block}}$, the distribution of substrings of $C = T(M) \in \{0,1\}^N$ of length $k, 1 \leq k \leq n$, when N is large enough, is uniform.

Quasigroup operations and quasigroup string transformations are performed similarly to that for EdonX, EdonY, and EdonZ, for example.

Consider an alphabet (i.e. a finite set) A, and denote by $A^+$ the set of all nonempty words (i.e. finite strings) formed by the elements of A. The elements of $A^+$ will be denoted by $a_1 a_2 \ldots a_n$ rather than $(a_1, a_2, \ldots, a_n)$, where $a_i \in A$. Let * be a quasigroup operation on the set A.

For each $l \in A$ we define a function $e_{l,*}: A^+ \to A^+$ as follows. Let $a_i \in A, \alpha = a_1 a_2 \ldots a_n$. Then $$E_{l,*}(\alpha) = b_1 \ldots b_n \Leftrightarrow b_{i+1} = b_i + a_{i+1} \quad (3)$$

for each $i = 0, 1, \ldots, n-1$, where $b_0 = l$. The function $e_{l,*}$ is called an e-transformation of $A^+$ based on the operation * with leader $l$.

Several quasigroup operations can be defined on the set A and let $*_1, *_2, \ldots, *_k$ be a sequence of (not necessarily distinct) such operations. We also choose also leaders $l_1, l_2, \ldots, l_k \in A$ (not necessarily distinct either), and then the composition of mappings $$E_k = e_{l_1, *_1} \circ e_{l_2, *_2} \circ \ldots \circ e_{l_k, *_k}$$

is said to be an E-transformation of $A^+$. The function $E_k$ which is actually a permutation, have many interesting properties. A very significant one is the following:

Theorem 9: Consider an arbitrary string $\alpha = a_1 a_2 \ldots a_n \in A^+$, where $a_i \in A$, and let $\beta = E_k(\alpha)$. If n is large enough integer then, for each $1: 1 \leq l \leq k$, the distribution of substrings of $\beta$ of length $l$ is uniform. (For $l > k$ the distribution of substrings of $\beta$ of length $l$ may not be uniform.)

The coding has two general parts. In the example provided herein, we now describe a design of a 1/2 rate code only; the generalization to different coding rates is straightforward. Suppose that the message to be sent has the form $M = m_1 m_2 \ldots m_{18}$, where $m_i$ are nibbles (4-bit letters). In the first part, we add redundant information and obtain $L = L^{(1)} L^{(2)} L^{(3)} L^{(4)} L^{(5)} L^{(6)} L^{(7)} L^{(8)} L^{(9)}$, where $L^{(1)} = m_1 m_2 m_3 0_4$, $L^{(2)} = m_4 m_5 m_6 0_4$, $L^{(3)} = m_7 m_8 m_9 0_4$, $L^{(4)} = 0_4 0_4 0_4 0_4$, $L^{(5)} = m_{10} m_{11} m_{12} 0_4$, $L^{(6)} = m_{13} m_{14} m_{15} 0_4$, $L^{(7)} = m_{16} m_{17} m_{18} 0_4$, $L^{(8)} = 0_4 0_4 0_4 0_4$, $L^{(9)} = 0_4 0_4 0_4 0_4$ where $0_4$ is the string of 4 zeros (zero nibble). Therefore, each $L^{(i)}$ is a string of 16 bits. Since we add 18 zero nibbles, the rate of the code is 1/2. This is schematically shown on the following table.

TABLE I

CODES WITH RATES ½ AND ¼

| Rate ½ | | | | Rate ¼ | | | |
|---|---|---|---|---|---|---|---|
| $m_1$ | $m_2$ | $m_3$ | 0 | $m_1$ | $m_2$ | 0 | 0 |
| $m_4$ | $m_5$ | $m_6$ | 0 | $m_3$ | $m_4$ | 0 | 0 |
| $m_7$ | $m_8$ | $m_9$ | 0 | $m_5$ | 0 | 0 | 0 |
| 0 | 0 | 0 | 0 | 0 | 0 | 0 | 0 |
| $m_{10}$ | $m_{11}$ | $m_{12}$ | 0 | $m_6$ | $m_7$ | 0 | 0 |
| $m_{13}$ | $m_{14}$ | $m_{15}$ | 0 | $m_8$ | 0 | 0 | 0 |
| $m_{16}$ | $m_{17}$ | $m_{18}$ | 0 | $m_9$ | 0 | 0 | 0 |
| 0 | 0 | 0 | 0 | 0 | 0 | 0 | 0 |
| 0 | 0 | 0 | 0 | 0 | 0 | 0 | 0 |

TABLE II

A QUASIGROUP OF ORDER 16 THAT WE USED IN OUR EXPERIMENTS

| * | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 3 | c | 2 | 5 | f | 7 | 6 | 1 | 0 | b | d | e | 8 | 4 | 9 | a |
| 1 | 0 | 3 | 9 | d | 8 | 1 | 7 | b | 6 | 5 | 2 | a | c | f | e | 4 |
| 2 | 1 | 0 | c | c | 4 | 5 | f | 9 | d | 3 | 6 | 7 | a | 8 | b | 2 |
| 3 | 6 | b | f | 1 | 9 | 4 | e | a | 3 | 7 | 8 | 0 | 2 | c | d | 5 |
| 4 | 4 | 5 | 0 | 7 | 6 | b | 9 | 3 | f | 2 | a | 8 | d | c | c | 1 |
| 5 | f | a | 1 | 0 | e | 2 | 4 | c | 7 | d | 3 | b | 5 | 9 | 8 | 6 |
| 6 | 2 | f | a | 3 | c | 8 | d | 0 | b | e | 9 | 4 | 6 | 1 | 5 | 7 |
| 7 | e | 9 | c | a | 1 | d | 8 | 6 | 5 | f | b | 2 | 4 | 0 | 7 | 3 |
| 8 | c | 7 | 6 | 2 | a | f | b | 5 | 1 | 0 | 4 | 9 | e | d | 3 | 8 |
| 9 | b | e | 4 | 9 | d | 3 | 1 | f | 8 | c | 5 | 6 | 7 | a | 2 | 0 |
| a | 9 | 4 | d | 8 | 0 | 6 | 5 | 7 | e | 1 | f | 3 | b | 2 | a | c |
| b | 7 | 8 | 5 | c | 2 | a | 3 | 4 | c | 6 | 0 | d | f | b | 1 | 9 |
| c | 5 | 2 | b | 6 | 7 | 9 | 0 | c | a | 8 | c | f | 1 | 3 | 4 | d |
| d | a | 6 | 8 | 4 | 3 | e | c | d | 2 | 9 | 1 | 5 | 0 | 7 | f | b |
| e | d | 1 | 3 | f | b | 0 | 2 | 8 | 4 | a | 7 | c | 9 | 5 | 6 | e |
| f | 8 | d | 7 | b | 5 | c | a | 2 | 9 | 4 | e | 1 | 3 | 6 | 0 | f |

In this table we also show rate 1/4 code. For this 1/2 code we also say that it is a (72,144) code (the length of M is 72, the length of L is 144).

In the second part of the coding we choose f to be the quasigroup operation defined in Table II and g to be $$k_{i+1,j} = b_{i,j} \text{ if } j = 1, \ldots n-1$$

$$k_{i+1,n} = b_{i,1} \oplus \ldots \oplus b_{i,n}$$

In the numerical experiments presented here we use the code (144,288). This was done in the following way. Let L be rewritten as a concatenation of two sub-patterns $L=L_1 0_4$ where $L_1=L^{(1)} L^{(2)} \ldots L^{(8)}$. Then the code (144,288) can be described as $L=L_1 L_2 0_4 0_4$, where $L_2=L_{(9)} L^{(10)} \ldots L^{(16)}$.

We will present an example that works with blocks of 288 bits, and have a rate 1/4. TASC algorithm that we used in the phase of encoding and decoding is shown in the following table.

TABLE III

TOTALY ASYNCHRONOUS STREAM CIPHER

| Encryption. $T(k, M) = (k_c, C)$ | Decryption. $T^{-1}(k, C) = (k_c, M)$ |
|---|---|
| Input: Key k of length n and message M. | Input: Key k of length n and message C. |
| Output: Message C. | Output: Message M. |
| 1) X ← InputNible; | 1) X,T ← InputNible; |
| 2) T ← 0; | 2) temp ← $K_{n-1}$; |
| 3) For i = 0 to n − 1 do | 3) For i = n − 1 downto 0 do |
|   X ← $Q[K_i, X]$; |   X ← Qpar[temp, X]; |
|   T ← T ⊕ X; |   T ← T ⊕ X; |
|   $K_i$ ← X; |   temp ← $K_{i-1}$; |
| 4) $K_{n-1}$ ← T; |   $K_{i-1}$ ← X; |
| 5) Output X; | 4) $K_{n-1}$ ← T; |
| 6) Go to 1; | 5) Output X; |
|  | 6) Go to 1; |

In the above algorithm the notation $Q[K_i, X]$ means a quasigroup operation $K_i * X$ and the operation e is the operation of eXclusive OR. The notation Qpar[temp, X] means that we use left parastrophic quasigroup operation for the quasigroup Q(*).

The transmitted code word is C. Due to the noise, a different sequence of symbols $D=d_1 d_2 \ldots d_{36}$, where $d_i$ is a nibble, is received. The decoding problem is to infer L, given D, the definition of the code, and the properties of the noisy channel. We assume that the channel is a binary symmetric channel. Let $H(h_1,h_2)$ be a function that returns the Hamming distance between two strings $h_1$ and $h_2$ of the same length (in bits).

TABLE IV

THE LEFT PARASTROPHE Qpar(\) OF THE QUASIGROUP Q(*)
THAT WE USED IN OUR EXPERIMENTS

| \ | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 8 | 7 | 2 | 0 | d | 3 | 6 | 5 | c | c | f | 9 | 1 | a | b | 4 |
| 1 | 0 | 5 | a | 1 | f | 9 | 8 | 6 | 4 | 2 | b | 7 | c | 3 | c | d |
| 2 | 1 | 0 | f | 9 | 4 | 5 | a | b | d | 7 | c | e | 3 | 8 | 2 | 6 |
| 3 | b | 3 | c | 8 | 5 | f | 0 | 9 | a | 4 | 7 | 1 | d | c | 6 | 2 |
| 4 | 2 | f | 9 | 7 | 0 | 1 | 4 | 3 | b | 6 | a | 5 | c | c | d | 8 |
| 5 | 3 | 2 | 5 | a | 6 | c | f | 8 | c | d | 1 | b | 7 | 9 | 4 | 0 |
| 6 | 7 | d | 0 | 3 | b | e | c | f | 5 | a | 2 | 8 | 4 | 6 | 9 | 1 |
| 7 | d | 4 | b | f | c | 8 | 7 | e | 6 | 1 | 3 | a | 2 | 5 | 0 | 9 |
| 8 | 9 | 8 | 3 | e | a | 7 | 2 | 1 | f | b | 4 | 6 | 0 | d | c | 5 |
| 9 | f | 6 | e | 5 | 2 | a | b | c | 8 | 3 | d | 0 | 9 | 4 | 1 | 7 |
| a | 4 | 9 | d | b | 1 | 6 | 5 | 7 | 3 | 0 | e | c | f | 2 | 8 | a |
| b | a | e | 4 | 6 | 7 | 2 | 9 | 0 | 1 | f | 5 | d | 8 | b | 3 | c |
| c | 6 | c | 1 | d | e | 0 | 3 | 4 | 9 | 5 | 8 | 2 | a | f | 7 | b |
| d | c | a | 8 | 4 | 3 | b | 1 | d | 2 | 9 | 0 | f | 6 | 7 | 5 | e |
| e | 5 | 1 | 6 | 2 | 8 | d | e | a | 7 | c | 9 | 4 | b | 0 | f | 3 |
| f | e | b | 7 | c | 9 | 4 | d | 2 | 0 | 8 | 6 | 3 | 5 | 1 | a | f |

TASCECA algorithm was defined by the following algorithm:

1) Define the initial set of decoding candidates $S_0 = \{(k_0, \lambda)\}$.

2) For i=1 to μ do $S_i\{(k,m') | \exists (k'',m'') \in S_{i-1}, D'', H(D'',D') \leq B, (k,m_d'') = f^{-1}(k'',D''), m'=m''m_d''$, where $m_d''$ 3) From the last set $S_\mu$ choose an element $(k, m') \in S_\mu$.

4) From m' obtain the message M.

For example, suppose that we want to send the following message

M=4d616365646f6e6961 through Binary Symmetric Channel, with TASCECA of rate 1/4 and block length of 288 bits. For the sake of easier representation of the results, we will use small value of $B_{max}=3$. That means that for every received 4-letter word $D_i$ (i.e. received 16 bit word $D_i$) we will search through all of its neighbors that have Hamming distance less or equal than 3. The total number of such close neighbors is $$\binom{16}{0}+\binom{16}{1}+\binom{16}{2}+\binom{16}{3} = 697.$$

According to the above tables, we will transform the message M into the following message (represented as a concatenation of 4-letters words)

M'=4d00 6100 6000 0000 3600 5000 6000 0000 4600 f600 e000 0000 6900 6000 1000 0000 0000 0000.

Notice that the total number of 4-letter words in this case is L=18. Let us choose the length of the key k to be n=5 and the initial value of the $k_0$ to be $k_0$=01234. The encoding process can be immediately finished if we transform M' with the function T and initial value $k_0$. If we do that we will obtain the following pair (k, C)=T($k_0$,M')=(98f91, 26ab c306 b63b 50df 3965 39cbb564 5521 a059 6b0f 611e 2700 239f 7c7c 6973 ge53 bd9a 5f26).

However, we use Eq. 2 to represent the encoding process iteratively in the table below. The values in the table below can be obtained iteratively i.e. $(k_1,C_1)$=(15b40,26ab)=T($k_0$, $M_1'$)=T(01234,4d00), then $(k_2,C_2)$=(7fd9a,c306)=T($k_0$, $M_2'$)= T(15b40, 6100) and so on.

Decoding phase is described in the iterative process table below. In order to save space, the elements of the sets $S_i$ are shown in form (k,M'), a little bit different from that described in Step 2 of the Decoding phase. Namely, M' are shown with removed redundancy, i.e. without redundant 0's. Additionally, beside each element of the set $S_i$ there is a bolded 4-letter word with maximum Hamming weight of $B_{max}$=3. That word tells us what changes were made on the received 4-letter word $D_i$ such that when applied the inverse function $T^{-1}$ to the changed word, the result has the needed structure of redundant information. So, for example for i=1 the row "(6803e, 4e), 01a8" means that $(6803e,4e00)=T^{-1(01234,24ab \oplus 01a8)}$ then the row "(15b40,4d), 0200" means that $(15b4 0, 4dOO) = T^{-1} (01234,24ab \oplus 0200)$ and so on. Next, for i=2 the row "(21a6 9, 4edl), 0460" means that $(21a6 9, d100) = T^{-1(6803e, c326 \oplus 0460)}$ and so on.

TABLE V

ITERATIVE PROCESS OF ENCODING THE MESSAGE M', SHOWN WITH INTERMEDIATE VALUES OF THE KEYS $k_l$, AND THE VALUES OF $D_i$ THAT DIFFERS FROM CORRESPONDING $C_l$ SINCE SOME ERRORS WERE INTRODUCED BY THE BINARY SYMMETRIC CHANNEL

| i | M' | $C_l$ | $k_l$ | $D_i$ | Errors |
|---|------|-------|-------|-------|--------|
| 1 | 4000 | 26ab  | 15b40 | 24ab  | 1      |
| 2 | 6100 | c306  | 7fd9a | c326  | 1      |
| 3 | 6000 | b63b  | fb47c | b6bf  | 2      |
| 4 | 0000 | 50df  | f45dc | 54df  | 1      |

TABLE V-continued

ITERATIVE PROCESS OF ENCODING THE MESSAGE M', SHOWN WITH INTERMEDIATE VALUES OF THE KEYS $k_l$, AND THE VALUES OF $D_i$ THAT DIFFERS FROM CORRESPONDING $C_l$ SINCE SOME ERRORS WERE INTRODUCED BY THE BINARY SYMMETRIC CHANNEL

| i  | M'   | $C_l$ | $k_l$ | $D_i$ | Errors |
|----|------|-------|-------|-------|--------|
| 5  | 3600 | 3965  | 27de3 | 3965  | 0      |
| 6  | 5000 | 39cb  | c14df | 39cb  | 0      |
| 7  | 6000 | b564  | 20107 | a564  | 1      |
| 8  | 0000 | 5521  | 663fd | 5520  | 1      |
| 9  | 4600 | a059  | 6013d | a051  | 1      |
| 10 | 1600 | 6b0f  | 59dc3 | 7a4f  | 3      |
| 11 | e000 | 611e  | f0d95 | e17e  | 3      |
| 12 | 0000 | 2700  | ffed3 | 2f09  | 2      |
| 13 | 6900 | 239f  | 35f24 | b39f  | 2      |
| 14 | 6000 | 7c7c  | 95b38 | 7d7c  | 1      |
| 15 | 1000 | 6973  | 95aeb | 6972  | 0      |
| 16 | 0000 | 9e53  | d3a8f | 9e53  | 0      |
| 17 | 0000 | bd9a  | 78995 | 9d9b  | 2      |
| 18 | 0000 | 5f26  | 98f91 | cf66  | 3      |

TABLE VI

ITERATIVE PROCESS OF DECODING THE RECEIVED MESSAGES $D_i$ THAT DIFFERS FROM CORRESPONDING $C_i$ SINCE SOME ERRORS WERE INTRODUCED BY THE BINARY SYMMETRIC CHANNEL

| i = 0 | i = 1, $D_1$ = 24ab | i = 2, $D_2$ = c326 |
|-------|---------------------|---------------------|
| (01234.λ) | (6803e, 4e), 01a8 | (21a69, 4ed1), 0460 |
|       | (15b40, 4d), 0200 | (87180, 4e82), 1120 |
|       | (26e23, 4c), 0620 | (7fd9a, 4d61), 0020 |
|       | (6a632, 67), 1500 | (1028d, 4d67), 0280 |
|       | (eca98, e0), 4802 | (e575d, 4d95), 2082 |
|       | (93261, cd), 9004 | (faa5c, 4deb), 8200 |
|       |                     | (f9792, 4c65), 0002 |
|       |                     | (bb4bb, 4ca2), 8802 |
|       |                     | (ec036, 67c8), 0081 |
|       |                     | (cb9ff, e075), 0218 |
|       |                     | (1e584, cd24), 1080 |

| i = 3, $D_3$ = b6bf | i = 4, $D_4$ = 54df | i = 5, $D_5$ = 3965 |
|---------------------|---------------------|---------------------|
| (fb47c, 4d616), 0084 | (f45dc, 4d616), 0400 | (27de3, 4d61636), 0000 |
| (dbbc4, 67c84), 010a |                     | (0bdb1, 4d61603), 2009 |
|                     |                     | (2578f, 4d6166b), 4802 |
|                     |                     | (a264f, 4d61615), 8080 |

| i = 6, $D_6$ = 39cb | i = 7, $D_7$ = a564 | i = 8, $D_8$ = 5520 |
|---------------------|---------------------|---------------------|
| (c14df, 4d616365), 0000 | (20107, 4d6163656), 1000 | (663fd, 4d6163656), 0001 |
| (e1eec, 4d616367), 1108 |                     |                     |
| (d3498, 4d6166be), 9000 |                     |                     |
| (95052, 4d6166b2), c010 |                     |                     |

| i = 9, $D_9$ = a051 | i = 10, $D_{10}$ = 7a4f | i = 11, $D_{11}$ = e17e |
|---------------------|-------------------------|-------------------------|
| (6013d, 4d616365646), 0008 | (58dc3, 4d616365646f6), 1140 | (f1e2c, 4d61636565280), 2240 |
| (176de, 4d616365643), 0822 | (72a88, 4d6163656469c), 4110 | (47c11, 4d61636568855c), 8001 |
| (06677, 4d616365696), 4001 | (b8f4f, 4d61636564616), c008 | (f0d95, 4d616365646f6e), 8060 |
| (ce416, 4d616365655), 8c00 | (b443b, 4d616365643e9), 002c |                         |
| (feae4, 4d616365688), 9200 | (21187, 4d616365643e2), 0a02 |                         |
|                     | (8ce41, 4d616365696d2), 0040 |                         |
|                     | (7b86c, 4d616365696d2), 0181 |                         |
|                     | (34856, 4d616365696f9), 1003 |                         |
|                     | (50597, 4d616365696f3), 1801 |                         |
|                     | (66058, 4d616365696d2), 2102 |                         |
|                     | (f4590, 4d61636565528), 0c08 |                         |
|                     | (3c471, 4d616365688e7), 0002 |                         |
|                     | (72831, 4d616365688555), 0002 |                         |

TABLE VI-continued

ITERATIVE PROCESS OF DECODING THE RECEIVED MESSAGES $D_i$ THAT DIFFERS FROM CORRESPONDING $C_i$ SINCE SOME ERRORS WERE INTRODUCED BY THE BINARY SYMMETRIC CHANNEL

| i = 12, $D_{12}$ = 2f08 | i = 13, $D_{13}$ = b39f | i = 14, $D_{14}$ = 7d7c |
|---|---|---|
| (ffed3, 4d616365646f6e), 0808 | (b51ef, 4d616365646f6e04), 0841 (35f24, 4d616365646f6e69), 9000 | (f9f1c, 4d616365646f6e41), 4008 (95b38, 4d616365646f6e696), 9000 (b5a55, 4d616365646f6e69e), 1028 |
| i = 15, $D_{15}$ = 6973 | i = 16, $D_{16}$ = 9e53 | i = 17, $D_{17}$ = 9d9b |
| (4d0e6, 4d616365646f6e0419), 8012 (95aeb, 4d616365646f6e6961), 0000 (c08bc, 4d616365646f6e696a), c010 | (d3a8f, 4d616365646f6e6961), 0000 | (78995, 4d616365646f6e6961), 2001 |
| i = 18, $D_{18}$ = cf66 | | |
| (98f91, 4d616365646f6e6961), 9040 | | |

In the process of decoding, we iteratively decode 4-tuples $D_i = d_j d_{j+1} d_{j+2} d_{j+3}$, $j=1+4(i-1)$, $i=1, 2, \ldots 9$, and check if $0_4$ is the last nibble of corresponding $L_i$, or if $L_4$, $L_8$, $L_9$ are strings of zeros only. However, since $D_i = d_j d_{j+1} d_{j+2} d_{j+3}$, $j=1+4(i-1)$, $i=1, 2, \ldots 9$, differs from the corresponding codeword $C_i = c_j c_{j+1} c_{j+2} c_{j+3}$ in some bits, in process of decoding we decode every 4-tuple which is less than B bits distant from $D_i$. In a few words: decoding of the codeword is a process of a search of those $D_i$s for which, when decoded, the last nibble is a string of 4 zeros, and $L_4$, $L_8$, $L_9$ are strings of zeros only.

It is clear that this step is a very significant iterative part of the decoder. During the process of decoding, the number of elements in the set S of all possible candidates can increase dramatically, so it is important to keep this number under control. Positioning of the redundant data in L, as shown in the above rate code table, is used for this purpose, but also other techniques for eliminating the most unlikely candidates can be applied. At the end of the iterative decoding, eventually the number of elements in S decreases to one, meaning that all errors are found and corrected. The decoder has also the following property: if somehow the right candidate is eliminated from the set of candidates S, several steps further the decoding process will eventually result in an empty set S, which is an evidence that some wrong decoding decision was made.

Furthermore, under the assumption that the number of elements in the set S is kept in control, we can calculate the upper bound of BER for the decoding. Namely, for a binary symmetric channel with a probability of error p, assuming that the maximal Hamming distance for received 4-tuples $D_i$ is not larger than $B = B_{max}$, and let $K = N/16$ be the number of 4-tuples in the codeword of length N, the upper bound of BER can be calculated by the following expression:

$$BER \leq \sum_{i=1}^{K} \binom{K}{i} p_B^i (1 - p_B)^{K-i}$$

where $$p_B = \sum_{i > K_{max}} \binom{16}{i} p^i (1-p)^{16-i}$$

is the probability that more than $B_{max}$ errors occur in a string of 16 bits.

Our experiments for the code showed significant improvement as compared to Turbo and LDPC codes. For example, for SNR=0.0 dB, rate ½ and block length of only 288 bits, preferred codes give a BER=$1.7 \times 10^{-4}$, and for SNR=−0.5 dB, rate 1/4 and block length of only 864 bits produce BER=$4.1 \times 10^{-5}$. Such numerical experiments show that its potentials are, in this moment, far beyond the capabilities of the currently best error correction codes.

Yet another aspect of the present invention provides an improver of pseudo-random number generators (PRNG) such that the improved PRNG has almost unmeasurable period, uniform distribution of the letters, pairs of letters, triples of letters, and so on, and passes all statistical tests of randomness. The preferred improver of PRNG is designed by using quasigroup string transformations and its properties are mathematically provable. It is very flexible: the input/output strings can be of 2-bits letters, 4-bits letters, bytes, 2-bytes letters, and so on. Additionally, its complexity linear, it needs less than 1 Kb memory in its 2-bits and 4-bits implementations, and therefore is suitable for usage in embedded systems as well.

There are several improvers for (pseudo-)random number generators (PRNG's) construct over pseudo-random number generators and/or unbiased physical sources of randomness. The general characteristics of all improvers for PRNG's is that either they do not use each bit of information generated by the source or their algorithms are of exponential nature and then approximations should be involved. Among proposed algorithms for improvers of PRNG's, some of them can be implemented in a computationally effective way, while for some of them mathematical proofs are supplied for the desired properties.

According to embodiments of the present invention, an improver for PRNG's is provided that is based on the quasigroup string transformations. A preferred improver uses each bit of information produced by an information source. Moreover, a preferred improver is capable to produce a pseudo random number sequence (of high quality) from a stationary source that produces only one signal, zero for example. The complexity of a preferred algorithm is linear, i.e. an output string of length n will be produced from an input string of length n with complexity O(n). This means that computationally very effective software and hardware implementations of the improver can be designed. The preferred algorithm is very flexible: the same design can be used for strings whose letters consist of 2-bits, 4-bits, bytes, 2-bytes and generally it can be designed for n-bits letters alphabet (n≧2).

The definitions of a quasigroup has been provided above. Also as provided above, the definition of a quasigroup implies the cancellation laws x*y=x*z⟹y=z, y*x=z*x⟹y=z and the equations a*x=b, y*a=b have unique solutions x, y for each a,b∈Q. If (Q,*) is a quasigroup, then * is called a quasigroup operation.

Several quasigroup string transformations can be defined and those of interest to us will be explained below. Consider an alphabet (i.e. a finite set) A, and denote by $A^+$ the set of all nonempty words (i.e. finite strings) formed by the elements of A. The elements of $A^+$ will be denoted by $(a_1 a_2 \ldots a_n)$ rather than where $a_1, a_2, \ldots, a_n$), where $a_i \in A$. Let * be a quasigroup operation on the set A. For each $l \in A$ we define two functions $e_{l,*}, e_{l,*}': A^+ \to A^+$ as follows. Let $a_i \in A, \alpha = a_1 a_2 \ldots a_n$. Then $$e_{l,*}(\alpha) = b_1 \ldots b_n \Leftrightarrow b_{i+1} = b_i * a_{i+1}$$

$$e_{l,*}'(\alpha) = b_1 \ldots b_n \Leftrightarrow b_{i+1} = a_{i+1} * b_i$$

for each i=0, 1, ... n−1, where $b_0$=1. The functions $e_{l,*}$ and $e_{l,*}'$ are called e- and e'-transformations of $A^+$ based on the operation * with leader 1. Graphical representations of the e- and e'-transformations are shown in the following tables.

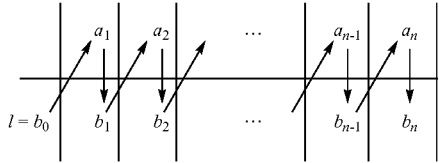

FIG. 1: Graphical representation of an e-transformation

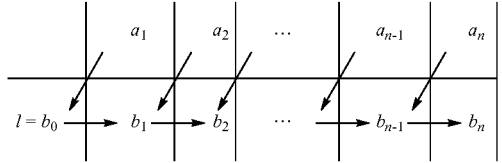

FIG. 2: Graphical representation of an transformation

As an example, take A={0, 1, 2, 3} and let the quasigroup (A,*) be given by the multiplication scheme shown below. Consider the string α=1 0 2 1 0 0 0 0 0 0 0 1 1 2 1 0 2 2 0 1 0 1 0 3 0 0 and choose the leader 0. Then by the transformations $e_{0,*}$ and $e_{0,*}'$ we will obtain the following transformed strings $e_{0,*}(\alpha)$=1 3 2 2 1 3 0 2 1 3 0 2 1 0 1 1 2 1 1 1 3 3 0 1 3 1 3 0 and
$e_{0,*}'(\alpha)$=3 3 0 3 3 3 3 3 3 3 3 3 2 1 2 1 1 2 3 3 2 0 3 3 1 1 1.

| FIG 3: A quasigroup (A, *) | | | | |
|---|---|---|---|---|
| * | 0 | 1 | 2 | 3 |
| 0 | 2 | 1 | 0 | 3 |
| 1 | 3 | 0 | 1 | 2 |
| 2 | 1 | 2 | 3 | 0 |
| 3 | 0 | 3 | 2 | 1 |

| FIG. 4: Consecutive e- and e'-transformations | |
|---|---|
| | 1 0 2 1 0 0 0 0 0 0 0 0 1 1 2 1 0 2 2 0 1 0 1 0 3 0 0 = α |
| 0 | 1 3 2 2 1 3 0 2 1 3 0 2 1 0 1 1 2 1 1 1 3 3 0 1 3 1 3 0 = $e_{0,*}(\alpha)$ |
| 0 | 1 2 3 2 2 0 2 3 3 1 3 2 2 1 0 1 1 2 2 2 0 3 0 1 2 2 0 2 = $e_{0,*}^2(\alpha)$ |
| 0 | 1 1 2 3 2 1 1 2 0 1 2 3 2 2 1 0 1 1 1 1 3 1 3 3 2 3 0 0 = $e_{0,*}^3(\alpha)$ |
| 0 | 1 0 0 3 2 2 2 3 0 1 1 2 3 2 2 1 0 1 0 1 2 2 0 3 2 0 2 1 = $e_{0,*}^4(\alpha)$ |
| | 1 0 2 1 0 0 0 0 0 0 0 0 1 1 2 1 0 2 2 0 1 0 1 0 3 0 0 = α |
| 0 | 3 3 0 3 3 3 3 3 3 3 3 3 2 1 2 1 1 2 3 3 2 0 3 3 1 1 1 = $e'_{0,*}(\alpha)$ |
| 0 | 0 0 2 2 2 2 2 2 2 2 2 2 3 2 3 2 1 2 2 2 3 3 1 3 2 1 0 = $e'_{0,*}^2(\alpha)$ |
| 0 | 2 0 1 2 3 0 1 2 3 0 1 2 3 2 3 0 1 3 1 0 0 1 0 2 = $e'_{0,*}^3(\alpha)$ |
| 0 | 1 1 0 1 3 3 2 3 1 1 0 1 3 2 3 0 0 1 3 3 2 2 1 1 1 0 2 3 = $e'_{0,*}^4(\alpha)$ |

We present four consecutive applications of these transformations in the above table. One can notice that the starting distribution of 0, 1, 2 and 3 in α: 16/28, 7/28, 4/28, 1/28 is changed to 7/28, 7/28, 10/28, 4/28 in $e_{0,*}^4(\alpha)$ and to 5/28, 10/28, 5/28, 8/28 in $e'_{0,*}^4(\alpha)$, hence the distributions became more uniform.

Several quasigroup operations can be defined on the set A and let $*_1, *_2, \ldots, *_k$ be a sequence of (not necessarily distinct) such operations. We choose also leaders $l_1, l_2, \ldots, l_k \in A$ (not necessarily distinct either), and then the compositions of mappings $$E_k = E_{l_1 \ldots l_k} = e_{l_1, *_1} \circ e_{l_2, *_2} \circ \ldots \circ e_{l_k, *_k}$$

$$E_k' = E_{l_1 \ldots l_k}' = e_{l_1, *_1}' \circ e_{l_2, *_2}' \circ \ldots \circ e_{l_k, *_k}'$$

are said to be E- and E'-transformations of $A^+$ respectively. The functions $E_k$ and $E_k'$ have many interesting properties, and for our purposes the most important ones are the following:

Theorem 10 The transformations $E_k$ and $E_k'$ are permutations of $A^+$.

Theorem 11 Consider an arbitrary string $\alpha = a_1 a_2 \ldots a_n \in A^+$, where $a_i \in A$, and let $\beta = E_k(\alpha)$, $\beta' = E_k'(\alpha)$. If n is large enough integer then, for each l:1≦l≦k, the distribution of substrings of β and β' of length l is uniform. (We note that for l>k the distribution of substrings of β and β' of length l may not be uniform.)

We say that a string $\alpha = a_1 a_2 \ldots a_n \in A^+$, where $a_i \in A$, has a period p if p is the smallest positive integer such that $a_{i+1} a_{i+2} \ldots a_{i+p} = a_{i+p+1} a_{i+p+2} \ldots a_{i+2p}$ for each i≧0. Let α,β,β' be as in Theorem 10 and assume that the leader a of the transformations $E_k$ and $E_k'$ is such that a*a≠a. Then we have the following property:

Theorem 12 The periods of the strings β and β' are increasing at least linearly by k.

We should note that the increasing of the periods depends on the quasigroup operations, and for some of them it is exponential, i.e. if α has a period p, then $\beta = E_k(\alpha)$ and $\beta' = E_k'(\alpha)$ may have periods greater than $p2^k$. We will discuss this in more detail.

In the examples that follow we will usually use only E-transformations, since the results will hold for E'-transformations by symmetry.

Describing the quasigroup PRNG improver specifically, assume that we have a discrete source of information SI that produces strings from $A^+$, i.e. the alphabet of SI is A, where $A = \{a_0, a_1, \ldots, a_{s-1}\}$ is a finite alphabet. We may consider that the output strings from SI are pseudo random numbers, i.e. we take that the elements of A are digits in a number base s and that SI is a PRNG. Then we define two algorithms for PRNG improvers, based on E- and E'-transformations accordingly. We call them an E-algorithm and an E'-algorithm. In the algorithms we use several internal variables b, $L_1, \ldots, L_n$, the input of the algorithms is the order of the quasigroup s, a quasigroup A,* of order s, a fixed element l∈A (the leader), an integer n giving the number of applications of the transformations $e_{l,*}$ and $e_{l,*}'$ and a pseudo random string $b_0, b_1, b_2, b_3, \ldots$ obtained from some source of information SI with alphabet A. The output is an improved pseudo random string.

| E-algorithm |
| --- |
| Phase I. Initialization |
|   1. Choose a positive integer s ≥ 4; |
|   2. Choose an exponential quasigroup (A,*); |
|   3. Set a positive integer n; |
|   4. Set a leader l, a fixed element of A such that l * l ≠ l; |
| Phase II. Transformations of the pseudo random strings |
|         $b_0 b_1 b_2 b_3 \ldots, b_i \in A$, obtained from the source SI |
|   5. For i = 1 to n do $L_i \leftarrow l$; |
|   6. do |
|         b ← RandomElement(SI); |
|         $L_1 \leftarrow L_1 * b$; |
|         For i = 2 to n do $L_i \leftarrow L_i * L_{i-1}$; |
|         Output: $L_n$; |
|         loop; |

The E'-algorithm differs of the E-algorithm only in step

| E' - algorithm |
| --- |
|   6'. do |
|         b ← RandomElement(SI); |
|         $L_1 \leftarrow b * L_1$; |
|         For i = 2 to n do $L_i \leftarrow L_{i-1} * L_i$; |
|         Output: $L_n$; |
|         loop; |

We have to explain the meaning of an exponential quasigroup and to give suitable parameters for numbers s and n. In fact, the number s is in a way predefined by the source of information SI, but not completely. Let the alphabet of SI be ASCII, consisting of all 8-bits letters. Then we have the following choices of A: A={0, 1, 2, 3}, A={0, 1, 2, ..., 7}, A={0, 1, ..., 15}, A={0, 1, ..., 31}, A={0, 1, ..., 63}, A={0, 1, 2, ..., 127}. Namely, the output string of SI is considered as string of bits and then the bits are grouped by two, three, and so on. (We can consider in this case alphabets with two bytes letters, three bytes letters etc., but quasigroups of order 512 or higher need a lot of storage memory and generally the computations are slower, which may be undesirable. The number n should be chosen by the principle 'for smaller s larger n' and its choice depends of the source of information SI. Thus, if SI gives constant output (zero's, for example), then by our experience one rule could be 'ns≥512&n>8'. If SI produce a kind of random sequence then n can be small, sometimes n=1 is quite enough. For example, the PRNG used in Pascal does not pass the statistical tests in the battery [diehard], but it passes all of them after only one application of an e-transformation. Of course, for larger s the better output pseudo random string is obtained, but it should be optimized by the available performances (speed of the algorithm, accessible memory etc). All of the mentioned properties are based on Theorem 11 and Theorem 12 and on our experience obtained throughout several hundred experiments.

The potential of quasigroups for defining and improving PRNG has been considered. From prior studies it can be concluded that the class of finite quasigroups can be separated into two disjoint subclasses: the class of linear (or fractal) quasigroups and the class of exponential (or uniform) quasigroups. There are several characteristics that separate these two classes and for our purposes this one is important. Given a finite set $Q=\{q_0, q_1, \ldots q_{s-1}\}$, let (Q,*) be a quasigroup and let us start with infinite (i.e. enough long) string $\alpha = q_0 q_1 \ldots q_{s-1} q_0 q_1 \ldots q_{n-1} q_0 q_1 \ldots q_{s-1} \ldots$ of period n. Apply r times an $e_{l,*}$ transformation on $\alpha$ and denote by $\alpha_r$ the obtained string. Then, if the period of the string $\alpha_r$ is a linear function of r, then the quasigroup (Q,*) is said to be linear. In the opposite case the period of the string $\alpha_r$ is an exponential function nr (for some constant n: 1<n≤s), and then the quasigroup (Q,*) is said to be exponential. The number n is called the period of growth of the exponential quasigroup (Q,*). (It is an open problem whether there exist only two kinds of finite quasigroups, linear and exponential.)

It has been shown via statistical results provided in Dimitrova, V., Markovski J.: On quasigroup pseudo random sequence generator, Proc. of the 1-st Balkan Conference in Informatics, YManolopoulos and P. Spirakis eds., 21-23 Nov. 2004, Thessaloniki, pp. 393-401, that a percentage of linear quasigroups decreases when the order of the quasigroup increases. Furthermore, it can be determined that the percentage of 'bad' quasigroups, i.e. linear quasigroups and exponential quasigroup with period of growth s≤2, decreases exponentially by the order of the quasigroups. The following table illustrates percentages of 'bad' quasigroups for quasigroups of order 4, 5, 6, 7, 8, 9 and 10 according to Dimitrova et al. We have to notice that the above results are not quite precise (except for the

TABLE 1

Percentage of 'bad' quasigroups of order 4-10

| Order of the quasigroup | 4 | 5 | 6 | 7 | 8 | 9 | 10 |
| --- | --- | --- | --- | --- | --- | --- | --- |
| Percentage of 'bad' quasigroups | 34.7 | 4.1 | 1.6 | 0.6 | 0.38 | 0.25 | 0.15 | quasigroups of order 4, where complete classification is obtained, since the conclusion is made when only 7 e-transformation were applied. Namely, it can happen some quasigroups after more than 7 applications to obtain period of growth ≥2.

We made the following experiment over 10⁶ randomly chosen quasigroups of order 16. We counted the period of growth after 5 applications of $e_{l,*}$ transformations of each of the quasigroups on the following periodical strings with period 16: 0, 1, 2, ..., 14, 15, 0, 1, 2, ..., 14, 15, ..., 0, 1, 2, ..., 14, 15, .... The value of the leader l did not affect the results. The obtained distribution of the period of growth is presented on the following table. It can be seen from the table

| Constant k | Number of quasigroups with period a = $2^k$ |
| --- | --- |
| 0.00 ≤ k < 0.25 | 1 |
| 0.25 ≤ k < 0.50 | 23 |
| 0.50 ≤ k < 0.75 | 191 |
| 0.75 ≤ k < 1.00 | 686 |
| 1.00 ≤ k < 1.25 | 2517 |
| 1.25 ≤ k < 1.50 | 7918 |
| 1.50 ≤ k < 1.75 | 18530 |
| 1.75 ≤ k < 2.00 | 42687 |

-continued

| Constant k | Number of quasigroups with period a = $2^k$ |
|---|---|
| 2.00 ≦ k < 2.25 | 79834 |
| 2.25 ≦ k < 2.50 | 128836 |
| 2.50 ≦ k < 2.75 | 174974 |
| 2.75 ≦ k < 3.00 | 199040 |
| 3.00 ≦ k < 3.25 | 175848 |
| 3.25 ≦ k < 3.50 | 119279 |
| 3.50 ≦ k < 3.75 | 45103 |
| 3.75 ≦ k < 4.00 | 4527 | that 907 quasigroups have period of growth <2 after 5 applications of the e-transformation. We counted the period of growth after 6 applications of each of those quasigroups and we obtained that only 15 of them had the period of growth <2. After 7 applications, only one quasigroups had period of growth <2, but it obtained period of growth 2 after 10 applications of e-transformations. This experiment shows that it is not easy for a linear quasigroup of order 16 to be found randomly.

The PRNG improvers of preferred embodiments are very effectively implementable in software and hardware. They are of linear complexity and if quasigroups of order ≦16 are used can be installed in less than 1 Kb working memory. Hence, they can be used in embedded systems. The performance of the algorithms is based on Theorems 10, 11 and 12. By Theorem 10 we have that E-algorithm and E'-algorithm are injective, meaning that different input string obtained from a source of information SI will produce different output string. Theorem 11 allows uniform output random string to be obtained, where the distribution of the letters, pairs of letters, triples of letters, etc. is uniform. Finally, Theorem 12 and the statistical results show that the period of the output random string can be as large as we want (it is potentially infinite as a matter of fact). The desired characteristics of the output random strings can be easily achieved by using suitable (exponential) quasigroups and suitable choice of the parameter s. It is clear that the above properties are not enough good pseudo random strings to be obtained. We have checked the obtained pseudo random strings by using available statistical tests (Diehard), and they passed all of the tests.

Proofs for Theorems 11 and 12 will now be provided. Regarding Theorem 11, in order to simplify the technicalities in the proof we take that the alphabet A is $\{0, \ldots, s-1\}$, where $0, 1, \ldots, s-1$ (s>1) are integers, and * is a quasigroup operation on A. We define a sequence of random variables $\{Y_n | n \geq 1\}$ as follows. Let us have a probability distribution $(q_0, q_1, \ldots, q_{s-1})$ of the letters $0, 1, \ldots, s-1$, such that $q_i > 0$ for each $i = 0, 1, \ldots, s-1$
and $$\sum_{i=0}^{s-1} q_i = 1.$$

Consider an e-transformation E and let $\gamma = E(\beta)$ where $\beta = b_1 \ldots b_k$, $\gamma = c_1 \ldots c_k \in A^+$ ($b_i, c_i \in A$). We assume that the string $\beta$ is arbitrarily chosen. Then by $\{Y_m = i\}$ we denote the random event that the m-th letter in the string $\gamma$ is exactly i. The definition of the e-transformation given by (1) implies $$P(Y_m = j | Y_{m-1} = j_{m-1}, \ldots, Y_1 = j_1) = P(Y_{m-1} = j_{m-1})$$

since the appearance of the m-th member in γ depends only on the (m−1)th member in γ, and not of the (m−2)-th, ..., 1-st ones. So, the sequence $\{Y_m | m \geq 1\}$ is a Markov chain, and we refer to it as a quasigroup Markov chain (qMc). Let $p_{ij}$ denote the probability that in the string γ the letter j appears immediately after the given letter i, i.e.

$$p_{ij} = P(Y_m = j | Y_{m-1} = i), i, j = 0, 1, \ldots, s-1$$

The definition of qMc implies that does not depend on m, so we have that qMc is a homogeneous Markov chain. The probabilities $p_{ij}$ can be determined as follows. Let i, j, t∈A and let i*t=j be a true equality in the quasigroup (A,*). Then $$P(Y_m = j | Y_{m-1} = i) = q_t,$$

since the equation i*x=j has a unique solution for the unknown x. So, $p_{ij} > 0$ for each i, j=0, ..., s−1, i.e. the transition matrix
$\Pi = (p_{ij})$ of qMc is regular. Clearly, as in any Markov chain, $$\sum_{j=0}^{s-1} p_{ij} = 1.$$

But for the qMc we also have $$\sum_{i=0}^{s-1} p_{ij} = \sum_{t \in A} q_t = 1$$

i.e. the transition matrix Π of a qMc is doubly stochastic.

The regularity of Π implies that there is a unique fixed probability vector $p = (p_0, \ldots p_{s-1})$ such that $p\Pi = p$, and all components of p are positive. Also, since Π is a doubly stochastic matrix too, one can check that $$\left(\frac{1}{s}, \frac{1}{s}, \ldots, \frac{1}{s}\right)$$

is a solution of pΠ=p. So, $$p_i = \frac{1}{s} (i = 0, \ldots, s-1).$$

In such a way we have the following Lemma:

Lemma Let $\beta = b_1 b_2 \ldots b_k \in A^+$ and $\gamma = E^{(1)}(\beta)$. Then the probability of the appearance of a letter i at the m-th place of the string $\gamma = c_1 \ldots c_k$ is approximately $$\frac{1}{s},$$

for each i∈A and each m=1, 2, ..., k.

The Lemma tells us that the distribution of the letters in the string $\gamma = E(\beta)$ obtained from a sufficiently large string β by a qsp is uniform. We proceed the discussion by considering the distributions of the substrings $c_{i+1} \ldots c_{i+l}$ of the string $\gamma = E^n(\beta) (\beta = b_1 b_2 \ldots b_k \in A^+)$, where l≧1 is fixed and i∈{0, 1, ..., k−1}. As usual, we say that $c_{i+1} \ldots c_{i+l}$ is a substring of γ of length l. Define a sequence $\{Z_m^{(n)} | m \geq 1\}$ of random variables by $$Z_m^{(n)} = t \iff \begin{cases} Y_m^{(n)} = i_m^{(n)}, Y_{m+1}^{(n)} = i_{m+1}^{(n)}, \ldots, Y_{m+l-1}^{(n)} = i_{m+l-1}^{(n)}, \\ t = i_m^{(n)}s^{l-1} + i_{m+1}^{(n)}s^{l-2} + \ldots + i_{m+l-2}^{(n)}s + i_{m+l-1}^{(n)} \end{cases}$$

where here and further on the superscripts (n) denote the fact that we are considering substrings of a string $\gamma = i_1^{(n)} i_2^{(n)} \ldots i_k^{(n)}$ obtained from a string $\beta$ by transformations of kind en. Thus, $Y_{m(n)}$ is just the random variable $Y_m$ defined as before. The mapping $$(i_m^{(n)}, i_{m+1}^{(n)}, \ldots, i_{m+l-1}^{(n)}) \to i_m^{(n)}s^{l-1} + i_{m+1}^{(n)}s^{l-2} + \ldots + i_{m+l-2}^{(n)}s + i_{m+l+1}^{(n)}$$

is a bijection from $A^l$ onto $\{0, 1, \ldots, s^l-1\}$, so the sequence $\{Z_m^{(n)}|m \geq 1\}$ is well defined. The sequence $\{Z_m^{(n)}|\geq 1\}$ is also a Markov chain (n-qMc), since the appearance of a substring $i_m^{(n)} i_{m+1}^{(n)} \ldots i_{m+l-1}^{(n)}$ of l consecutive symbols in $\gamma$ depends only of the preceding substring $i_{m-1}^{(n)} i_m^{(n)} i_{m+1}^{(n)} \ldots i_{m+l-2}^{(n)}$. Denote by t and t' the following numbers:

$$t = i_m^{(n)} s^{l-1} + i_{m+1}^{(n)} s^{l-2} + \ldots + i_{m+l-2}^{(n)} s + i_{m+l+1}^{(n)}$$

$$t' = i_{m-1}^{(n)} s^{l-1} + i'_m^{(n)} s^{l-1} i'_m^{(n)} s^{l-2} + \ldots + i'_{m+l-3}^{(n)} s + i'_{m+l+1}^{(n)}$$

Let Pt't be the probability that in some string $\gamma = E^{(n)}(\beta)$, the substring $i_m^{(n)} \ldots i_{m+l-2}^{(n)} i_{m+l-1}^{(n)}$ of $\gamma$ (from the m-th to the m+l−1-th position) appears (with overlapping) after a given substring $i_{m-1}^{(n)} i'_m^{(n)} \ldots i'_{m+l-3}^{(n)} i'_{m+l-2}^{(n)}$ of $\gamma$ (from the m−1-th to the m+l−2-th position). Clearly, Pt't=0 if $i_j^{(n)} \neq i'_j^{(n)}$ for some $j \in \{m, m-1, \ldots, m+l-2\}$. In the opposite case (when l−1 letters are overlapped) we have:

$$p_{t't} = P(Z_m^{(n)} = t \mid Z_{m-1}^{(n)} = t')$$
$$= P(Y_m^{(n)} = i_m^{(n)}, \ldots, Y_{m+l-1}^{(n)} = i_{m+l-1}^{(n)} \mid Y_{m-1}^{(n)} = i_{m-1}^{(n)}, Y_m^{(n)} = i_m^{(n)}, \ldots, Y_{m+l-2}^{(n)} = i_{m+l-2}^{(n)})$$
$$= P\left(\bigcap_{j=0}^{l-1}(Y_{m+j}^{(n)} = i_{m+j}^{(n)}) \mid \bigcap_{j=0}^{l-1}(Y_{m+j-1}^{(n)} = i_{m+j-1}^{(n)})\right)$$
$$= \frac{P\left(\bigcap_{j=0}^{l}(Y_{m+j-1}^{(n)} = i_{m+j-1}^{(n)})\right)}{P\left(\bigcap_{j=0}^{l-1}(Y_{m+j-1}^{(n)} = i_{m+j-1}^{(n)})\right)}$$
$$= \frac{P\left(\bigcap_{j=0}^{l-1}(Y_{m+j}^{(n)} = i_{m+j}^{(n)}) \mid Y_{m-1}^{(n)} = i_{m-1}^{(n)}\right)}{P\left(\bigcap_{j=0}^{l-2}(Y_{m+j}^{(n)} = i_{m+j}^{(n)}) \mid Y_{m-1}^{(n)} = i_{m-1}^{(n)}\right)}$$

By using an induction of the numbers n of quasigroup transformations we will prove the Theorem 11, i.e., we will prove the following version of it:

Let $1 \leq l \leq n, \beta = b_1 b_2 \ldots b_k \in A^+$ and $\gamma = E^{(n)}(\beta)$. Then the distribution of substrings of $\gamma$ of length l is uniform.

Recall the notation $A = \{0, \ldots, s-1\}$. For n=1 we have the Lemma, and let n=r+1, r≥1. By the inductive hypothesis, the distribution of substrings of length l for $1 \leq r$ in $\gamma' = E^r(\beta)$ is uniform. At first, we assume $1 \leq r$ and we are considering substrings of length l of $\gamma = E^{r+1}(\beta) = i_1^{(r+1)} \ldots i_k^{(r+1)}$. We take that $*_1, \ldots, *_{r+1}$ are quasigroup operations on A and recall that $E^{(r+1)} = E_{r+1} \bigcirc E^{(r)} = E_{r+1} \bigcirc E_r \bigcirc E^{(r-1)} = \ldots$. Since $(A, *_{r+1})$ is a quasigroup the equation $i_{j-1}^{(r+1)} *_{r+1} x = i_j^{(r+1)}$ has a unique solution on x, for each j, $2 \leq j \geq k$, and we denote it by $x = i_{j(r)}^{(r)}$. Denote by $i_1^{(r)}$ the solution of the equation $a_{r+1} *_{r+1} x = i_1^{(r+1)}$, where $a_{r+1} \in A$ is the fixed element in the definition of $E_{r+1}$. In such a way, instead of working with substrings $i_m^{(r+1)} i_{m+1}^{(r+1)} \ldots i_{m+d}^{(r+1)}$ of $\gamma$, we can consider substrings $i_m^{(r)} i_{m+1}^{(r)} \ldots i_{m+d}^{(r)}$ of $\gamma' = E^{(r)}(\beta)$, for any d, $0 \leq d \leq k-m$. The uniqueness of the solutions in the quasigroup equations implies that we have $$P(\bigcap_{j=0}^{d}(Y_{+j}^{(r+1)} = i_{m+j}^{(r+1)}) \mid Y_{m-1}^{(r+1)} = i_{m-1}^{(r+1)}) = P(\bigcap_{j=0}^{d}(Y_{m+j}^{(r)} = i_{m+j}^{(r)}))$$

as well. Here, $i_0^{(r+1)} = a^{r+1}$. Then, by (3) and (4) (for d=l−1, d=l−2 and n=r+1) we have $$p_{t't} = \frac{P\left(\bigcap_{j=0}^{l-1}(Y_{m+j}^{(r)} = i_{m+j}^{(r)})\right)}{P\left(\bigcap_{j=0}^{l-2}(Y_{m+j}^{(r)} = i_{m+j}^{(r)})\right)}$$

where $l \leq r$. By the inductive hypothesis we have $$P\left(\bigcap_{j=0}^{l-1}(Y_{m+j}^{(r)} = i_{m+j}^{(r)})\right) = \frac{1}{s^l}, \quad P\left(\bigcap_{j=0}^{l-2}(Y_{m+j}^{(r)} = i_{m+j}^{(r)})\right) = \frac{1}{s^{l-1}},$$

i.e.

$$p't = \frac{1}{s}.$$

Thus, for the probabilities Pt't we have $$p_{t't} = \begin{cases} 0 & \text{if } i_j^{(r+1)} \neq i_j^{(r+1)} \text{ for some } j = m, \ldots, m+l-2 \\ \frac{1}{s} & \text{if } i_j^{(r+1)} = i_j^{(r+1)} \text{ for each } j = m, \ldots, m+l-2. \end{cases}$$

This means that in each column of the $s^l \times s^l$-matrix of transitions Π of n-qMc there will be exactly s members equal to $$\frac{1}{s}$$

(those for which $i_{j'j}^{(r+l)} = i_j^{(r+1)}$, j=m, . . . , m+l−2),the other members will be equal to 0 and then the sum of the members of each column of Π is equal to 1. Hence, the transition matrix Π is doubly stochastic. It is a regular matrix too, since each element of the matrix $Π^l$ is positive. This implies that the system $^pΠ = ^p$ has a unique fixed probability vector $$p = \left(\frac{1}{s^l}, \frac{1}{s^l}, \ldots, \frac{1}{s^l}\right)$$

as a solution. In other words, the distribution of substrings of $\gamma$ of length $1 \leq r$ is uniform. Assume now that l=r+1, and let the numbers t, t' and the probabilities pt't be defined as before. Then for pt't we have that the above equation for pt't holds too, i.e.

$$p_{t't} = \frac{P\left(\bigcap_{j=0}^{r}(Y_{m+j}^{(r)} = i_{m+j}^{(r)})\right)}{P\left(\bigcap_{j=0}^{r-1}(Y_{m+j}^{(r)} = i_{m+j}^{(r)})\right)} = \frac{P\left(\bigcap_{j=0}^{r-1}(Y_{m+j+1}^{(r)} = i_{m+j+1}^{(r)}) \mid Y_m^{(r)} = i_m^{(r)}\right)}{P\left(\bigcap_{j=0}^{r-2}(Y_{m+j+1}^{(r)} = i_{m+j+1}^{(r)}) \mid Y_m^{(r)} = i_m^{(r)}\right)_t}$$

In the same way as it was done before, by using the fact that the equations $i_{j-1*u}^{(u)} x = i_j^{(u)}$ have unique solutions $x = i_j^{(u-1)}$ in the quasigroup $(A, *_u)$, where $u = r, r-1, \ldots, 2, 1$, we could consider substrings of $\gamma' = E^{(r)}(\beta)$, $\gamma'' = E^{(r-1)}(\beta), \ldots, \gamma^{(r)} = E^{(1)}(\beta), \gamma^{(r=1)} = E^{(0)}(\beta) = \beta$. Then, for the probabilities pt't by repeatedly using the equations (4) and (6), we will reduce the superscripts (r) to (r−1), to (r−2), . . . , to (1), i.e. we will have $$p_{t't} = \frac{P(Y_{m+r-1}^{(1)} = i_{m+r-1}^{(1)}, Y_{m+r}^{(1)} = i_{m+r}^{(1)})}{P(Y_{m+r-1}^{(1)} = i_{m+r-1}^{(i)})}$$
$$= P(Y_{m+r}^{(1)} = i_{m+r}^{(1)} \mid Y_{m+r-1}^{(1)} = i_{m+r-1}^{(1)})$$
$$= P(Y_{m+r}^{(0)} = i_{m+r}^{(0)})$$

Where $i_{m+r}^{(0)} \in \beta$. Since $P(Y_{m=r}^{(0)} = i_{m+r}^{(0)}) = q_{m+r}^{(0)}$ we have $$p_{t't} = \begin{cases} 0 & \text{if } i_j^{\prime(r+1)} \neq i_j^{(r+1)} \text{ for some } j = m, \ldots, m+r-1 \\ q_{i_{m+r}}^{(0)} & \text{if } i_j^{\prime(r+1)} = i_j^{(r+1)} \text{ for each } j = m, \ldots, m+r-1 \end{cases}$$

which implies $$\sum_{t'=0}^{s^{r+1}-1} p_{t't} = \sum_{i_{m-1}^{(r+1)}=0} \sum_{i_m^{(r+1)}=0}^{s-1} \cdots \sum_{i_{m+r-2}^{(r+1)}=0}^{s-1} p_{t't}$$
$$= \sum_{i_{m-1}^{(r+1)}=0}^{s-1} q_{i_{m+r}}^{(0)}$$
$$= \sum_{i_m^{(r)}=0}^{s-1} q_{i_{m+r}}^{(0)} = \sum_{i_{m+1}^{(r-1)}=0}^{s-1} q_{i_{m+r}}^{(0)} = \ldots = \sum_{i_{m+r}^{(0)}=0}^{s-1} q_{i_{m+r}}^{(0)}$$
$$= 1$$

We should note that the equations $$\sum_{i_{m-1}^{(r+1)}=0}^{s-1} q_{i_{m+r}}^{(0)} = \sum_{i_m^{(r)}=0}^{s-1} q_{i_{m+r}}^{(0)} = \ldots$$

hold true since the equations $i_{j-1*u}^{(u)} x = i_j^{(u)}$ have unique solutions in the quasigroup $(A, *_u)$ for each $u = r+1, r, \ldots, 2, 1$.

Hence, the transition matrix II is doubly stochastic, it is regular ($II^{r+1}$ has positive entries) which means that the system pII = p has a unique fixed probability vector $$p = \left(\frac{1}{s^{r+1}}, \frac{1}{s^{r+1}}, \ldots, \frac{1}{s^{r+1}}\right)$$

as a solution.

Generally, the distribution of the substrings of lengths l for l>n in a string $\gamma = E^{(n)}(\beta)$ is not uniform. Namely, for l=n+1, in the same manner as in the last part of the preceding proof, one can show that $Pt't = P(Y_{m+n+1}^{(0)} = i_{m+n+1}^{(0)} \mid Y_{m+n}^{(0)} = i_{m+n}^{(0)})$ and then (as in the implied summations shown above) we have $$\sum_{t'=0}^{s^{n+1}-1} Pt't = \sum_{i_{m+n}^{(0)}=0}^{s-1} P(Y_{m+n+1}^{(0)} = i_{m+n+1}^{(0)} \mid Y_{m+n}^{(0)} = i_{m+n}^{(0)}).$$

Of course, the last sum must not be equal to 1, i.e. the transition matrix II must not be doubly stochastic. The same consideration could be made for l=n+2, n+3, . . . as well.

To prove Theorem 12, consider a finite quasigroup $(A, *)$ of order s and take a fixed element $a \in A$ such that $a*a \neq a$. We will prove Theorem 12 in the more extreme case and so we take a string $\alpha = a_1 \ldots a_k$ of period 1 where $a_i = a$ for each $i \geq 1$. Then we apply the transformation $E = e_{a,*}$ on $\alpha$ several times. $E^n$ means that E is applied n times and we denote $E^n(\alpha) = a_1^{(n)} \ldots a_k^{(n)}$). The results are presented in the following table. We have that $a'_p = a$ for some p>1 since $a*a \neq a$

| | a | a | ... | a | a | ... |
|---|---|---|---|---|---|---|
| a | $a'_1$ | $a'_2$ | ... | $a'_{p-1}$ | $a'_p$ | ... |
| a | $a''_1$ | $a''_2$ | ... | $a''_{p-1}$ | $a''_p$ | ... |
| a | $a'''_1$ | $a'''_2$ | ... | $a'''_{p-1}$ | $a'''_p$ | ... |
| a | $a_1^{(4)}$ | $a_2^{(4)}$ | ... | $a_{p-1}^{(4)}$ | $a_p^{(4)}$ | ... |
| . | . | . | | . | . | |
| . | . | . | | . | . | |
| . | . | . | | . | . | | and $a_i' \in A$ (so we have that p is at least s), and let p be the smallest integer with this property. It follows that the string $E(\alpha)$ is periodical with period p. For similar reasons we have that each of the strings $E(\alpha)$ is periodical. We will show that it is not possible all of the strings $E(\alpha)$ to be of same period p. If we suppose that it is true, we will have $a_p^{(n)} = a$ for each $n \geq 1$. Then we will also have that there are $b_i \in A$ such that the following equalities hold:

$$a_{p-1}^{(n)} = b_{p-1} \quad \text{for } n \geq 2$$
$$a_{p-2}^{(n)} = b_{p-2} \quad \text{for } n \geq 3$$
$$\vdots$$
$$a_1^{(n)} = b_1 \quad \text{for } n \geq p$$

Then we have that $a*b_1 = b_1$, and that implies $a_1^{(n)} = b_1$ for each $n \geq 1$. We obtained $a*a = a*b_1 = b_1$, implying $a = b_1$, a contradiction with $a*a \neq a$. As a consequence we have that $a_1^{(p+1)} = a*a_1^{(p)} = a*b_1 \neq b_1, a_2^{(p+1)}*b_2 \neq b_2, \ldots, a_{p+1}^{(p+1)} = a_{p-2}^{(p+1)}*b_{p-1}, a_p^{(p+1)} = a_{p-1}^{(p+1)}*a \neq a$. We conclude that the period of the string $E_a^{(p+1)}(\alpha)$ is not p.

Next we show that if a string $\beta \in A^+$ has a period p and $\gamma = E(\beta)$ has a period q, then p is a factor of q. Recall that the transformation E by Theorem 10 is a permutation and so there is the inverse transformation $E^{-1}$. Now, if $\gamma = b_1 \ldots b_q b_1 \ldots b_q \ldots b_1 \ldots b_q$, then $\beta = E^{-1}(\gamma) = c_1 c_2 \ldots c_q c_1 c_2 \ldots c_q \ldots c_1 c_2 \ldots c_q$ is a periodical string with period $\leq q$. So, $p \leq q$ and this implies that p is a factor of q.

Combining the preceding results, we have proved the following version of Theorem 12:

Let $\alpha$ be a string with period $p_0$. Then the strings $\beta = E_a^n(\alpha)$ are periodical with periods $p_n$ that are multiples of $p_0$. The periods $p_n$ of $\beta$ satisfy the inequality $$p_{p_{n-1}} > p_{n-1}$$

for each $n \geq 1$.

While specific embodiments of the present invention have been shown and described, it should be understood that other modifications, substitutions, and alternatives are apparent to one of ordinary skill in the art. Such modifications, substitutions, and alternatives can be made without departing from the spirit and scope of the present invention, which should be determined from the appended claims.

Various features of the present invention are set forth in the pending claims.

The invention claimed is:

1. A method of encrypting a message in a hardware encoder using a synchronous stream cipher, the method comprising:
   determining a quasigroup that is an autotope of an initial quasigroup based on a secret initial key $K_{in}$ of selectable length n;
   determining a working key;
   generating a keystream for a binary additive cipher from the determined working key, the determined quasigroup, and the initial quasigroup;
   introducing the message as an input stream to the binary additive cipher;
   producing, from the hardware encoder, an output stream of the binary additive cipher comprising the encrypted message.

2. The method of claim 1 wherein the working key is determined using the secret initial key $K_{in}$.

3. The method of claim 2 wherein said determining a quasigroup comprises:
   receiving the secret initial key $K_{in}$;
   padding the key;
   expanding the padded key to a predetermined size;
   transforming the expanded key using the initial quasigroup;
   transforming the initial quasigroup to the determined quasigroup using the expanded key.

4. The method of claim 3 wherein said determining the working key comprises:
   selecting a subset of the expanded key of length n.

5. The method of claim 1 wherein said generating a keystream comprises:
   a) setting a counter $$\text{Counter} \leftarrow 0; \ p = \left[\frac{m}{2}\right];$$

where m is the length of the working key;
   b) assigning an initial temporary variable $X \leftarrow K[\text{Counter mod n}]$;
   c) assigning an initial temporary variable $T \leftarrow [\text{Counter}+p \text{ mod n}]$;
   d) determining a temporary variable X according to for i=0 to m−1 do
   begin $$X \leftarrow K_i * X;$$

$$T \leftarrow T \bullet X;$$

$$K_i \leftarrow X;$$

end;

assigning $K_{m-1} \leftarrow T$;

e) providing the output stream Output: $X \hat{x} \text{Input}$; where Input comprises a part of the input stream;
   f) Counter←Counter+1;
   g) go to b);
   wherein said producing an output stream comprises performing step e) and $\bullet$ is an arbitrary quasigroup operation.

6. A method of decrypting a message in a hardware decoder using a synchronous stream cipher, the method comprising
   determining a quasigroup that is an autotope of an initial quasigroup based on a secret initial key $K_{in}$ of selectable length n;
   determining a working key;
   generating a keystream for a binary additive cipher from the determined working key, the determined quasigroup, and the initial quasigroup;
   introducing the encrypted message as an input stream to the binary additive cipher;
   producing, from the hardware decoder, an output stream of the binary additive cipher comprising the decrypted message.

7. The method of claim 6 wherein the working key is determined using the secret initial key $K_{in}$.

8. The method of claim 7 wherein said determining a quasigroup comprises:
   receiving the secret initial key $K_{in}$;
   padding the key;
   expanding the padded key to a predetermined size;
   transforming the expanded key using the initial quasigroup;
   transforming the initial quasigroup to the determined quasigroup using the expanded key.

9. The method of claim 8 wherein said determining the working key comprises:
   selecting a subset of the expanded key.

10. The method of claim 6 wherein said generating a keystream comprises:
    a) setting a counter $$\text{Counter} \leftarrow 0; \ p = \left[\frac{m}{2}\right];$$

where m is the length of the working key;
    b) assigning an initial temporary variable $X \leftarrow K[\text{Counter mod n}]$;
    c) assigning an initial temporary variable $T \leftarrow K[\text{Counter}+p \text{ mod n}]$;
    d) determining a temporary variable X according to for i=0 to m−1 do
    begin $$X \leftarrow K_i * X;$$

$$T \leftarrow T \bullet X;$$

$$K_i \leftarrow X;$$

end;

assigning $K_{m-1} \leftarrow T$;

e) providing the output stream Output: $X \hat{x} \text{Input}$; where Input comprises a part of the input stream;
    f) Counter←Counter+1;
    g) go to b);

wherein said producing an output stream comprises performing step e) and • is an arbitrary quasigroup operation.

11. The method of claim 1 wherein the initial quasigroup is secret.

12. A method of encrypting a message in a hardware encoder using a self synchronized stream cipher, the method comprising:
determining a quasigroup of $2^r$ order that is an autotope of an initial quasigroup based on a secret initial key $K_{in}$ of selectable length n in r-bit letters;
determining a working key;
encrypting the message in the hardware encoder as a function of the determined working key, the determined quasigroup, and a fixed number of previous letters of the encrypted message.

13. The method of claim 12 wherein the working key is determined using the secret initial key $K_{in}$.

14. The method of claim 13 wherein said determining a quasigroup comprises:
receiving the secret initial key $K_{in}$;
padding the key;
expanding the padded key to a predetermined size;
transforming the expanded key using the initial quasigroup;
transforming the initial quasigroup to the determined quasigroup using the expanded key.

15. The method of claim 14 wherein said determining the working key comprises:
selecting a subset of the expanded key of length n.

16. The method of claim 12 wherein said encrypting comprises:
a) setting $$\text{Counter} \leftarrow 0;\ p = \left[\frac{n}{2}\right];$$

b) determining a key value $K_0 \leftarrow K_0 * (M_{Counter} * K_{Counter+p\ mod\ n})$;
c) for i=1 to n−1 do begin $K_i \leftarrow K_i * K_{i-1}$;

end;
d) determining an output $C_{Counter} = K_{n-1}$;
e) setting Counter←Counter+1;
f) go to b).

17. A method of decrypting an encrypted message in a hardware decoder using a self synchronized stream cipher, the method comprising:
determining a quasigroup of $2^r$ order that is an autotope of an initial quasigroup based on a secret initial key $K_{in}$ of selectable length n in r-bit letters;
determining a working key;
decrypting the message in the hardware decoder as a function of the determined working key, the determined quasigroup, and a fixed number of previously-determined letters of the decrypted message.

18. The method of claim 17 wherein the working key is determined using the secret initial key $K_{in}$.

19. The method of claim 18 wherein said determining a quasigroup comprises:
receiving the secret initial key $K_{in}$;
padding the key;
expanding the padded key to a predetermined size;
transforming the expanded key using the initial quasigroup;
transforming the initial quasigroup to the determined quasigroup using the expanded key.

20. The method of claim 19 wherein said determining the working key comprises:
selecting a subset of the expanded key of length n.

21. The method of claim 17 wherein said decrypting comprises:
a) setting $$\text{Counter} \leftarrow 0;\ p = \left[\frac{n}{2}\right];$$

b) assigning a temporary variable $X \leftarrow K_{n-1}$, $K_{n-1} \leftarrow C_{Counter}$;
c) for i=n−2 down to 0 do
begin $Y \leftarrow K_i$ $K_i \leftarrow X \backslash K_{i+1}$;

$X \leftarrow Y$ end;
d) determining a decrypted output: $M_{Counter} = (X \backslash K_0) / K_{Counter+p\ mod\ n}$;
e) setting Counter←Counter+1;
f) go to b),
wherein \ and / are parastrophic operations of determined quasigroup *.

22. The method of claim 17 wherein the initial quasigroup is secret.

* * * * *

UNITED STATES PATENT AND TRADEMARK OFFICE
CERTIFICATE OF CORRECTION

PATENT NO.        : 8,041,031 B2
APPLICATION NO.   : 11/665085
DATED             : October 18, 2011
INVENTOR(S)       : Danilo Gligoroski et al.

It is certified that error appears in the above-identified patent and that said Letters Patent is hereby corrected as shown below:

On the Patent Title:

Title Page, Item (56), under "Other Publications":

Col. 2, lines 7-8    Please delete "Psuedo Random Sequence Generators, Institute of Informatics, Faulty ofNatural" and insert --Pseudo Random Sequence Generators, Institute of Informatics, Faulty of Natural-- therefor.

Page 2, Item (56), under "Other Publications":

Col. 1, line 9    Please delete "$ZZ_p$," and insert --$ZZ^*_p$,-- therefor.

In the Specification:

Col. 4, line 57    After "itself", please insert --.--.
Col. 4, line 64    Please delete "(α',β,γ')" and insert --(α ',β ',γ ')-- therefor.
Col. 5, line 3     Please delete "autotpisms" and insert --autotopisms-- therefor.
Col. 5, line 14    Please delete "$x*y=z \Leftrightarrow y=x\backslash z \Leftrightarrow x=z/y.$" and insert --$x*y=z \Leftrightarrow y=x\backslash z \Leftrightarrow x=z/y.$-- therefor.
Col. 5, lines 29-30   Please delete "$e_{a,*}(\alpha)-b_1 b_2 \ldots b_n \Leftrightarrow b_1-a*a_1, b_2-b_1*a_2, \ldots, b_n-b_{n-1}a_n,$" and insert --$\varepsilon_{a,*}(\alpha) = b_1 b_2 \ldots b_n \Leftrightarrow b_1 = a * a_1, b_2 = b_1 * a_2, \ldots, b_n = b_{n-1} * a_n,$-- therefor.
Col. 5, line 40    Please delete "$b_{i+1}=b_i=a_{i+1}$" and insert --$b_{i+1} = b_i *a_{i+1}$-- therefor.
Col. 5, line 55    Please delete "$c_{i+1}a_i*a_{i+1}$" and insert --$c_{i+1} = a_i * a_{i+1}$-- therefor.
Col. 6, line 29    After "variables", delete "K" and insert --$K_i$-- therefor.
Col. 7, line 43    Please delete "$K_{ex} \leftarrow e_{leader}, \bullet (K_{ex});$" and insert --$K_{ex} \leftarrow e_{leader}, (K_{ex});$-- therefor.

Signed and Sealed this
Tenth Day of February, 2015

Michelle K. Lee
*Deputy Director of the United States Patent and Trademark Office*

CERTIFICATE OF CORRECTION (continued)
U.S. Pat. No. 8,041,031 B2

| | |
|---|---|
| Col. 8, line 6 | Please delete "Swap Columns" and insert --SwapColumns-- therefor. |
| Col. 8, line 12 | Please delete "16!)$^3$" and insert --(16!)$^3$-- therefor. |
| Col. 8, line 52 | Please delete "0011=00‖11)" and insert --0011=00‖11-- therefor. |
| Col. 8, line 55 | Please delete "$e_{l,*}$" and insert --$e_l$•-- therefor. |
| Col. 8, line 57 | After "$K_{in}$", please insert --we--. |
| Col. 11, line 12 | Please delete "of K becomes" and insert --of $K_{ex}$ and becomes-- therefor. |
| Col. 12, line 15 | After "$K_{in}$", please insert --there--. |
| Col. 12, line 23 | Please delete "arbitrary .string" and insert --arbitrary string-- therefor. |
| Col. 12, line 43 | After "$K_{in}$", please insert a --.--. |
| Col. 12, line 61 | Please delete "α=row$_1$row$_2$)" and insert --α=(row$_1$row$_2$)-- therefor. |
| Col. 13, line 8 | Please delete "he" and insert --be-- therefor. |
| Col. 13, line 50 | Please delete "$X_{i,m-1}=K_{i-1,m-1}*K_{i,m-2}$" and insert --$X_{i,m-1} = K_{i-1,m-1} * X_{i,m-2}$--. |
| Col. 13, line 60 | Please delete "$X_{i,m-1}$" and insert --$T_{i,m-1}$-- therefor. |
| Col. 13, line 61 | Please delete "$X_{i,0}=K_{i-1,0}*K_{i-1,i} \bmod m$" and insert --$X_{i,0} = K_{i-1,0} * K_{i-1,i \bmod m}$-- therefor. |
| Col. 13, line 63 | Please delete "$X_{i,1}=K_{i-1,1}*K_{i,0}$" and insert --$X_{i,1} = K_{i-1,1} * X_{i,0}$-- therefor. |
| Col. 14, line 29 | Please delete "$a=y_{m-1}*x_{m-2}$" and insert --$a = y_{m-1} * x_{m-2}$-- therefor. |
| Col. 14, line 33 | Please delete "$x_0, x_1, \ldots, x_{m-2}, 0, y_1, \ldots, y_{m-1}$," and insert --$x_0, x_1, \ldots, x_{m-2}, y_0, y_1, \ldots, y_{m-1}, z$-- therefor. |
| Col. 14, line 40 | Before "$a \in Q$", please insert --and--. |
| Col. 15, line 24 | Please delete "$X_{0,1}=K_{-1,1}*K_{0,0}$" and insert --$X_{0,1} = K_{-1,1} * X_{0,0}$-- therefor. |
| Col. 15, line 29 | Please insert --(7)-- on right side of the column, on the same line as "$X_{0,m-2}=K_{-1,m-2}*X_{0,m-3}$". |
| Col. 15, line 37 | Please delete "(7)" on right side of column. |
| Col. 15, line 39 | Please delete "$X_{1,0}=K_{-0,0}*K_{-0,0}$" and insert --$X_{1,0} = K_{0,0} * K_{0,1}$-- therefor. |
| Col. 15, line 43 | Please delete "$X_{1,1}=K_{-0,1}*K_{1,0}$" and insert --$X_{1,1} = K_{0,1} * X_{1,0}$-- therefor. |
| Col. 15, line 48 | Please delete "$X_{1,m-2}=K_{-0,m-2}*X_{1,m-3}$" and insert --$X_{1,m-2} = K_{0,m-2} * X_{1,m-3}$-- therefor. |
| Col. 15, line 48 | Please insert --(8)-- on right side of the column, on the same line as "$X_{1,m-2} = K_{0,m-2} * X_{1,m-3}$". |
| Col. 15, line 61 | Please delete "$X_{2,1}=K_{1,1}*K_{2,0}$" and insert --$X_{2,1} = K_{1,1} * X_{2,0}$-- therefor. |
| Col. 15, line 64 | After line 64, please insert on the next line --. . .--. |

CERTIFICATE OF CORRECTION (continued)
U.S. Pat. No. 8,041,031 B2

| | |
|---|---|
| Col. 15, line 65 | Please insert --(9)-- on right side of the column, on the same line as " $X_{2,m-2} = K_{1,m-2} * X_{2,m-3}$ ". |
| Col. 16, line 3 | Please delete " $T_{2,m-1} = ((\ldots(K_{1,2\ p\ mod\ m} \cdot X_{2,0}) \cdot \ldots) \cdot X_{2,m-2}) \cdot (M_2 \oplus C_2)$ " and insert -- $T_{2,m-1} = ((\ldots(K_{1,2\ p\ mod\ m} \cdot X_{2,0}) \cdot \ldots) \cdot X_{2,m-2}) \cdot (M_2 + C_2)$ -- therefor. |
| Col. 16, line 6 | Please delete "(9)" on the right side of column. |
| Col. 16, line 9 | Please delete " $X_{0,m-1} = M_0 C_0, X_{1,m-1} = M_1 \oplus C_1, X_{2,m-1} = M_2 \oplus C_2$ " and insert -- $X_{0,m-1} = M_0 \oplus C_0, X_{1,m-1} = M_1 \oplus C_1, X_{2,m-1} = M_2 \oplus C_2$ -- therefor. |
| Col. 16, line 44 | Please insert --(10)-- on right side of column, on the same line as " $\chi_{m-2}' = z_{m-2} * \chi_{m-3}'$ ". |
| Col. 17, line 1 | Please delete " $t_{m-1}'' = ((\ldots(y_p * \chi_0'') * \ldots) * \chi_{m-2}'') * (M_2 \oplus C_0)$ " and insert -- $t''_{m-1} = ((\ldots(y_{2+p} \cdot x''_o) \cdot \ldots) \cdot x''_{m-2}) \cdot (M_2 \oplus C_2)$ -- therefor. |
| Col. 17, line 3 | Please delete "(10)" on the right side of column. |
| Col. 17, line 54 | In the equation, please delete "$z_m$-1" and insert --$z_{m-1}$-- therefor. |
| Col. 20, line 20 | Please delete "$e_{O,}{}^4(\alpha)$" and insert --$e_{0,*}{}^4(\alpha)$-- therefor. |
| Col. 20, line 31 | Please delete " $D = D_{l_1 \ldots l_k, *1 \ldots *k} = e_{l_1, *1} \bigcirc e_{l_2, *2} \bigcirc \ldots \bigcirc e_{l_k, *k}$ " and insert -- $D = D_{l_1 \ldots l_k, *1 \ldots *k} = d_{l_1, *1} \circ d_{l_2, *2} \circ \cdots \circ d_{l_k, *k}$ -- therefor. |
| Col. 20, line 38 | Before "decryption function", please delete "an" and insert --a-- therefor. |
| Col. 20, line 47 | Please delete "$d_{11} \ldots d_{n+1} \epsilon A$." and insert --$d_1, \ldots d_{n+1} \epsilon A$.-- therefor. |
| Col. 20, line 57 | Please delete " $D(c_1 \ldots c_{i-1} d c_{i+1} \ldots c_k) = z_1 \ldots z_k$ " and insert -- $D(c_1 \ldots c_{i-1} d c_{i+1} \ldots c_k) = z_1 \ldots z_k$ -- therefor. |
| Col. 21, line 5 | Please delete " $z_1 z_2 \ldots z_k = d_{l_2, \backslash 2}(y_1 y_2 \ldots 0 y_k) \ldots d_{l_2, \backslash 2}(\chi_1 \ldots \chi_{i-1} y_i y_{i+1} \chi_{i+2} \ldots \chi_k)$ " and insert -- $z_1 z_2 \ldots z_k = d_{l_2, \backslash 2}(y_1 y_2 \ldots 0 y_k) = d_{l_2, \backslash 2}(x_1 \ldots x_{i-1} y_i y_{i+1} x_{i+2} \ldots x_k)$ -- therefor. |
| Col. 21, line 8 | After "$\ldots x_k$)", please delete the "." and insert a --,-- therefor. |
| Col. 21, line 16 | Please delete " $z_{i+1} = d\backslash_1 c_{i+1}$, " and insert -- $z_{i+1} = y_i \backslash 2 y_{i+1}$, -- therefor. |
| Col. 21, line 17 | On the line after the equation " $z_{i+1} = d\backslash_1 c_{i+1}$, ", please insert -- $z_{i+2} = y_{i+1} \backslash 2 x_{i+2}$, --. |
| Col. 21, line 26 | After "quasigroup", please delete "a" and insert --$\alpha$-- therefor. |

CERTIFICATE OF CORRECTION (continued)

| | |
|---|---|
| Col. 21, line 54 | Please delete "B=B$_O$ B$_i$ B$_2$ . . . ," and insert --B=B$_0$B$_1$B$_2$...,-- therefor. |
| Col. 21, line 61 | Please delete "$E_{K_0 K_1 \ldots K_{n-1}, ** \ldots *} = e_{K_0, *} \bigcirc \ldots \bigcirc e_{K_{n-1}, *}$," and insert --$E_{K_0 K_1 \ldots K_{n-1}, ** \ldots *} = e_{K_0, *} \circ \ldots \circ e_{K_{n-1}, *}$-- therefor. |
| Col. 21, line 65 | After "B" and before "D(C)", please insert --=--. |
| Col. 22, line 7 | After "M$_3$" and before "(C=C$_0$", please insert --...--. |
| Col. 22, line 36 | Please delete "encryption" and insert --decryption-- therefor. |
| Col. 22, line 62 | Please delete "b$_9$B$_8$b$_7$b$_6$b$_5$‖b$_4$b$_3$b$_2$b$_1$b$_0$=n$_1$‖n$_2$," and insert --$b_9 b_8 b_7 b_6 b_5 \| b_4 b_3 b_2 b_1 b_0 = n_1 \| n_2$,-- therefor. |
| Col. 23, line 65 | After "working key K", please insert a --.--. |
| Col. 25, line 9 | Please delete "M," and insert --M$_1$-- therefor. |
| Col. 25, line 31 | Please delete "n+1=330 1=4" and insert --n+1 = 3+1 = 4-- therefor. |
| Col. 26, line 18 | Please delete "$qc_{i, x_{i+1}} = C_{i+1}$," and insert -- $qc_{i, x_{i+1}} = C_{i+1}$ -- therefor. |
| Col. 26, line 21 | After "values of", please delete the ".". |
| Col. 26, line 23 | After "variables", please insert --$X_{i0}, \ldots, X_{i31}$--. |
| Col. 26, line 48 | Please delete "n 32" and insert --n≥32-- therefor. |
| Col. 27, line 16 | Please delete "K=K$_{64}$‖ . . . vk$_{191}$" and insert --K=K$_{64}$‖ ... ‖k$_{191}$ -- therefor. |
| Col. 27, line 29 | Please delete "Totaly Asynchronoous" and insert --Totally Asynchronous-- therefor. |
| Col. 28, line 5 | Please delete "$\sigma_0 = (c_{i-t}, c_{i-t+1}, \ldots, c_{-1})$" and insert --$\sigma_0 = (c_{i-t}, c_{i-t+1}, \ldots, c_{i-1})$-- therefor. |
| Col. 29, line 10 | Please delete "$^{-1}(^{-1})(x, y) = z \Leftrightarrow *-1(z, y) = x \Leftrightarrow z^* x = y$" and insert --$^{-1}(*^{-1})(x,y)=z \Leftrightarrow \cdot^{-1}(z,y)=x \Leftrightarrow z \cdot x = y$-- therefor. |
| Col. 29, line 22 | Please delete "$x*y=z \Leftrightarrow y=x\backslash z \Leftrightarrow x=z/y$." and insert --$x*y=z \Leftrightarrow y=x/z \Leftrightarrow x=z/y$--. |
| Col. 29, line 25 | Please delete "$x\backslash(x*y)=y, (x*y)/y=x, x*(x\backslash y)=y, (x/y)**y=x$" and insert --$x\backslash(x*y)=y, (x*y)/y=x, x*(x\backslash y)=y, (x/y)*y=x$--. |
| Col. 29, line 41 | After "variables T, and X", please insert a --.--. |
| Col. 29, line 51 | Please delete "Totaly" and insert --Totally-- therefor. |
| Col. 29, line 66 | In right column of Table 1, please delete "K$_{i-1}$ ← T;" and insert --$K_{i-1}$ ← X;-- therefor. |
| Col. 30, line 30 | Please delete "$M_1 = m_1 \ldots m_{i_1}, M_2 = m_{i_1+1} \ldots m_{i_2}$," and insert --$M_1 = m_1 \ldots m_{i_1}, M_2 = m_{i_1+1} \ldots m_{i_2}$ -- therefor. |
| Col. 30, line 33 | Please delete "C=c$_1$c$_2$...c$_l$" and insert --C=c$_1$c$_2$...c$_l$-- therefor. |
| Col. 31, line 2 | Please delete "e$_l$," and insert --e$_l$.-- therefor. |

| Col. 31, line 45 | Please delete the following chart |
|---|---|

"
|   |   | $M_0$ |   |   | $M_1$ |   |   | $M_2$ |   |   | $M_3$ |   |   |
|---|---|---|---|---|---|---|---|---|---|---|---|---|---|
|   | K | X | T | K | X | T | K | X | T | K | X | T | ... |
| i |   | 0 | 0 |   | 0 | 0 |   | 1 | 0 |   | 0 | 0 | ... |
| 0 | 2 | 0 | 0 | 0 | 3 | 3 | 3 | 1 | 1 | 1 | 1 | 1 | 1 |
| 1 | 3 | 3 | 3 | 2 | 3 | 1 | 2 | 3 | 2 | 3 | 1 | 0 |   |
| 2 | 2 | 1 | 3 | 1 | 0 | 1 | 0 | 1 | 2 | 1 | 3 | 2 |   |
| 3 | 3 | 1 | 0 | 2 | 0 | 1 | 1 | 2 | 1 | 1 | 0 | 2 |   |
| Output C = X |   | 1 |   |   | 0 |   |   | 2 |   |   | 0 |   |   |

" and insert the following chart

|   |   | $M_0$ |   |   | $M_1$ |   |   | $M_2$ |   |   | $M_3$ |   |   |
|---|---|---|---|---|---|---|---|---|---|---|---|---|---|
|   | K | X | T | K | X | T | K | X | T | K | X | T | ... |
| i |   | 0 | 0 |   | 0 | 0 |   | 1 | 0 |   | 0 | 0 | ... |
| 0 | 2 | 0 | 0 | 0 | 3 | 3 | 3 | 1 | 1 | 1 | 1 | 1 |   |
| 1 | 3 | 2 | 2 | 2 | 2 | 1 | 2 | 3 | 2 | 3 | 1 | 0 |   |
| 2 | 2 | 1 | 3 | 1 | 0 | 1 | 0 | 1 | 3 | 1 | 2 | 2 |   |
| 3 | 3 | 1 | 2 | 2 | 0 | 1 | 1 | 2 | 1 | 1 | 0 | 2 |   |
| Output C = X |   | 1 |   |   | 0 |   |   | 2 |   |   | 0 |   |   |

-- therefor.

| Col. 32, line 39 | Please delete "(M,C)=(($M_0M_1$d...)),$C_0$" and insert --(M,C)=(($M_0M_1$...),($C_0$-- therefor. |
|---|---|
| Col. 34, line 23 | Before "the encoder", please insert --by--. |
| Col. 34, line 23 | Before "transmitted", please delete "block by". |
| Col. 34, line 29 | Please delete "L," and insert --$L_i$-- therefor. |
| Col. 35, line 34 | Please delete "$E_{l_*}(\alpha) = b_1 \ldots b_n \Leftrightarrow b_{i+1} = b_i + \alpha_{i+1}$" and insert -- $e_{l_*}(\alpha) = b_1 \ldots b_n \Leftrightarrow b_{i+1} = b_i + \alpha_{i+1}$ -- therefor. |
| Col. 37, line 5 | Please delete "$L_{(9)}$" and insert --$L^{(9)}$-- therefor. |
| Col. 37, line 13 | Please delete "Totaly" and insert --Totally-- therefor. |
| Col. 37, line 29 | After "operation" delete "e" and insert --⊕-- therefor. |
| Col. 37, line 67 | After "where $m_a''$", please insert --has the same redundant information as $M_i'$-- . |
| Col. 39, line 19 | In Table V, column M' and row i=1, please delete "4000" and insert --4d00-- therefor. |
| Col. 40, line 14 | In Table V, column M' and row i=10, please delete "1600" and insert --f600-- therefor. |
| Col. 40, line 14 | In Table V, column $k_1$ and row i=10, please delete "59dc3" and insert --58dc3-- therefor. |
| Col. 40, line 16 | In Table V, column $D_i$ and row i=12, please delete "2f09" and insert --2f08-- therefor. |
| Col. 40, line 18 | In Table V, column $D_i$ and row i=15, please delete "6972" and insert --6973-- therefor. |

CERTIFICATE OF CORRECTION (continued)
U.S. Pat. No. 8,041,031 B2

| | |
|---|---|
| Col. 41, line 64 | Please delete " $\rho_B = \sum_{i>K_{max}} \binom{16}{i} p^i (1-p)^{16-i}$ " and insert -- $\rho_B = \sum_{i>B_{max}} \binom{16}{i} p^i (1-p)^{16-i}$ -- therefor. |
| Col. 43, line 13 | Before "a₁ a₂ . . . aₙ", please delete "(". |
| Col. 43, line 14 | After "than", please delete "where". |
| Col. 43, line 14 | After "than", please insert a --(-- before "a₁ a₂ . . . , aₙ". |
| Col. 43, line 25 | Before "are called", please delete "$e_{l,*}$" and insert --$e_{l,*}'$-- therefor. |
| Col. 43, line 47 | Please delete "of an transformation" and insert --of an e'-transformation-- therefor. |
| Col. 44, line 20 | Please delete "8/28 in $e_{0,*}^4(\alpha)$" and insert --8/28 in $e'_{0,*}{}^4(\alpha)$-- therefor. |
| Col. 44, line 30 | Please delete " $E_k' = E_{l_1 \ldots l_k}' = e_{l_1,*1}' \bigcirc e_{l_2,*2}' \bigcirc \ldots \bigcirc e_{l_k,*k'}$ " and insert -- $E_k' = E'_{l_1 \cdots l_k} = e'_{l_1,*1} \bigcirc e'_{l_2,*2} \bigcirc \cdots \bigcirc e'_{l_k,*k'}$ -- therefor. |
| Col. 46, line 59 | In the table headings, please delete "a=2ᵏ" and insert --n=2ᵏ-- therefor. |
| Col. 46, line 60 | In the table, first row in the right column, please delete "1" and insert --4-- therefor. |
| Col. 46, line 62 | In the table, third row, right column, please delete "191" and insert --194-- therefor. |
| Col. 47, line 4 | In the table headings, please delete "a=2k" and insert --n=2k-- therefor. |
| Col. 48, line 7 | After "implies that", please insert --pij--. |
| Col. 48, line 63 | Please delete "$c_{i+1} \ldots c_{i+1}$" and insert --$c_{i+1} \ldots c_{i+l}$-- therefor. |
| Col. 48, line 64 | Please delete "where 1 ≧ 1" and insert --where $l \geq 1$-- therefor. |
| Col. 48, lines 64-65 | Please delete "{0,1,...,k-1}" and insert --{0,1,...,k-$l$}-- therefor. |
| Col. 48, line 65 | Please delete "$c_{i+1} \ldots c_{i+1}$" and insert --$c_{i+1} \ldots c_{i+l}$-- therefor. |
| Col. 49, line 9 | Please delete "$Y_{m(n)}$" and insert --$Y_m^{(n)}$-- therefor. |
| Col. 49, line 12-13 | Please delete " $(i_m^{(n)}, i_{m+1}^{(n)}, \ldots, i_{m+l-1}^{(n)}) \to i_m^{(n)} s^{l-1} + i_{m+1}^{(n)} s^{l-2} + \ldots + i_{m+l-2}^{(n)} s + i_{m+l+1}^{(n)}$ " and insert -- $(i_m^{(n)}, i_{m+1}^{(n)}, \cdots, i_{m+l-1}^{(n)}) \to i_m^{(n)} s^{l-1} + i_{m+1}^{(n)} s^{l-2} + \cdots + i_{m+l-2}^{(n)} S + i_{m+l-1}^{(n)}$-- therefor. |
| Col. 49, line 15 | Please delete " $\{Z_m^{(n)} | \geq 1\}$ " and insert -- $\{Z_m^{(n)} | m \geq 1\}$ -- therefor. |
| Col. 49, line 21 | Please delete " $t = i_m^{(n)} s^{l-1} + i_{m+1}^{(n)} s^{l-2} + \ldots + i_{m+l-2}^{(n)} s + i_{m+l+1}^{(n)}$ " and insert -- $t = i_m^{(n)} S^{l-1} + i_{m+1}^{(n)} S^{l-2} + \cdots + i_{m+l-2}^{(n)} S + i_{m+l-1}^{(n)}$-- therefor. |
| Col. 49, line 24 | Please delete " $t' = i_{m-1}^{(n)} s^{l-1} + i'{}_m^{(n)} s^{l-1} i'{}_m^{(n)} s^{l-2} + \ldots + i'{}_{m+l-3}^{(n)} s + i'{}_{m+l+1}^{(n)}$ " and insert -- $t' = i_{m-1}^{(n)} S^{l-1} + i'{}_{m+l}^{(n)} S^{l-2} + \cdots + i'{}_{m+l-3}^{(n)} S + i'{}_{m+l-2}^{(n)}$-- therefor. |
| Col. 49, line 36 | Please delete " $P(Y_m^{(n)} = i_m^{(n)}, \ldots, Y_{m+l-1}^{(n)} = i_{m+l-1}^{(n)} | Y_{m-1}^{(n)}$ " and insert -- $P\left(Y_m^{(n)} = i_m^{(n)}, \cdots, Y_{m+l-1}^{(n)} = i_{m+l-1}^{(n)} \middle| Y_{m-1}^{(n)}\right)$-- therefor. |

CERTIFICATE OF CORRECTION (continued)
U.S. Pat. No. 8,041,031 B2

| | |
|---|---|
| Col. 49, line 63 | Please delete "x=$i_{j(r)}$" and insert -- $x=i_j^{(r)}$ -- therefor. |
| Col. 50, line 4-5 | Please delete "$P(\cap_{j=0}^{d}(Y_{+j}^{(r+1)}=i_{m+j}^{(r+1)}))\ Y_{m-1}^{(r+1)}=i_{m-1}^{(r+1)})=P(\cap_j U^d(Y_{m,j}^{(r)}=i_{m,j}^{(r)}))$" and insert -- $P\left(\cap_{j=0}^{d}(Y_{m+j}^{(r+1)} = i_{m+j}^{(r+1)})\right)|Y_{m-1}^{(r+1)} = i_{m-1}^{(r+1)}) = P(\cap_{j=0}^{d}(Y_{m+j}^{(r)} = i_{m+j}^{(r)}))$ -- therefor. |
| Col. 50, line 50 | Please delete "$i_{j,j}^{(r+l)}=$" and insert --$^{(r+l)}$-- therefor. |
| Col. 51, line 11 | Please delete "$(A,*_u)$" and insert -- $(A,*u)$ -- therefor. |
| Col. 51, line 12 | Please delete "$\gamma'=E(r)(\beta)$" and insert --$\gamma'=E^{(r)}(\beta)$-- therefor. |
| Col. 51, line 53 | Please insert -- $\sum_{i_{m\cdot 1}^{(r+1)}=0}^{s-1} q_{i_{m+r}}^{(0)} =$ -- therefor. |
| Col. 52, line 4 | After "$i_{m+n}^{(0)}$", please insert a --)--. |
| Col. 52, lines 22-23 | Please delete "$E^n(\alpha)=a_l^{(n)} \ldots a_k^{(n)}$" and insert -- $E^n(\alpha)=a_l^{(n)} \ldots a_k^{(n)}$ -- therefor. |
| Col. 52, line 56 | After "$a_2^{(p+1)}$", please insert --=$a_1^{(p+1)}$-- therefor. |
| Col. 52, line 56 | Please delete "$a_{p+1}^{(p+1)}$" and insert --$a_{p-1}^{(p+1)}$-- therefor. |
| Col. 52, line 56-57 | Please delete "$a_{p-2}^{(p+1)}*b_{p-1},a_p^{(p+1)}$" and insert --$a_{p-2}^{(p+1)}*b_{p-1} \neq b_{p-1},a_p^{(p+1)}$-- therefor. |
| Col. 53, line 57 | After "T←", please insert --K--. |
| Col. 54, line 4 | Please delete "$X\hat{x}\text{Input}_i$" and insert -- $X \otimes \text{Input}_i$ -- therefor. |
| Col. 54, line 12 | Please delete "comprising" and insert --comprising:-- therefor. |
| Col. 54, line 64 | Please delete "$X\hat{x}\text{Input}_i$" and insert -- $X \otimes \text{Input}_i$ -- therefor. |
| Col. 55, lines 39-40 | Please delete "$K_o \leftarrow K_o*(M_{Counter}* K_{Counter+p\ mod\ n})$" and insert --$K_o \leftarrow K_o*(M_{Counter}* K_{Counter+p\ mod\ n})$-- therefor. |
| Col. 56, line 39 | Please delete "$X \leftarrow Y$" and insert --$X \leftarrow Y$;-- therefor. |